(12) United States Patent
Nambu

(10) Patent No.: US 7,483,797 B2
(45) Date of Patent: Jan. 27, 2009

(54) MANAGEMENT SYSTEM FOR MANAGING A USE STATUS OF A DEVICE

(75) Inventor: Kyojiro Nambu, Nasushiobara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 65 days.

(21) Appl. No.: 11/751,988

(22) Filed: May 22, 2007

(65) Prior Publication Data

US 2008/0154387 A1 Jun. 26, 2008

(30) Foreign Application Priority Data

Dec. 25, 2006 (JP) ............... 2006-348006

(51) Int. Cl.
G06F 15/00 (2006.01)
G08B 1/08 (2006.01)
(52) U.S. Cl. ...................................... 702/60
(58) Field of Classification Search .................... 702/60
See application file for complete search history.

(56) References Cited

U.S. PATENT DOCUMENTS

| | | | | |
|---|---|---|---|---|
| 5,903,594 | A * | 5/1999 | Saulnier et al. | 375/130 |
| 6,535,110 | B1 * | 3/2003 | Arora et al. | 340/310.11 |
| 2002/0196128 | A1 * | 12/2002 | Gaus et al. | 340/310.01 |
| 2003/0169156 | A1 * | 9/2003 | Perret | 340/310.01 |
| 2005/0001694 | A1 * | 1/2005 | Berkman | 333/100 |
| 2005/0015805 | A1 * | 1/2005 | Iwamura | 725/79 |
| 2005/0018766 | A1 * | 1/2005 | Iwamura | 375/240.01 |
| 2005/0111560 | A1 * | 5/2005 | Haines | 375/257 |

FOREIGN PATENT DOCUMENTS

JP 2004-280455 10/2004

OTHER PUBLICATIONS

English Abstract of JP2004-280455, Oct. 2007.*

* cited by examiner

*Primary Examiner*—Michael P. Nghiem
*Assistant Examiner*—Cindy H Khuu
(74) *Attorney, Agent, or Firm*—Oblon, Spivak, McClelland, Maier & Neustadt, P.C.

(57) ABSTRACT

A management system that manages a use status of a plurality of devices that are connected a plurality of power supply systems provided in a facility to be used, includes a plurality of reporting apparatuses attached to the devices, and a management apparatus, wherein each of the reporting apparatuses includes a first output unit which outputs device identification information required to identify a corresponding one of the devices when the corresponding one attached to the reporting apparatus is connected with one of the power supply systems, and the management apparatus includes a collecting unit which collects the device identification information output from the first output unit in association with system identification information required to identify one of the power supply systems to which the corresponding one of the devices is connected.

23 Claims, 27 Drawing Sheets

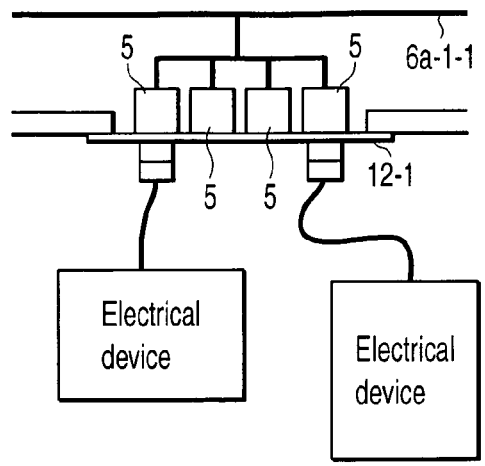

FIG. 13

| System identification information | Location | Outlet position |
|---|---|---|
| ID2-1-1 | First operating room | North wall surface |
| ID2-1-2 | First operating room | West wall surface |
| ID2-1-3 | First operating room | South wall surface |
| ID2-2-1 | Second operating room | North wall surface |
| ID2-2-2 | Second operating room | West wall surface |
| ID2-2-3 | Second operating room | South wall surface |
| ID2-3-1 | Third operating room | North wall surface |
| ID2-3-2 | Third operating room | West wall surface |
| ID2-3-3 | Third operating room | South wall surface |
| ID3-2 | Equipment room | − |

FIG. 14

| Device identification information | Corresponding device | Use conditions |
|---|---|---|
| ID1-1 | Anesthesia machine | Out of order |
| ID1-2 | Electric scalpel | − |
| ID1-3 | Cutting machine | Unusable in clean room |
| ⋮ | ⋮ | ⋮ |

FIG. 15

| Device identification information | Corresponding device | Use conditions | Type |
|---|---|---|---|
| ID1-1 | Anesthesia machine | Out of order | typeA |
| ID1-2 | Electric scalpel | – | typeB |
| ID1-3 | Cutting machine | Unusable in clean room | typeC |
| ⋮ | ⋮ | ⋮ | ⋮ |

FIG. 21

| Type | Maximum power consumption |
|---|---|
| typeA | 300W |
| typeB | 800W |
| typeC | 1500W |
| ⋮ | ⋮ |

FIG. 22

| System identification information | Rated power |
|---|---|
| ID2-1-1 | 6000W |
| ID2-1-2 | 9000W |
| ⋮ | ⋮ |

FIG. 23

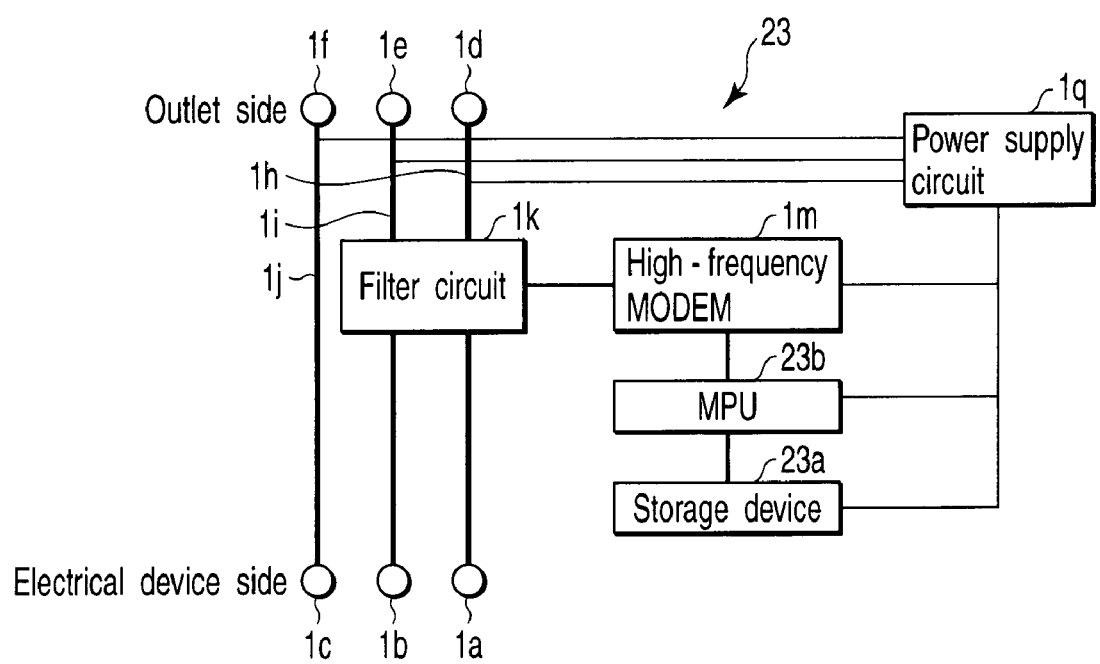
F I G. 25

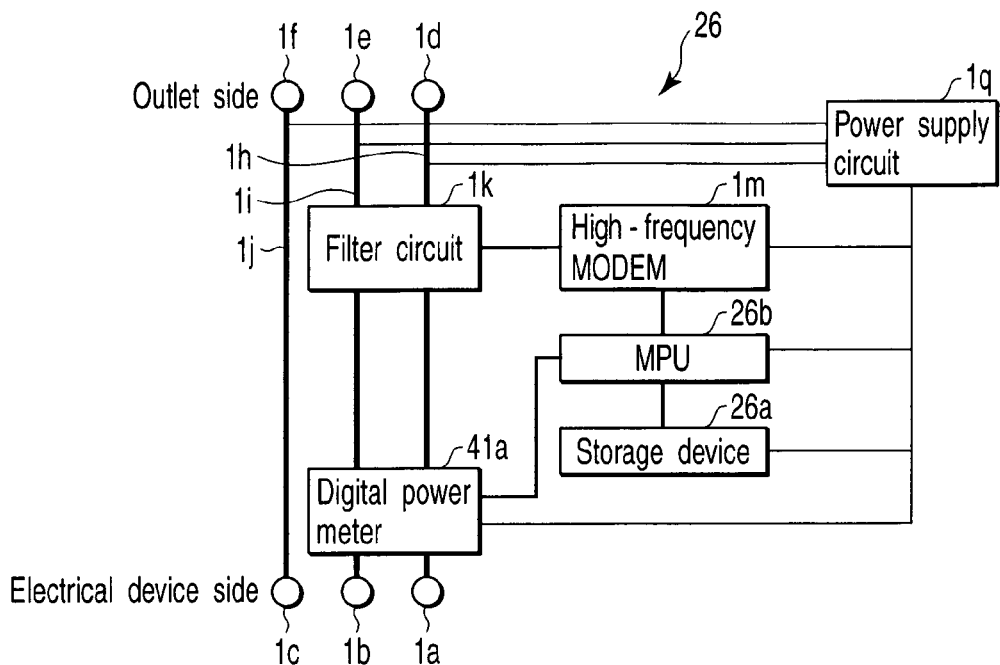
F I G. 3 0
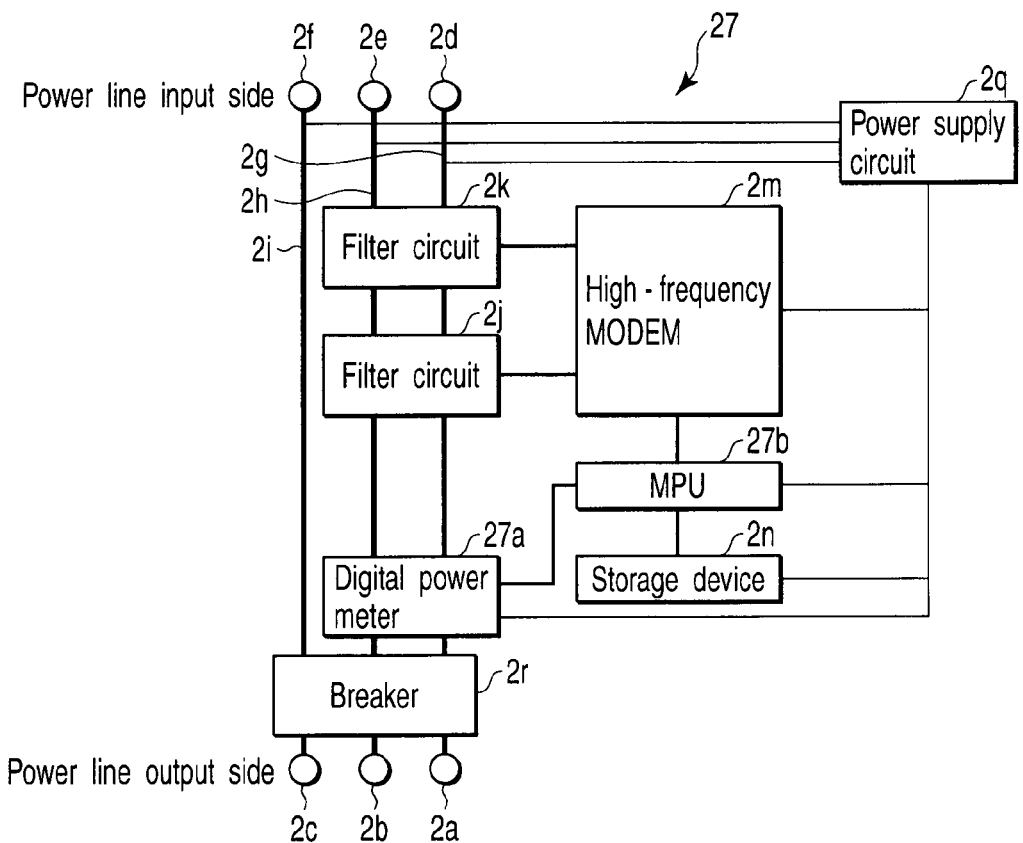
F I G. 3 1

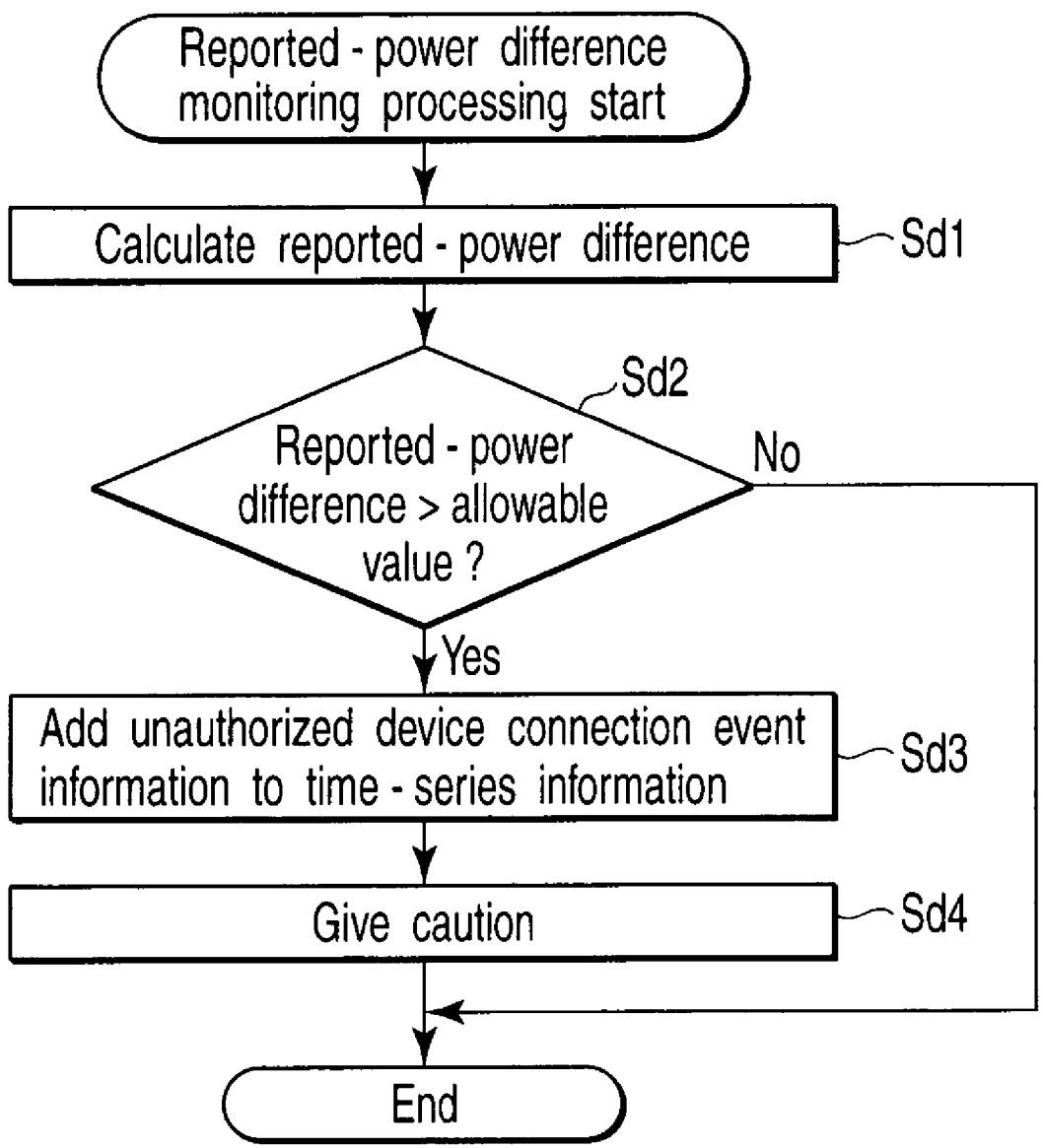
F I G. 3 3

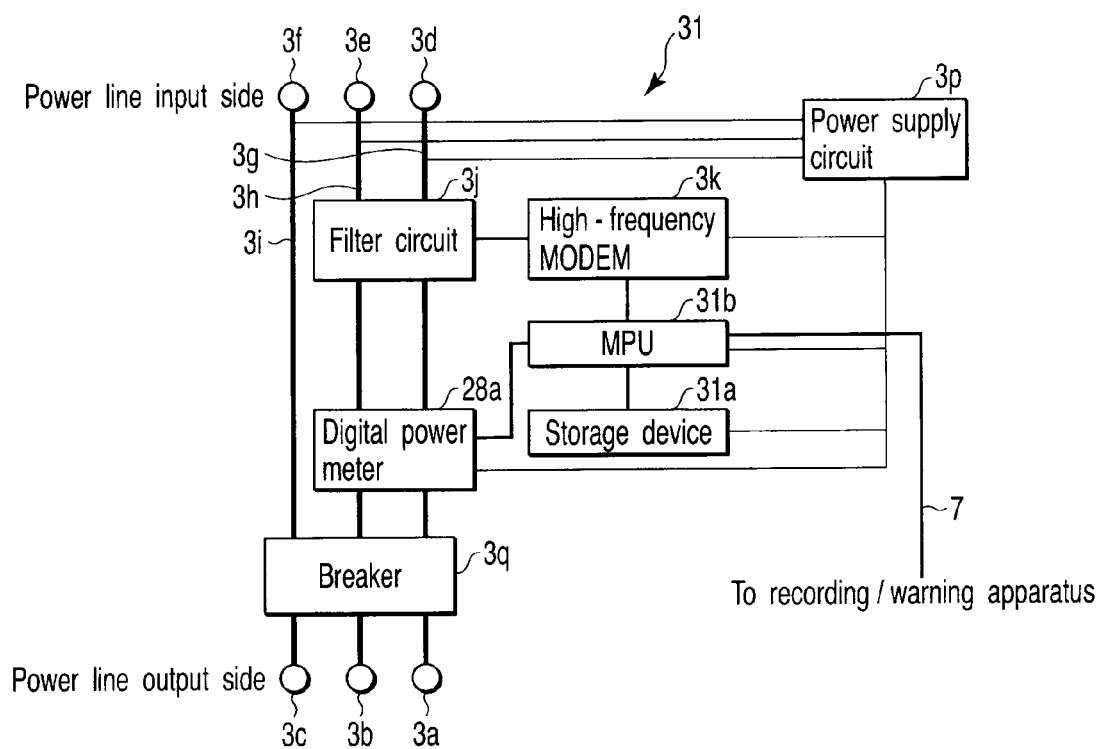
F I G. 3 6

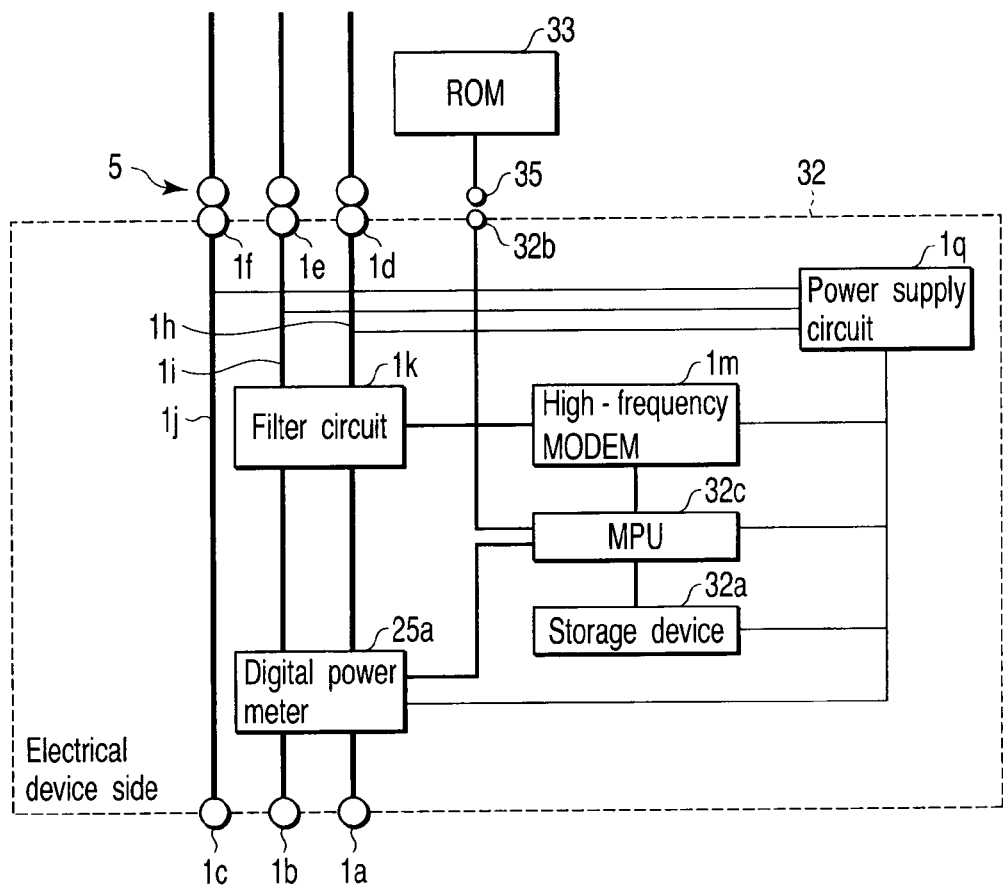
F I G. 3 8
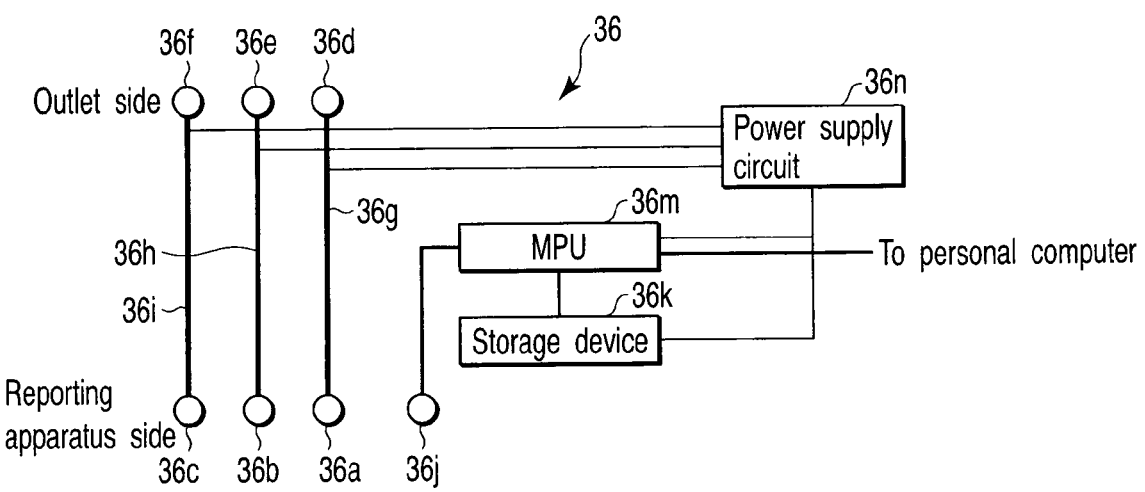
F I G. 3 9

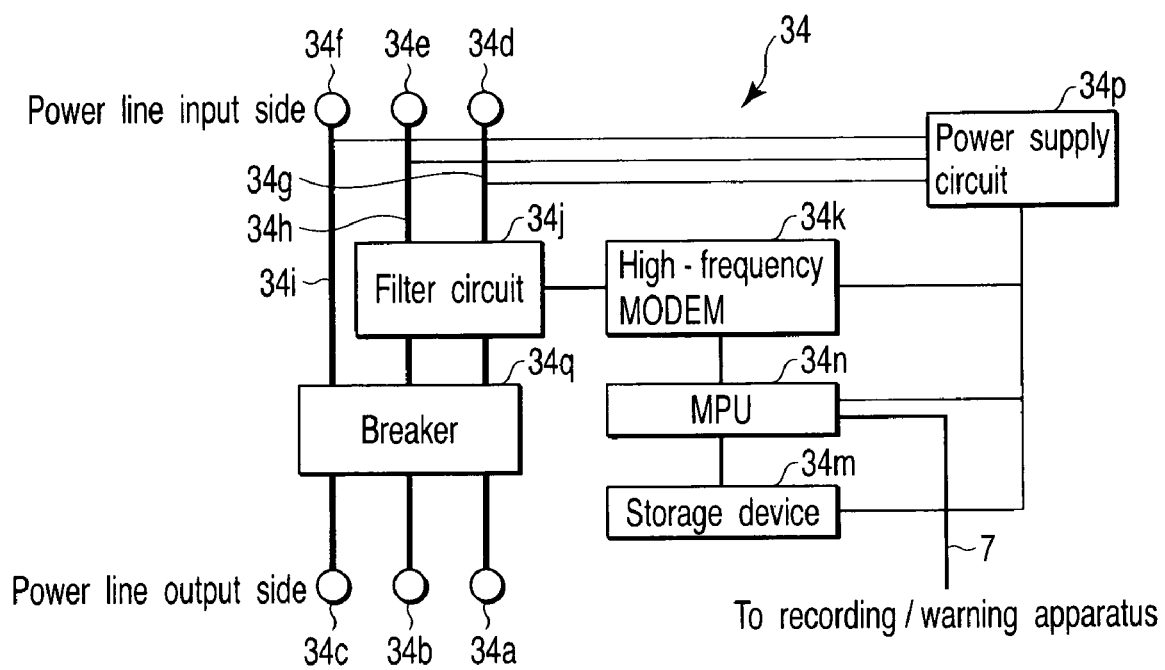
F I G. 40

| Outlet identification information | Location | Outlet position |
|---|---|---|
| ID5 - 1 - 1 | First operating room | First on north wall surface |
| ⋮ | ⋮ | ⋮ |
| ID5 - 1 - 8 | First operating room | Eighth on north wall surface |
| ID5 - 1 - 9 | First operating room | First on west wall surface |
| ⋮ | ⋮ | ⋮ |
| ID5 - 1 - 14 | First operating room | Sixth on west wall surface |
| ID5 - 1 - 15 | First operating room | First on south wall surface |
| ⋮ | ⋮ | ⋮ |
| ID5 - 1 - 25 | First operating room | 11th on south wall surface |
| ID5 - 2 - 1 | Second operating room | First on north wall surface |
| ⋮ | ⋮ | ⋮ |
| ID5 - 2 - 22 | Second operating room | Eighth on south wall surface |
| ID5 - 3 - 1 | Third operating room | First on north wall surface |
| ⋮ | ⋮ | ⋮ |
| ID5 - 3 - 18 | Third operating room | Sixth on south wall surface |
| ID5 - 4 - 1 | Equipment room | First |
| ⋮ | ⋮ | ⋮ |
| ID5 - 4 - 20 | Equipment room | 20th |

FIG. 41

MANAGEMENT SYSTEM FOR MANAGING A USE STATUS OF A DEVICE

CROSS-REFERENCE TO RELATED APPLICATIONS

This application is based upon and claims the benefit of priority from prior Japanese Patent Application No. 2006-348006, filed Dec. 25, 2006, the entire contents of which are incorporated herein by reference.

BACKGROUND OF THE INVENTION

1. Field of the Invention

The present invention relates to a management system which enables managing, e.g., a current location within a facility or managing allocation of an appropriate power supply in regard to a device used in the facility.

2. Description of the Related Art

Various kinds of devices are carried into an operating room in an operating department as needed, and they are connected with an outlet to be used. These devices are replaced with equivalent devices as required when, e.g., an inconvenience occurs, or unplanned devices may be used in accordance with needs during an operation. Further, a need for urgently borrowing a device that has been already carried into another operating room may arise. An ME engineer performs an operation of managing these devices, but always grasping where each device is present is difficult. Therefore, there is a concern that a location of a device is unknown when required and an urgent measure cannot be rapidly taken.

A medical information recording system that records medical information, e.g., patient biomedical information during an operation, behavior information of, e.g., an operator, images during an operation, or operating information of various medical devices in chronological order is known (see, e.g., Jpn. Pat. Appln. KOKAI Publication No. 2004-280455). When this technology is utilized, it is possible to know that a device is used in an operation. However, a location concerning a device that is placed in an operating room but is not working cannot be managed.

Further, in order to avoid a problem, e.g., a shutdown of an electrical device due to activation of a breaker, a management operation of allocating an appropriate power supply system to each electrical device is required, but this is carried out based on a judgment by the ME engineer.

As explained above, in facilities, e.g., a hospital, management of locations of devices that are moved to many places or management of allocating a power supply to each electrical device is substantially manually carried out, and a burden imposed on a manager is large, and accurate management is difficult.

BRIEF SUMMARY OF THE INVENTION

Based on such circumstances, enabling readily and accurately managing a location of a device or allocation of a power supply to an electrical device without increasing a burden on a manager has been demanded.

According to an aspect of the present invention, there is provided a management system that manages a use status of a plurality of devices that are connected a plurality of power supply systems provided in a facility to be used, comprising: a plurality of reporting apparatuses attached to the devices; and a management apparatus, wherein each of the reporting apparatuses includes a first output unit which outputs device identification information required to identify a corresponding one of the devices when the corresponding one attached to the reporting apparatus is connected with one of the power supply systems, and the management apparatus includes a collecting unit which collects the device identification information output from the first output unit in association with system identification information required to identify one of the power supply systems to which the corresponding one of the devices is connected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 13 is a view showing a specific configuration of an outlet unit in FIG. 12;

FIG. 14 is a view showing an example of a first database in the first embodiment;

FIG. 15 is a view showing an example of a second database in the first embodiment;

FIG. 21 is a view showing an example of a second database according to a third embodiment;

FIG. 22 is a view showing an example of a third database according to the third embodiment;

FIG. 23 is a view showing an example of a fourth database according to the third embodiment;

FIG. 25 is a block diagram showing a specific configuration of a reporting apparatus according to a fourth embodiment;

FIG. 30 is a block diagram showing a specific configuration of a reporting apparatus in a sixth embodiment;

FIG. 31 is a block diagram showing a specific configuration of a sub-collection apparatus in a seventh embodiment;

FIG. 33 is a flowchart of reported-power difference monitoring processing in the seventh embodiment;

FIG. 36 is a block diagram showing a specific configuration of a host collection apparatus in the eight embodiment;

FIG. 38 is a block diagram showing a specific configuration of a reporting apparatus in FIG. 37;

FIG. 39 is a block diagram showing a configuration of a rewriting device;

FIG. 40 is a block diagram showing a configuration of an collection apparatus in FIG. 37; and FIG. 41 is a view showing an example of a first database in the ninth embodiment.

DETAILED DESCRIPTION OF THE INVENTION

Several embodiments according to the present invention will now be explained hereinafter with reference to the accompanying drawings.

First Embodiment

A first embodiment will now be explained with reference to FIGS. 1 to 16.

Figure 1:
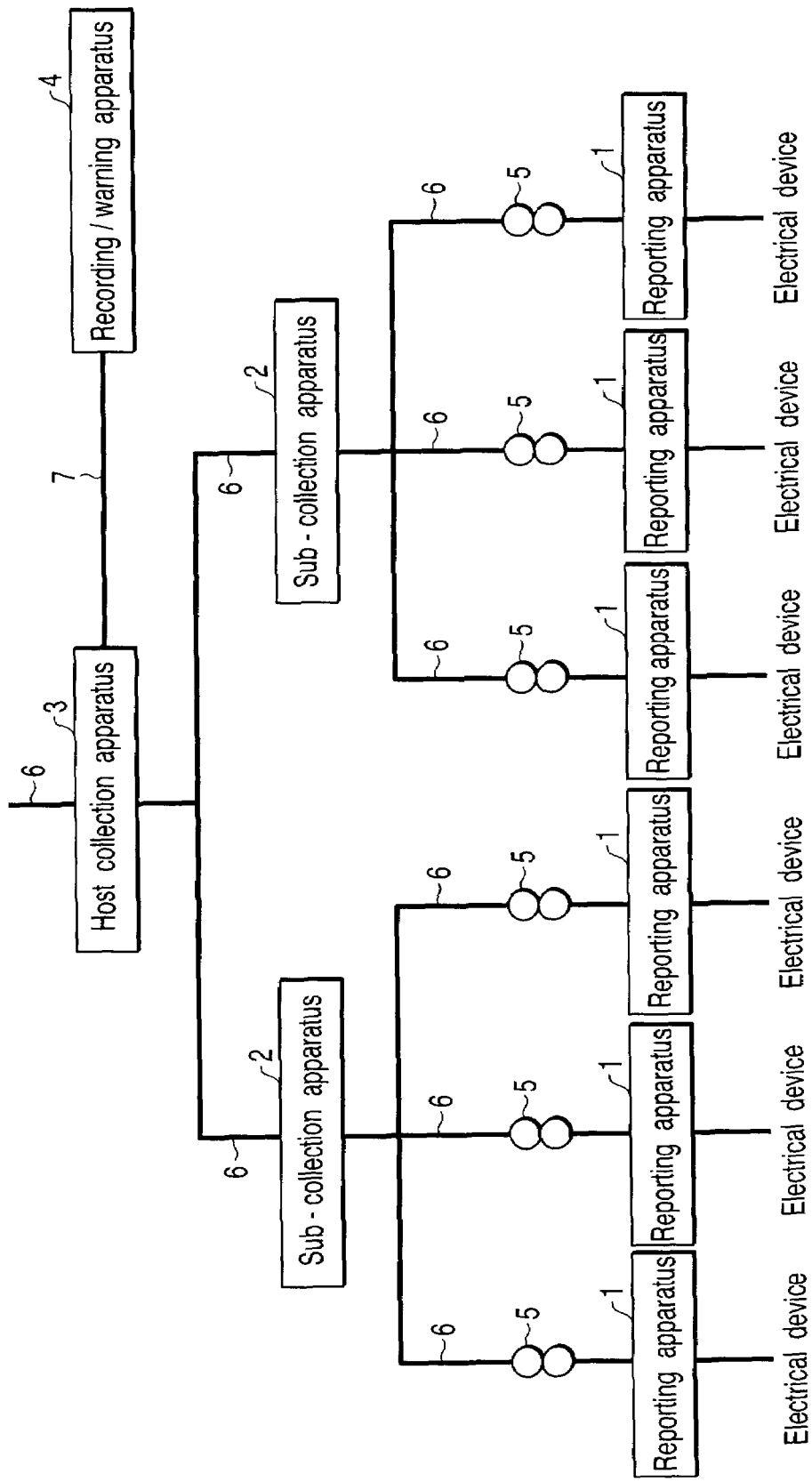
FIG. 1 is a block diagram showing a schematic configuration of a management system according to a first embodiment of the present invention.

FIG. 1 is a block diagram showing a schematic configuration of a management system according to the first embodiment.

The management system according to the first embodiment includes reporting apparatus 1, sub-collection apparatus 2, a host collection apparatus 3, and a recording/warning apparatus 4.

Each reporting apparatus 1 is attached to a power supply plug of an electrical device as a management target. The reporting apparatus 1 is inserted into an outlet 5 when a attached electrical device is used. The outlet 5 is disposed to a power supply system 6 that supplies a power to the electrical device. The reporting apparatus 1 supplies the power fed via the power supply system 6 to the electrical device. The reporting apparatus 1 outputs reporting information including unique device identification information to an upstream side of the power supply system 6.

Each sub-collection apparatus 2 is connected with each power supply system 6 on a downstream side of the power supply system 6 to which the host collection apparatus 3 is attached. The sub-collection apparatus 2 acquires reporting information output 5 from each reporting apparatus 1 inserted into the outlet of the connected power supply system 6. When the sub-collection apparatus 2 receives the reporting information, it adds unique system identification information, which is given to the connected power supply system 6, to the reporting information, and outputs this information to the upstream side of the power supply system 6.

The host collection apparatus 3 is attached to the power supply system 6 on the most upstream side. The host collection apparatus 3 acquires reporting information output from each sub-collection apparatus 2.

The recording/warning apparatus 4 performs various kinds of management processing concerning a use status of each electrical device connected with the power supply system 6. That is, the recording/warning apparatus 4 has a function as a management apparatus. The recording/warning apparatus 4 is connected with the host collection apparatus 3 via a dedicated communication line 7. The recording/warning apparatus 4 determines a current location of each electrical device inserted into any outlet 5 based on reporting information acquired by the host collection apparatus 3. Further, the recording/warning apparatus 4 records, e.g., reporting information acquired by the host collection apparatus 3, the determined current location, and others in chronological order. As the recording/warning apparatus, for example, a general-purpose server device or a computer device can be used as basic hardware. Furthermore, this apparatus can be realized by allowing a processor mounted on the server device or the computer device to execute a recording/warning apparatus.

Figure 2:
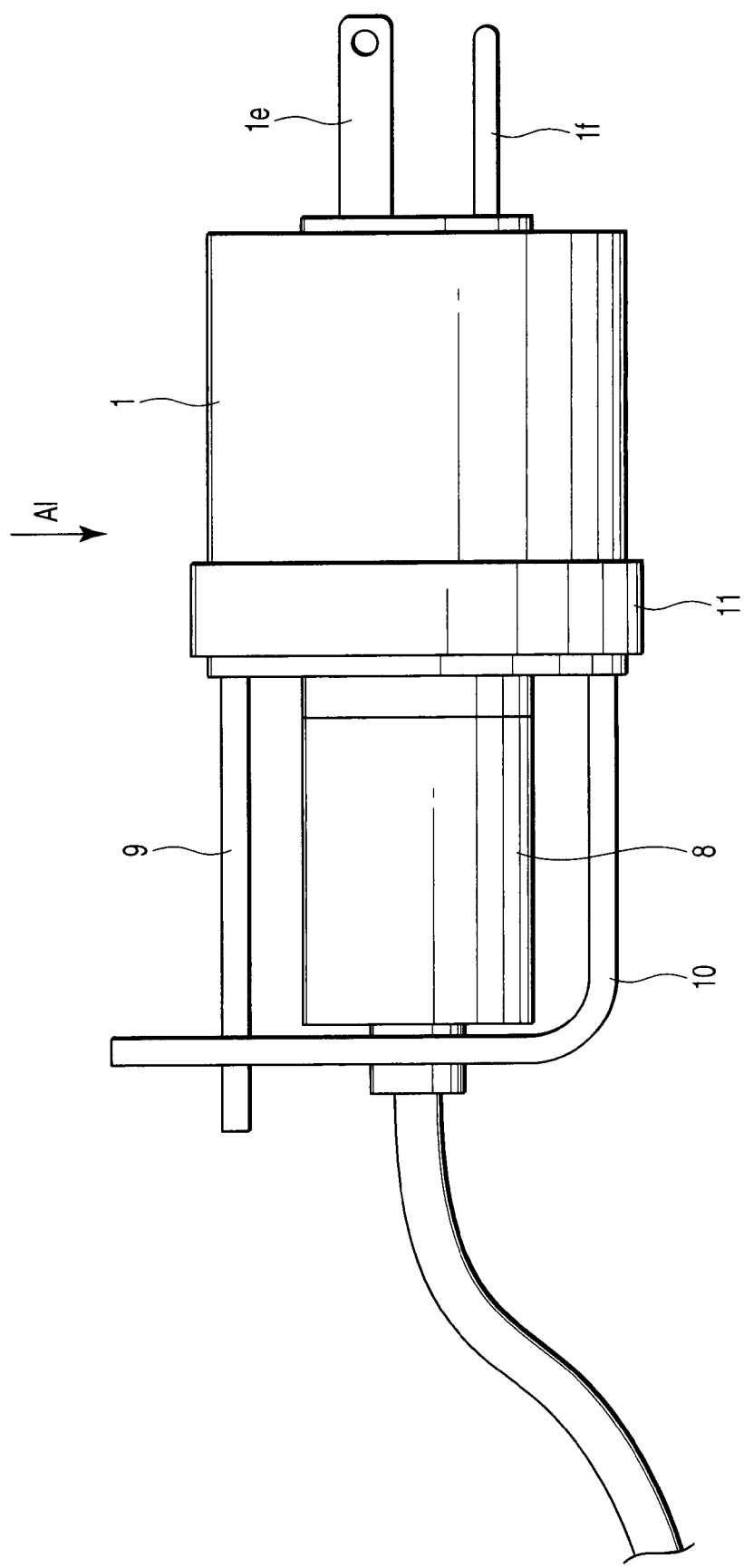
FIG. 2 is a side view showing an appearance of a reporting apparatus in FIG. 1.
Figure 3:
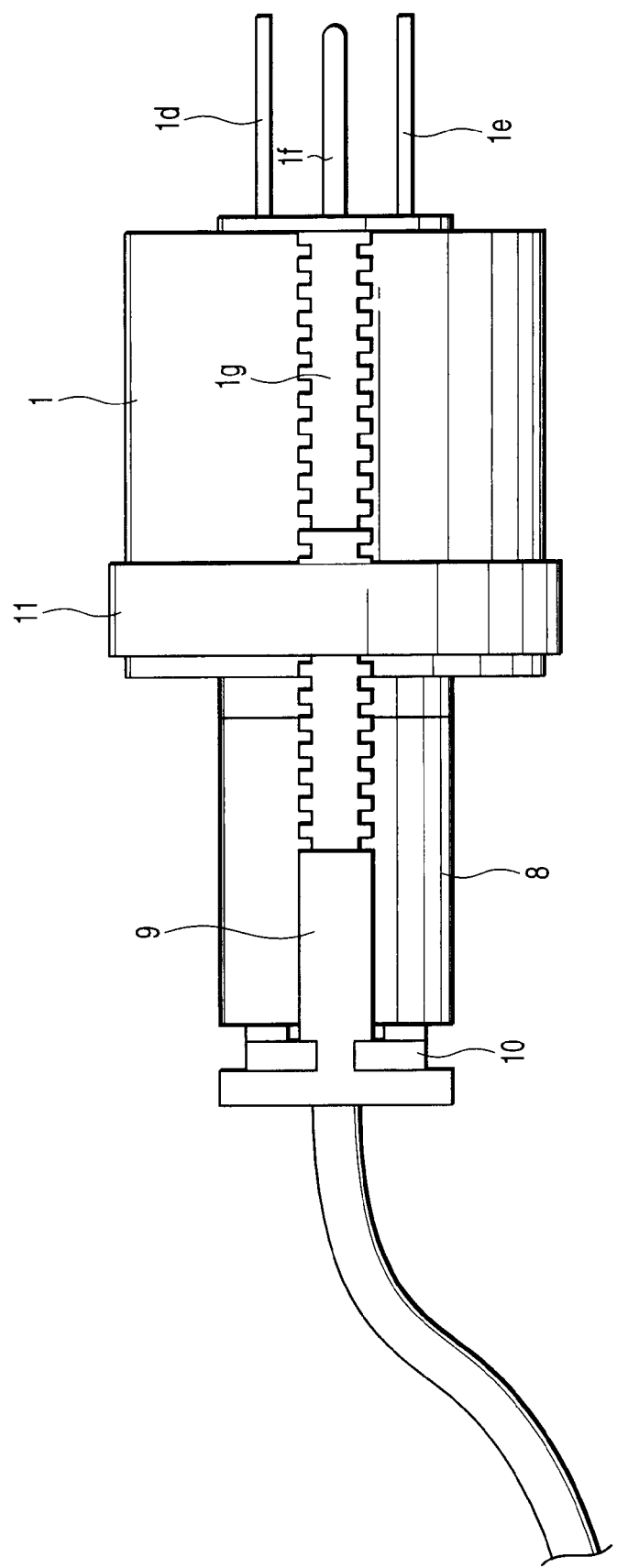
FIG. 3 is a plan view showing an appearance of the reporting apparatus as seen from a direction indicated by an arrow A1 in FIG. 2.
Figure 4:
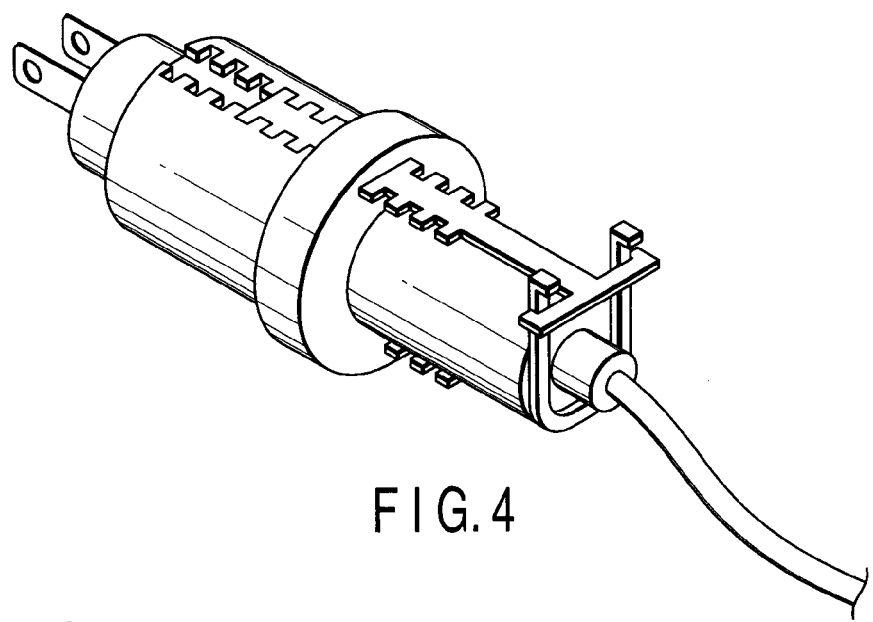
FIG. 4 is a perspective view showing an appearance of the reporting apparatus in FIG. 1.
Figure 5:
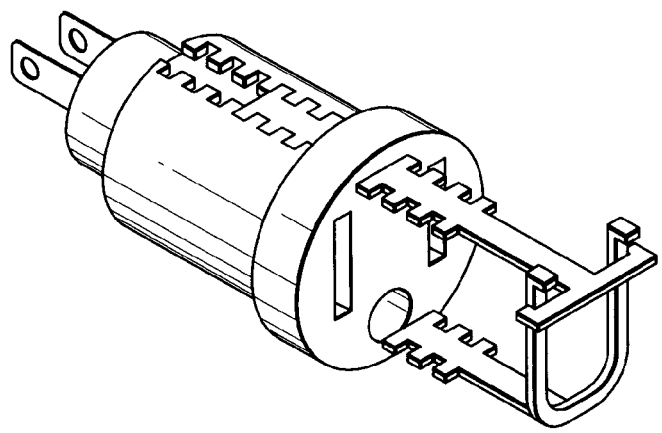
FIG. 5 is a perspective view showing an appearance of the reporting apparatus in FIG. 1.

FIG. 2 is a side view showing an appearance of the reporting apparatus 1. FIG. 3 is a plan view showing the appearance of the reporting apparatus 1 from a direction indicated by an arrow A1 in FIG. 2. FIGS. 4 and 5 are perspective views showing the appearance of the reporting apparatus. It is to be noted that FIGS. 2 to 4 show a state where the reporting apparatus is attached to the power supply plug of the electrical device, and FIG. 5 shows a state where it is not attached to the power supply plug of the electrical device.

In the reporting apparatus 1, as shown in FIG. 5, contacts 1a, 1b, and 1c are respectively provided in three insertion openings provided at one end. When three contacts provided to the power supply plug 8 of the electrical device are inserted into these insertion openings, these three blades come into contact with the contacts 1a, 1b, and 1c. Contacts 1d, 1e, and 1f are provided at the other end of the reporting apparatus 1, and the three contacts of the power supply plug 8 that have come into contact with the contacts 1a, 1b, and 1c are respectively electrically connected with the contacts 1d, 1e, and 1f.

Figure 6:
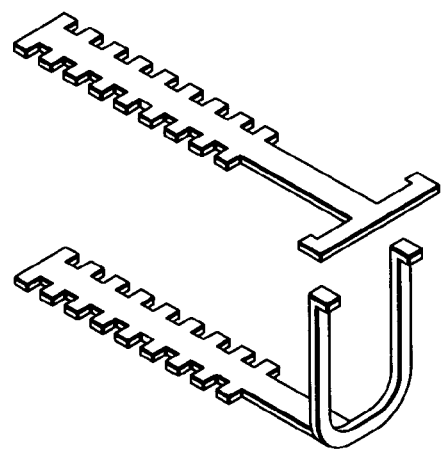
FIG. 6 is a perspective view showing an appearance of fixing brackets depicted in FIGS. 4 and 5.

The reporting apparatus 1 is fixed to the power supply plug 8 through such fixing brackets 9, 10, and 11 as shown in FIG. 6. The fixing bracket 9 has a shape obtained by notching both sides of a distal end of a part corresponding to a T-shaped vertical bar in a T-shaped metal sheet at a fixed pitch. A groove 1g in which the notched part of the fixing bracket 9 is fitted is formed in the reporting apparatus 1. The fixing bracket 10 has a shape obtained by bending a Y-shaped metal sheet at a position close to a bifurcation of the Y shape at a substantially right angle and notching both sides of a distal end of a part corresponding a lower vertical bar of the Y shape at a fixed pitch. Like the groove 1g, a groove in which the notched part of the fixing bracket 10 is fitted is formed in the reporting apparatus 1 on the opposite side of the groove 1g. The fixing bracket 10 is fitted in this groove. Respective ends of the part corresponding to the bifurcated part of the Y shape in the fixing bracket 10 are engaged with both ends of the part corresponding to a horizontal bar of the T shape in the fixing bracket 9. As a result, the part corresponding to the bifurcated part of the Y shape in the fixing bracket 10 functions to prevent the power supply plug 8 from coming off. Since the fixing brackets 9 and 10 are notched at a fixed pitch, a relative positional relationship of the fixing brackets 9 and 10 and the reporting apparatus 1 can be changed to adapt to the power supply plugs 8 having various sizes. The fixing bracket 11 presses the fixing brackets 9 and 10 to maintain a state where the notches of these brackets are fitted in the grooves, and prevents the reporting apparatus 1 from coming off the power supply plug 8.

Figure 7:
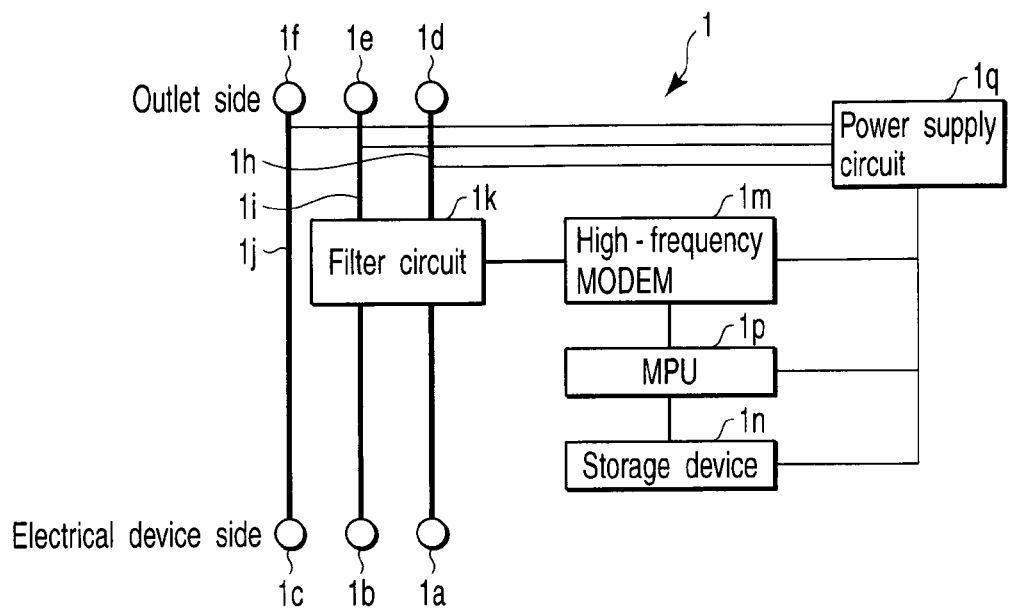
FIG. 7 is a block diagram showing a specific configuration of the reporting apparatus in FIG. 1.

FIG. 7 is a block diagram showing a specific configuration of the reporting apparatus 1.

The reporting apparatus 1 includes the contacts 1a, 1b, and 1c, the contacts 1d, 1e, and 1f, connection lines 1h, 1i, and 1j, a filter circuit 1k, a high-frequency modulator/demodulator (MODEM) 1m, a storage device 1n, a microprocessing unit (MPU) 1p, and a power supply circuit 1q.

The connection lines 1h, 1i, and 1j connect the contacts 1a, 1b, and 1c with the contacts 1f, 1e, and 1d, respectively. It is to be noted that the contacts 1c and 1f are provided for grounding, and the connection line 1j is a grounding line.

The filter circuit 1k separates a low-frequency alternating voltage through the connection lines 1h and 1i from a high-frequency signal superimposed on this alternating voltage. The filter circuit 1k supplies a high-frequency signal component alone to the high-frequency MODEM 1m, and feeds the alternating voltage to the electrical device side. Moreover, the filter circuit 1k superimposes a high-frequency signal output from the high-frequency MODEM 1m on the alternating voltage to be supplied to the outlet side only. As a result, the high-frequency signal can be prevented from being supplied to the electrical device, thus avoiding, e.g., an erroneous operation of the electrical device.

The high-frequency MODEM 1m demodulates the high-frequency signal fed from the filter circuit 1k to extract information. Additionally, the high-frequency MODEM 1m modulates a signal output from the MPU 1p to generate a high-frequency signal, and supplies this signal to the connection lines 1h and 1i via the filter circuit 1k.

The storage device 1n includes, e.g., a read only memory (ROM). The storage device 1n holds software that drives the MPU 1p and device identification information. The device identification information is identification information inherent to the reporting apparatus 1 having the storage device 1n provided therein, and it is utilized as identification information of the electrical device to which this reporting apparatus 1 is attached.

The MPU 1p can read information transmitted through the connection lines 1h and 1i by using the high-frequency MODEM 1m. Further, the MPU 1p can read information stored in the storage device 1n as required. The MPU 1p operates in accordance with software stored in the storage device 1n, and generates reporting information including the device identification information stored in the storage device 1n. The MPU 1p outputs the generated reporting information to the high-frequency MODEM 1m. It is to be noted that the MPU 1p includes a random access memory or a clock signal generation circuit required to execute a program.

The power supply circuit 1q is connected with the connection lines 1h, 1i, and 1j. The power supply circuit 1q obtains a power from the outlet via the connection lines 1h, 1i, and 1j to effect transformation, and supplies the transformed power to the high-frequency MODEM 1m, the storage device 1n, and the MPU 1p.

Figure 8:
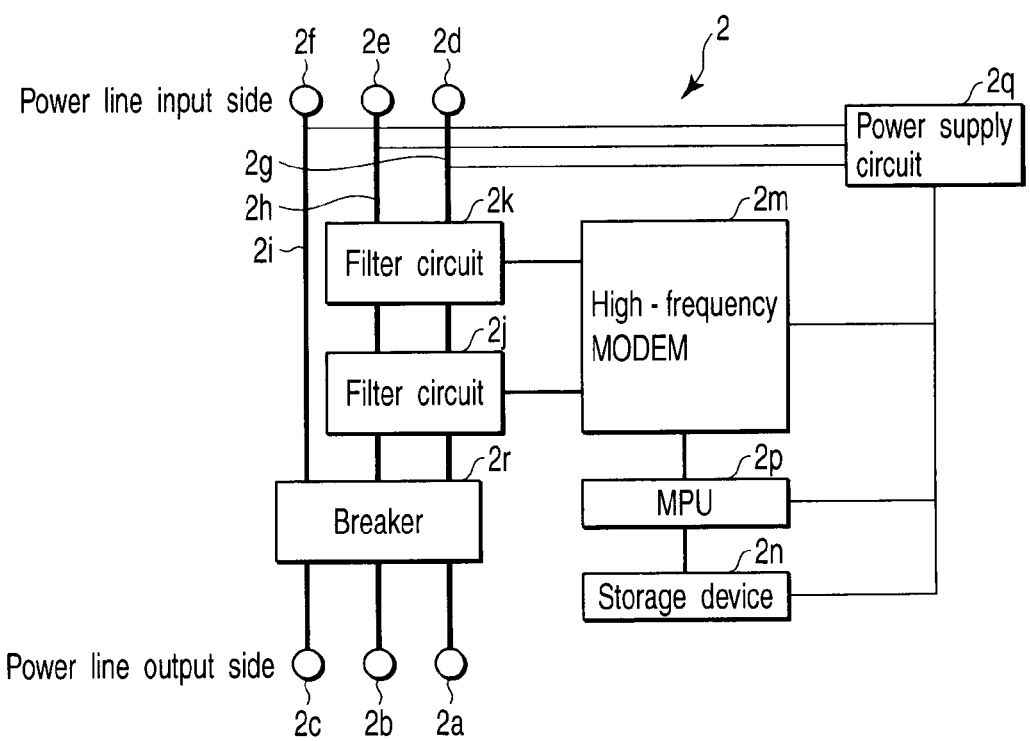
FIG. 8 is a block diagram showing a specific configuration of a sub-collection apparatus in FIG. 1.

FIG. 8 is a block diagram showing a specific configuration of the sub-collection apparatus 2.

The sub-collection apparatus 2 includes contacts 2a, 2b, 2c, 2d, 2e, and 2f, connection lines 2g, 2h, and 2i, filter circuits 2h and 2k, a high-frequency MODEM 2m, a storage device 2n, an MPU 2p, a power supply circuit 2q, and a breaker 2r.

Three power supply lines belonging to the power supply system 6 on the power line output side (the downstream side) are respectively connected with the contacts 2a, 2b, and 2c. Three power supply lines belonging to the power supply system 6 on the power line input side (the upstream side) are respectively connected with the contacts 2d, 2e, and 2f. The connection lines 2g, 2h, and 2i respectively connect the contacts 2a, 2b, and 2c with the contacts 2d, 2e, and 2f, namely, connect the three power supply lines on the power line output side with the three power supply lines on the power line input side.

The filter circuit 2j separates a low-frequency alternating voltage flowing through the connection lines 2g and 2h from a high-frequency signal superimposed on this alternating voltage. The filter circuit 2j supplies a high-frequency signal component to the high-frequency MODEM 2m. Furthermore, the filter circuit 2j superimposes a high-frequency signal output from the high-frequency MODEM 2m on the alternating voltage to be supplied to the power line output side alone.

The filter circuit 2k separates a low-frequency alternating voltage flowing from the power line input side to the connection lines 2g and 2h from a high-frequency signal superimposed on this alternating voltage. The filter circuit 2k supplies a high-frequency signal component alone to the high-frequency MODEM 2m, and feeds the alternating voltage to the power line output side. Moreover, the filter circuit 2k superimposes a high-frequency signal output from the high-frequency MODEM 2m on the alternating voltage to be supplied to the power line input side.

Figure 9:
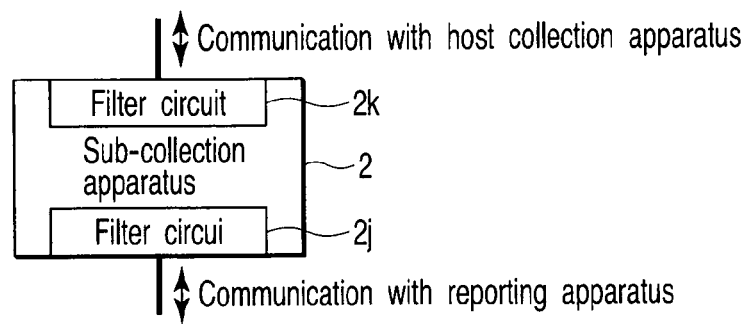
FIG. 9 is a view showing a role of a filter circuit depicted in FIG. 8.

These filter circuits 2j and 2k avoid an interference of communication with the power line output side and communication with the power line input side, and prevents a reduction in a power supply quality due to excessive flow of a signal that is unnecessary for the power supply system. That is, as shown in FIG. 9, the sub-collection apparatus 2 can individually perform communication with the reporting apparatus 1 through the filter circuit 2j, and communication with the host collection apparatus 3 through the filter circuit 2k. It is to be noted that the sub-collection apparatus 2 can be connected on multiple stages. When the sub-collection apparatus 2 are connected on multiple stages, the filter circuit 2k in the sub-collection apparatus 2 on the upstream side and the filter circuit 2j in the sub-collection apparatus 2 on the downstream side can be used to effect communication between the sub-collection apparatus 2.

The high-frequency MODEM 2m demodulates high-frequency signals fed from the filter circuits 2k and 2j to extract information. Additionally, the high-frequency MODEM 2m modulates a signal output from the MPU 2p to generate a high-frequency signal, and supplies this signal to the power line input side via the filter circuit 2k or to the power line output side via the filter 2j.

The storage device 2n includes, e.g., a ROM. The storage device 2n holds software that drives the MPU 2p and system identification information. The system identification information is identification information inherent to the sub-collection apparatus 2 having this storage device 2n provided thereto, and it is utilized as identification information of the power supply system 6 to which this sub-collection apparatus 2 is connected.

The MPU 2p can read information transmitted through the connection lines 2g and 2h by using the high-frequency MODEM 2m. Furthermore, the MPU 2p can read information stored in the storage device 2n as required. The MPU 2p processes received reporting information to include the system identification information stored in the storage device 2n, and outputs the processed reporting information to the high-frequency MODEM 2m. Moreover, the MPU 2p can transmit, e.g., a signal requesting the reporting apparatus 1 to transmit information or a signal instructing to remedy software via the high-frequency MODEM 2m and the filter circuit 2j. It is to be noted that the MPU 2p includes a random access memory or a clock signal generation circuit required to execute a program.

The power supply circuit 2q is connected with the connection lines 2g, 2h, and 2i. The power supply circuit 2q acquires a power from the power supply line via the connection lines 2g, 2h, and 2i to transform this power, and supplies the transformed power to the high-frequency MODEM 2m, the storage device 2n, and the MPU 2p.

The breaker 2r disconnects the power line output side when a current flowing through the connection line 2g, 2h, or 2i becomes excessive due to leakage of current or a short circuit.

Figure 10:
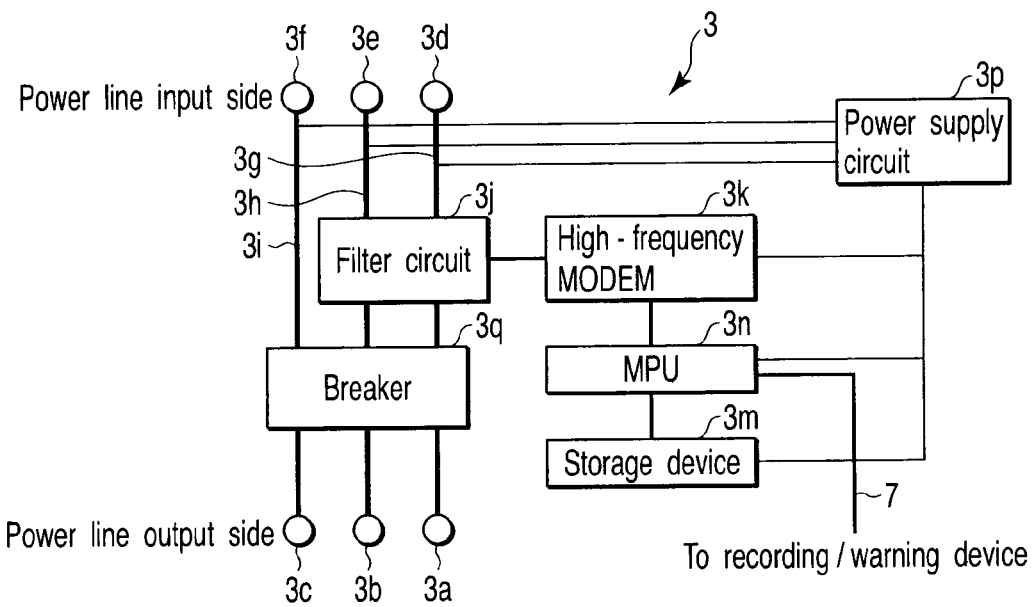
FIG. 10 is a block diagram showing a specific configuration of a host collection apparatus in FIG. 1.

FIG. 10 is a block diagram showing a specific configuration of the host collection apparatus 3 depicted in FIG. 1.

The host collection apparatus 3 includes contacts 3a, 3b, 3c, 3d, 3e, and 3f, connection lines 3g, 3h, and 3i, a filter circuit 3j, a high-frequency MODEM 3k, a storage device 3m, an MPU 3n, a power supply circuit 3p, and a breaker 3q.

Three power supply lines on the power line output side (the downstream side) through which a power is supplied to the plurality of power supply systems 6 are respectively connected with the contacts 3a, 3b, and 3c. Three power supply lines on the power line input side (the upstream side) through which a power is supplied to the plurality of power supply systems 6 are respectively connected with the contacts 3d, 3e, and 3f. The connection lines 3g, 3h, and 3i connect the contacts 3a, 3b, and 3c with the contacts 3d, 3e, and 3f, namely, connect the three power supply lines on the power line output side with the three power supply lines on the power line input side, respectively.

The filter circuit 3j separates a low-frequency alternating voltage flowing from the power line output side to the connection lines 3g and 3h from a high-frequency signal superimposed on this alternating voltage. The filter circuit 3j supplies a high-frequency signal component alone to the high-frequency MODEM 3k, and feeds the alternating voltage to the power line input side. Additionally, the filter circuit 3j superimposes a high-frequency signal output from the high-frequency MODEM 3k on the alternating voltage to be supplied to the power line output side alone.

Figure 11:
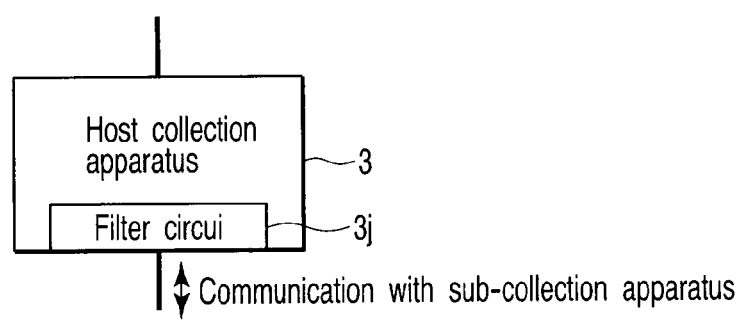
FIG. 11 is a view showing a role of a filter circuit in FIG. 10.

This filter circuit 3j enables communication with the power line output side, and prevents a reduction in a power supply quality due to a flow of excessive signals that are unnecessary for the power supply system. That is, as shown in FIG. 11, the host collection apparatus 3 uses the filter circuit 3j to enable communication with the sub-collection apparatus 3.

The high-frequency MODEM 3k demodulates a high-frequency signal supplied from the filter circuit 3j to extract reporting information. Further, the high-frequency MODEM 3k modulates a signal output from the MPU 3n to generate a high-frequency signal, and supplies this signal to the power line output side through the filter circuit 3j.

The storage device 3m includes, e.g., a ROM. The storage device 3m holds software that drives the MPU 3n and system identification information.

The MPU 3n can read information transmitted through the connection lines 3g and 3h by using the high-frequency MODEM 3k. Furthermore, the MPU 3n can read information stored in the storage device 3m as required. The MPU 3n processes received reporting information to include the system identification information stored in the storage device 3m, and supplies the processed reporting information to the recording/warning apparatus 4. Moreover, the MPU 3n can supply, e.g., a signal requesting the sub-collection apparatus 2 to transmit information or a signal instructing remedying software through the high-frequency MODEM 3k and the filter circuit 3j. It is to be noted that the MPU 3n includes a random access memory or a clock signal generation circuit required to execute a program.

The power supply circuit 3p is connected with the connection lines 3g, 3h, and 3i. The power supply circuit 3p acquires a power from the power supply lines through the connection lines 3g, 3h, and 3i to transform this power, and supplies the transformed power to the high-frequency MODEM 3k, the storage device 3m, and the MPU 3n.

The breaker 3q disconnects the power line output side when a current flowing through the connection lines 3g, 3h, or 3i becomes excessive due to leakage of current or a short circuit.

Figure 12:
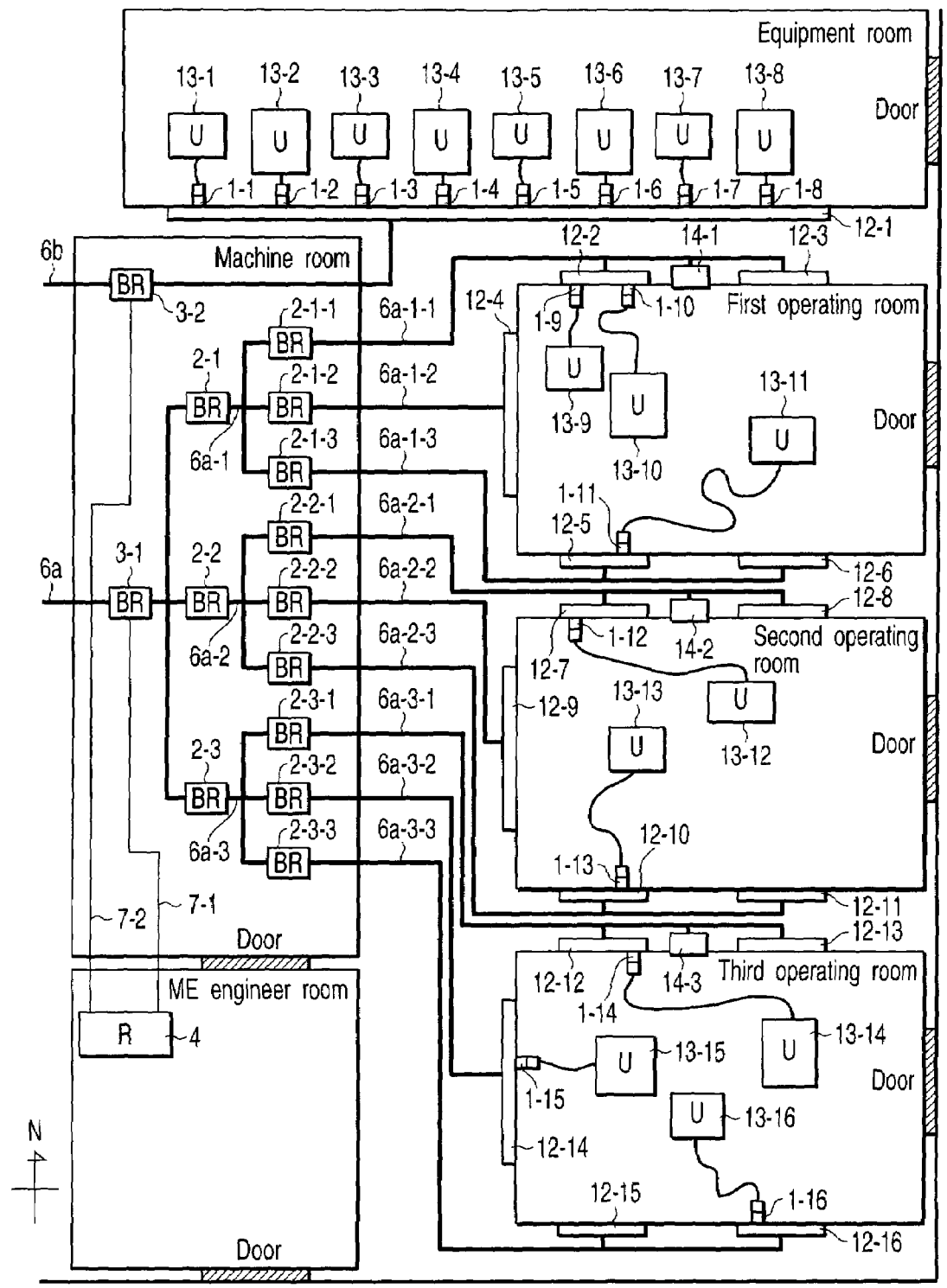
FIG. 12 is a view showing a specific example where a management system according to the first embodiment is applied to manage a use status of each electrical device in a hospital.

FIG. 12 is a view showing a specific example where the thus configured device use a status management system according to the first embodiment is applied to manage a use status of each electrical device in a hospital.

In FIG. 12, an ME engineer room is a room where an ME engineer resides to perform an operation of, e.g., a power supply or maintenance of an operating device. The recording/warning apparatus 4 is installed in this ME engineer room.

A machine room is a room where a power supply facility or air-conditioning equipment is accommodated. The 12 sub-collection apparatus 2 and the two host collection apparatus 3 are installed in this machine room. It is to be noted that reference numerals 2-1 to 2-3, 2-1-1 to 2-1-3, 2-2-1 to 2-2-3, and 2-3-1 to 2-3-3 are respectively given when the 12 sub-collection apparatus 2 must be discriminated from each other, and reference numerals 3-1 and 3-2 are given when the two host collection apparatus 3 must be discriminated from each other in the following description. The host collection apparatus 3-1 and 3-2 are respectively connected with the recording/warning apparatus 4 through the different dedicated communication lines 7. It is to be noted that reference numerals 7-1 and 7-2 are given when the two dedicated communication lines 7 must be discriminated from each other in the following description.

An equipment room is a room where various kinds of electrical devices like a portable operating device or consumable goods are stored. An outlet unit 12-1 is disposed on a wall surface of the equipment room.

An operating room is a room where an operation is carried out, and there are three rooms, i.e., a first to a third rooms in the example depicted in FIG. 12.

In regard to the first to the third operating rooms, many power supply systems are provided. In the following description, when these power supply systems 6 must be discriminated from each other, reference numerals 6a, 6b, 6a-1 to 6a-3, 6a-1-1 to 6a-1-3, 6a-2-1 to 6a-2-3, and 6a-3-1 to 6a-3-3 are given. The power supply systems 6a and 6b are power supply systems drawn from a non-illustrated power supply room to the machine room. The power supply system 6a is divided into three to form the power supply systems 6a-1, 6a-2, and 6a-3. Furthermore, each of the power supply systems 6a-1, 6a-2, and 6a-3 is divided into three to form the power supply systems 6a-1-1 to 6a-1-3, 6a-2-a to 6a-2-3, and 6a-3-1 to 6a-3-3.

In the first operating room, outlet units 12-2 and 12-3 are disposed on a wall surface on a north side, and outlet unit 12-4 is disposed on a wall surface on a west side, and outlet units 12-5 and 12-6 are disposed on a wall surface on a south side, respectively. In the second operating room, outlet units 12-7 and 12-8 are disposed on a wall surface on a north side, an outlet unit 12-9 is disposed on a wall surface on a west side, and outlet units 12-10 and 12-11 are disposed on a wall surface on a south side, respectively. In the third operating room, outlet units 12-12 and 12-13 are disposed on a wall surface on a north side, an outlet unit 12-14 is disposed on a wall surface on a west side, and outlet units 12-15 and 12-16 are disposed on a wall surface on a south side, respectively. Each of these outlet units 12-1 to 12-16 includes one or more outlets.

For example, as shown in FIG. 13, the outlet unit 12-2 includes the four outlets 5, and these outlets 5 are all connected with the power supply system 6a-1-a. The power supply system 6a-1-1 is connected with the outlets 5 provided in the outlet units 12-2 and 12-3, the power supply system 6a-1-2 is connected with the outlets 5 provided in the outlet unit 12-4, and the power supply system 6a-1-3 is connected with the outlets 5 provided in the outlet units 12-5 and 12-6.

In FIG. 12, the power supply systems 6a-1-1, 6a-1-2, and 6a-1-3 are associated with the wall surfaces on the north side, the west side, and the south side in the first operating room, and the power supply system 6a-1 is associated with the first operating room.

The power supply system 6a-2-1 is connected with the outlets provided in the outlet units 12-7 and 12-8, the power supply system 6a-2-2 is connected with the outlets provided in the outlet unit 12-9, and the power supply system 6a-2-3 is connected with the outlets provided in the outlet units 12-10 and 12-11. Therefore, the power supply systems 6a-2-1, 6a-2-2, and 6a-2-3 are respectively associated with the wall surfaces on the north side, the west side, and the south side in the second operating room, and the power supply system 6a-2 is associated with the second operating room.

The power supply system 6a-3-1 is connected with the outlets provided in the outlet units 12-12 and 12-13, the power supply system 6a-3-2 is connected with the outlets provided in the outlet unit 12-14, and the power supply system 6a-3-3 is connected with the outlets provided in the outlet units 12-15 and 12-16. Therefore, the power supply systems 6a-3-1, 6a-3-2, and 6a-3-3 are respectively associated with the wall surfaces on the north side, the west side, and the south side in the third operating room, and the power supply system 6a-3 is associated with the third operating room.

In the equipment room, the outlet unit 12-1 is disposed on the wall surface thereof. The power supply system 6b is connected with the outlets provided in the outlet unit 12-1. Therefore, the power supply system 6b is associated with the equipment room.

Alarm units 14 are respectively disposed on the wall surfaces on the north sides in the first to the third operating rooms. It is to be noted that, when the alarm units 14 must be discriminated from each other, reference numerals 14-1 to 14-3 are given. The alarm unit 14 receives an instruction from the recording/warning apparatus 4 via the power supply system 6 to give a warning (or a caution).

It is to be noted that a power is also used for lightings, automatic doors, air conditioners, and others in the respective rooms, but these members are omitted in the drawings.

An operation of the management system configured as shown in FIG. 12 will now be explained.

The reporting apparatus 1 are attached to power supply plugs of electrical devices 13 as management targets. It is to be noted that reference numerals 1-1 to 1-16 are given when these reporting apparatus 1 must be discriminated from each other and reference numerals 13-1 to 13-16 are given when the electrical devices 13 must be discriminated from each other in the following description. In the case of a hospital, as the electrical devices 13, a vital monitor, an anesthesia machine, an electric scalpel, an ultrasonic diagnosis equipment, an intravenous feed, a bed warmer, a surgical bed, a harmonic scalpel, an endoscope, a heart-lung machine, a lighting, an electrophysiologic test device, a personal computer, a CD player, a cassette player, a radio, a cutting machine, a camera, and others are utilized.

When an electrical device as a management target is connected with the outlet, the reporting apparatus 1 attached to this electrical device is connected with the power supply system 6. For example, when the electrical device 13-1 is connected with the outlet provided in the outlet unit 12-1 in the equipment room 13-1 as shown in FIG. 12, the reporting apparatus 1-1 attached to a power supply connector of this electrical device 13-1 is connected with the power supply system 6b. Then, in the reporting apparatus 1-1, as shown in FIG. 7, a power generated by the power supply circuit 1q is supplied to the MPU 1p to activate the MPU 1p. At this time, the MPU 1p reads device identification information of the reporting apparatus 1-1 from the storage device 1n, and generates a signal including reporting information that includes this device identification information. A high-frequency signal obtained by modulating this signal in the high-frequency MODEM 1m is supplied to the outlet side through the filter circuit 1k. The high-frequency signal supplied from the reporting apparatus 1-1 in this manner is fed to the power supply system 6b from the outlet provided in the outlet unit 12-1.

Thereafter, the high-frequency signal indicative of the reporting information is repeatedly transmitted at every predetermined timing as long as the reporting apparatus 1-1 stays connected with the power supply system 6b. The reporting apparatus 1-1 may transmit the high-frequency signal at an arbitrary timing, but it can be considered that the reporting apparatus 1-1 transmits this signal in each fixed cycle. It is practically sufficient for one cycle in this example to be approximately 1 second.

The other reporting apparatus 1 also operate like the reporting apparatus 1-1. However, a destination of the high-frequency signal is the power supply system to which the reporting apparatus 1 is connected. For example, in the state shown in FIG. 12, the high-frequency signal is transmitted from the reporting apparatus 1-9 to the power supply system 6a-1-1, it is transmitted from the reporting apparatus 1-11 to the power supply system 6a-1-3, and it is transmitted from the reporting apparatus 1-15 to the power supply system 6a-3-2, respectively.

Meanwhile, it can be considered that the plurality of reporting apparatus 1 substantially simultaneously transmit the high-frequency signals by coincidence. When such a situation arises, collision of the signals occurs, and all the transmitted signals become abnormal. Thus, when the signals become abnormal, each reporting apparatus waits for a time determined by a random number, and then the high-frequency MODEM 1*m* retries transmission of the high-frequency signals. It is to be noted that, if a cycle of transmission of the high-frequency signal by each reporting apparatus 1 is approximately one second, a frequency of transmission of the signal via the power supply system is very small on an average. Therefore, the collision rarely occurs, and the small number of times of retry assures successful communication even if the collision occurs.

As explained above, the high-frequency signal transmitted to the power supply system 6*b* reaches the host collection apparatus 3-2. Then, in the host collection apparatus 3-2, as shown in FIG. 10, this high-frequency signal is separated from an alternating voltage by the filter circuit 3*j*, and demodulated by the high-frequency MODEM 3*k* so that reporting information is extracted. The MPU 3*n* processes the extracted reporting information to include system identification information stored in the storage device 3*m*, and transmits the processed reporting information to the recording/warning apparatus 4.

On the other hand, the high-frequency signal transmitted from, e.g., the reporting apparatus 1-9 to the power supply system 6*a*-1-1 reaches the sub-collection apparatus 2-1-1. Then, in the sub-collection apparatus 2-1-1, as shown in FIG. 8, this high-frequency signal is separated from an alternating voltage by the filter circuit 2*j*, and demodulated by the high-frequency MODEM 2*m* so that reporting information is extracted. The MPU 2*p* processes the extracted reporting information to include system identification information stored in the storage device 2*n*. Further, a signal including this processed reporting information is generated, and a high-frequency signal obtained by modulating this signal in the high-frequency MODEM 2*m* is supplied to the power line input side through the filter circuit 2*k*. The high-frequency signal fed from the sub-collection apparatus 2-1-1 in this manner is supplied to the power supply system 6*a*-1 and reaches the sub-collection apparatus 2-1. Then, the sub-collection apparatus 2-1 transmits the high-frequency signal to the power supply system 6*a* like the sub-collection apparatus 2-1-1. The high-frequency signal supplied to the power supply system 6*a* reaches the host collection apparatus 3-1. In this manner, the reporting information is relayed by the sub-collection apparatus 2-1 to 2-3, 2-1-1 to 2-1-3, 2-2-1 to 2-2-3, and 2-3-1 to 2-3-3.

When the high-frequency signal arrives as explained above, the host collection apparatus 3-1 transmits the reporting information to the recording/warning apparatus 4 like the host collection apparatus 3-2.

In this manner, the reporting information transmitted from each reporting apparatus 1 has the system identification information of the sub-collection apparatus 2 that has relayed this reporting information or the host collection apparatus 3 added thereto, and is supplied to the recording/warning apparatus 4 in this state.

First and second databases depicted in, e.g., FIGS. 14 and 15 that are created based on such an actual system configuration as shown in FIG. 12 are respectively prepared in the recording/warning apparatus 4.

The first database includes a data record in which the system identification information, information of a location, and information of an outlet position are associated with each other. Information concerning the power supply system on the most downstream side depicted in FIG. 12, i.e., the power supply system 6 to which the outlet unit 12 is connected is written in the data record included in the first database. As the system identification information, the system identification information of the sub-collection apparatus 2 or the host collection apparatus 3 connected with the power supply system 6 is written. As the location, a name of a room to which the power supply system 6 is wired is written. As the outlet position, a position at which the outlet unit 12 connected with the power supply system 6 is disposed in the above-explained location. For example, in the case of a first data record in FIG. 14, information concerning the power supply system 6*a*-1-1 is written. Since the sub-collection apparatus 2-1-1 is connected with the power supply system 6*a*-1-1, "ID2-1-1" allocated to the sub-collection apparatus 2-1-1 is written as the system identification information. Since the power supply system 6*a*-1-1 is wired to be connected with the outlet unit 12 disposed on the wall surface on the north side in the first operating room, the "first operation room" is written as the location, and the "north wall surface" is written as the outlet position. It is to be noted that information of the outlet position may not be written when the outlet positions do not have to be discriminated from each other.

The second database includes a data record in which device identification information, information of a corresponding device, and information of use conditions are associated with each other. Information concerning each electrical device 13 as a management target is written in the data record included in the second database. As the device identification information, device identification information included in the reporting apparatus 1 attached to the electrical device 13 is written. As the corresponding device, a name of the electrical device 13 is written. As the use conditions, conditions, e.g., a limitation when using the electrical device 13 written as the corresponding device are written. For example, in the case of a first data record shown in FIG. 13, information indicating that the reporting apparatus 1 to which "ID1-1" is allocated as the device identification information is attached to the electrical device called an "anesthesia machine" and the "anesthesia machine" is out of order is written.

Figure 16:
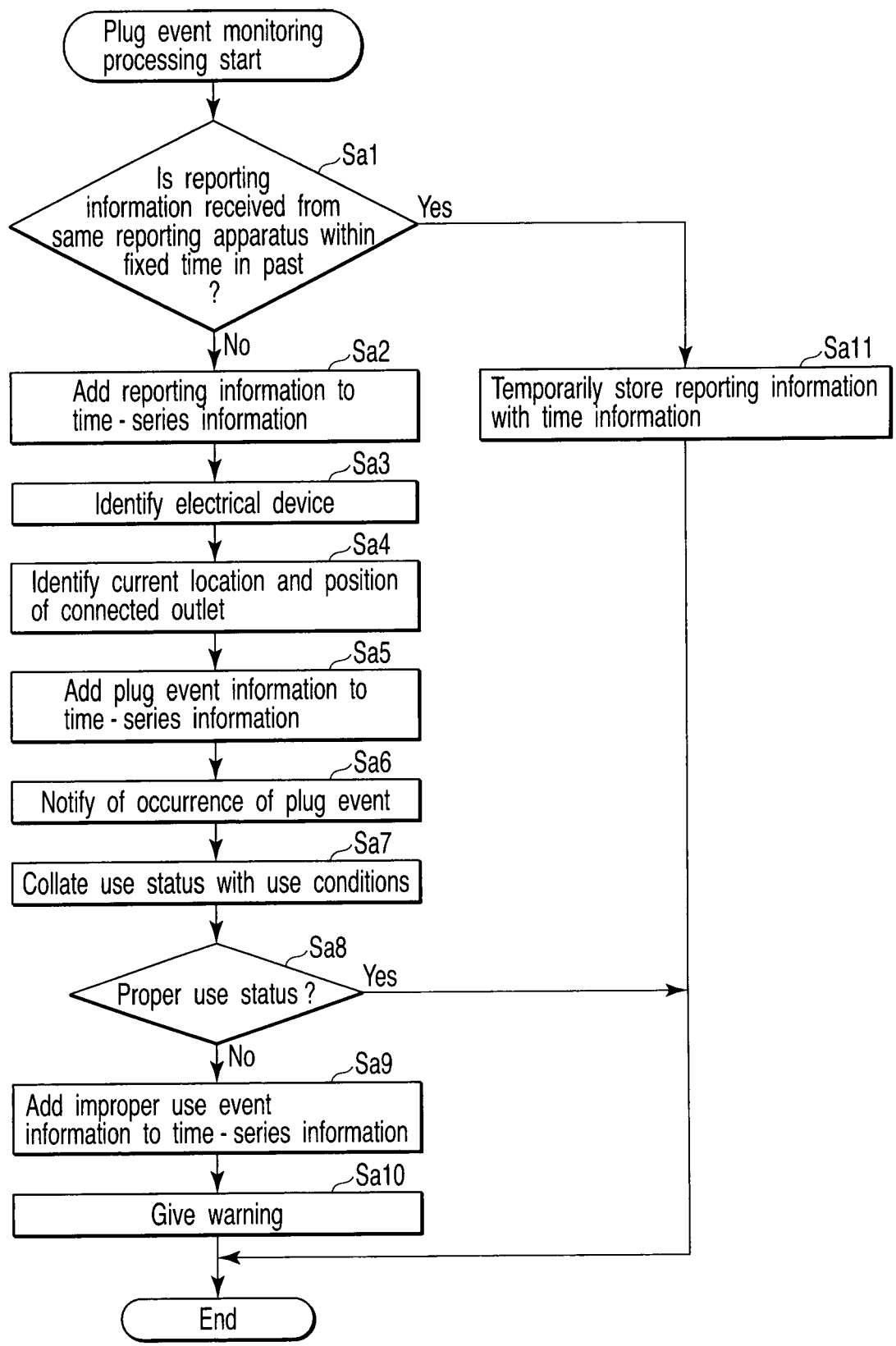
FIG. 16 is a flowchart of plug event monitoring processing in the first embodiment.

When the recording/warning apparatus 4 receives reporting information from the host collection apparatus 3, it starts such plug event monitoring processing as shown in FIG. 16.

At a step Sa1, the recording/warning apparatus 4 confirms whether it has received other reporting information within a fixed time (e.g., five seconds) in the past from the reporting apparatus that has transmitted the current reporting information. This confirmation can be carried out by analyzing time-series information recorded at a step Sa2 and reporting information temporarily stored at a step Sa10 as will be explained later.

If the same reporting information as the currently received information has not been accepted within the fixed time in the past, this reporting information concerns the electrical device 13 newly connected with the outlet 5. This situation, in which the electrical device 13 is newly connected with the outlet 5, is called "a plug event". Thus, the recording/warning apparatus 4 advances to a step Sa2 from the step Sa1. At the step Sa2, the recording/warning apparatus 4 adds the received reporting information and time information indicative of a clock time at this moment to the time-series information recorded in a storage medium included in or provided outside the recording/warning apparatus 4.

At the step Sa3, the recording/warning apparatus 4 searches in the second database by using the device identification information included in the currently received reporting information as a key to identify the electrical device 13 newly connected with the outlet 5. For example, when the device identification information included in the reporting information is "ID1-3" and the information depicted in FIG. 15 is written in the second database, the recording/warning apparatus 4 identifies the electrical device 13 newly connected with the outlet 5 as a "cutting machine".

Furthermore, at a step Sa4, the recording/warning apparatus 4 searches in the first database by using the system identification information added to the currently received reporting information as a key to identify a current location of the identified electrical device 13 and a position of the outlet. For example, when the corresponding system identification information is "ID2-2-3" and the information shown in FIG. 14 is written in the first database, the recording/warning apparatus 4 identifies the current location of the newly connected electrical device 13 as the second operating room and the position of the connected outlet 5 as a south wall surface. It is to be noted that, if the plurality of pieces of the system identification information are added to the currently received reporting information, this processing is carried out based on the oldest system identification information in these pieces of system identification information added to the reporting information.

At a step Sa5, the recording/warning apparatus 4 adds plug event information and time information indicative of a clock time at this instant to the time-series information. The plug event information represents the identified electrical device 13, the current location, the outlet position, and others.

At a step Sa6, the recording/warning apparatus 4 notifies a manager, e.g., an ME engineer of occurrence of a plug event. This notification is carried out by displaying an image showing a name of the identified electrical device 13, the current location, or the outlet position in a display device included in or externally provided in the recording/warning apparatus 4.

At a step Sa7, the recording/warning apparatus 4 collates a use status of the currently connected electrical device 13 with use conditions that are written in the second database in association with the device identification information included in the currently received reporting information. Moreover, at a step Sa8, the recording/warning apparatus 4 confirms whether the electrical device is in a proper use status. For example, if the electrical device 13 with a written message "out of order" as use conditions is connected, this is improper. Additionally, if the current location of the electrical device 13 like a cutting machine having a written message "unusable in clean room" as use conditions since it produces dust is identified as a room called a clean room, this is improper. In such a case, the recording/warning apparatus 4 determines that the electrical device is not in a proper use status, and determines it as occurrence of an improper connection event. In this case, the recording/warning apparatus 4 advances to a step Sa9 from the step Sa8. At the step Sa9, the recording/warning apparatus 4 adds improper use event information and time information indicative of a clock time at this instant to the time-series information. The improper use event information is indicative of the identified electrical device 13, the current location, the outlet position, and a reason of determining the improper use.

At a step Sa10, the recording/warning apparatus 4 gives a warning indicating that the current connection of the electrical device 13 is not appropriate. This warning may continue until a predetermined time elapses, or may continue until a manager issues a cancel instruction, or may continue until the current connection of the electrical device 13 is released.

Further, when giving the warning is finished, the recording/warning apparatus 4 terminates the plug event monitoring processing. It is to be noted that, if it is determined that the electrical device is in a proper use status at the step Sa8, the recording/warning apparatus 4 terminates the plug event monitoring processing without executing the step Sa9. Further, when it is determined that other reporting information has been received in a fixed time in the past from the reporting apparatus that has transmitted the currently accepted reporting information the step Sa2, this reporting information concerns the electrical device 13 from which occurrence of a plug event has been already detected, and hence the recording/warning apparatus 4 does not execute processing at the steps Sa3 to Sa9. Furthermore, in this case, at the step Sa1, the recording/warning apparatus 4 temporarily stores step Sa reporting information as well as time information for the next judgment at the step Sa1.

The recording/warning apparatus 4 performs non-illustrated unplug event monitoring processing separately from the plug event monitoring processing.

In the unplug event monitoring processing, when the same reporting information as that received in relation to the electrical device 13 from which occurrence of a plug event has been detected is not obtained for a fixed time (e.g., five seconds) or more, the recording/warning apparatus 4 recognizes that this electrical device 13 is disconnected from the outlet 5 to which the electrical device 13 has been connected till then. The situation thus recognized is called "an unplug event". Furthermore, in this case, the recording/warning apparatus 4 adds unplug event information and time information indicative of a clock time at the instant to the time-series information. The unplug event information represents the electrical device 13 identified from the reporting information that cannot be obtained, the current location, the outlet position, and others. Moreover, the recording/warning apparatus 4 confirms use conditions of the disconnected electrical device 13. If this electrical device 13 is a device (e.g., a camera that records an operation) that should be connected with the outlet constantly (or at least in a fixed time), the electrical device may be possibly erroneously disconnected, the recording/warning apparatus 4 gives a warning to urge restoration.

The warning operation by the recording/warning apparatus 4 can be carried out by, e.g., outputting a warning sound or a voice message or displaying a character or an icon. Further, when the alarm unit 14 is disposed in the current location of the electrical device 13 as a warning target, the alarm unit 14 may give a warning. In this case, a database (an alarm unit database in which association between an identification number of the alarm unit 14 and a room where the alarm unit 14 is installed is written is prepared. Furthermore, the recording/warning apparatus 4 determines the identification number of the alarm unit 14 installed in the current location of the electrical device 13 as a warning target from the alarm unit database, and the recording/warning apparatus 4 transmits a command to the alarm unit 14 so that the alarm unit 14 can give a warning (or a caution).

As explained above, according to the first embodiment, the following various effects can be achieved.

A manager, e.g., an ME engineer can confirm each current location in the ME engineer room even if the electrical device 13 is placed in a different room as long as it is the electrical device 13 connected to an outlet. Moreover, since the current location of the electrical device 13 is determined based on the power supply system 6 to which the electrical device 13 is connected, means for detecting a position does not have to be provided in the electrical device 13. Additionally, in the first embodiment, since the power supply system 6 is used to transmit reporting information, a dedicated signal line and others do not have to be arranged, and an existing power supply facility can be utilized to realize transmission of the information.

Further, when the electrical device 13 is connected to enter a use status that does not meet the use conditions or when the already connected electrical device 13 is disconnected against the use conditions, the recording/warning apparatus 4 gives a warning. Therefore, the improper status can be urged to be altered, thereby preventing this status from being left.

Furthermore, a plug event that the electrical device 13 is newly connected or an unplug event that the already connected electrical device 13 is disconnected is recorded in time-series information, and hence processing the thus recorded information in many ways can readily realize various functions. For example, when the recorded events are collected in accordance with each electrical device 13, information showing a list of working statuses of the respective equipments can be obtained. This is none other than an operation daily report of each device. Moreover, when the recorded events are collected in accordance with each room where the events occur, information showing a list of outlines of operation flows in each room can be obtained. Additionally, when the database in which the device identification information is associated with a current location, availability, or a maintenance history of the electrical device 13 corresponding to this device identification information is used, the electrical device 13 can be managed. Further, when the database (a device database) in which the device identification information is associated with a name of a model to which the electrical device 13 corresponding to this device identification information belongs and the database in which a model name is associated with an explanation of the device or a method of contacting a service engineer at the time of a failure are used, maintenance of the device can be smoothly carried out.

Second Embodiment

A second embodiment will now be explained hereinafter with reference to FIGS. 17 to 20. It is to be noted that, in FIGS. 17 to 20, like reference numerals denote parts equal to those in FIGS. 1 to 16, thereby omitting a detailed explanation thereof.

Figure 17:
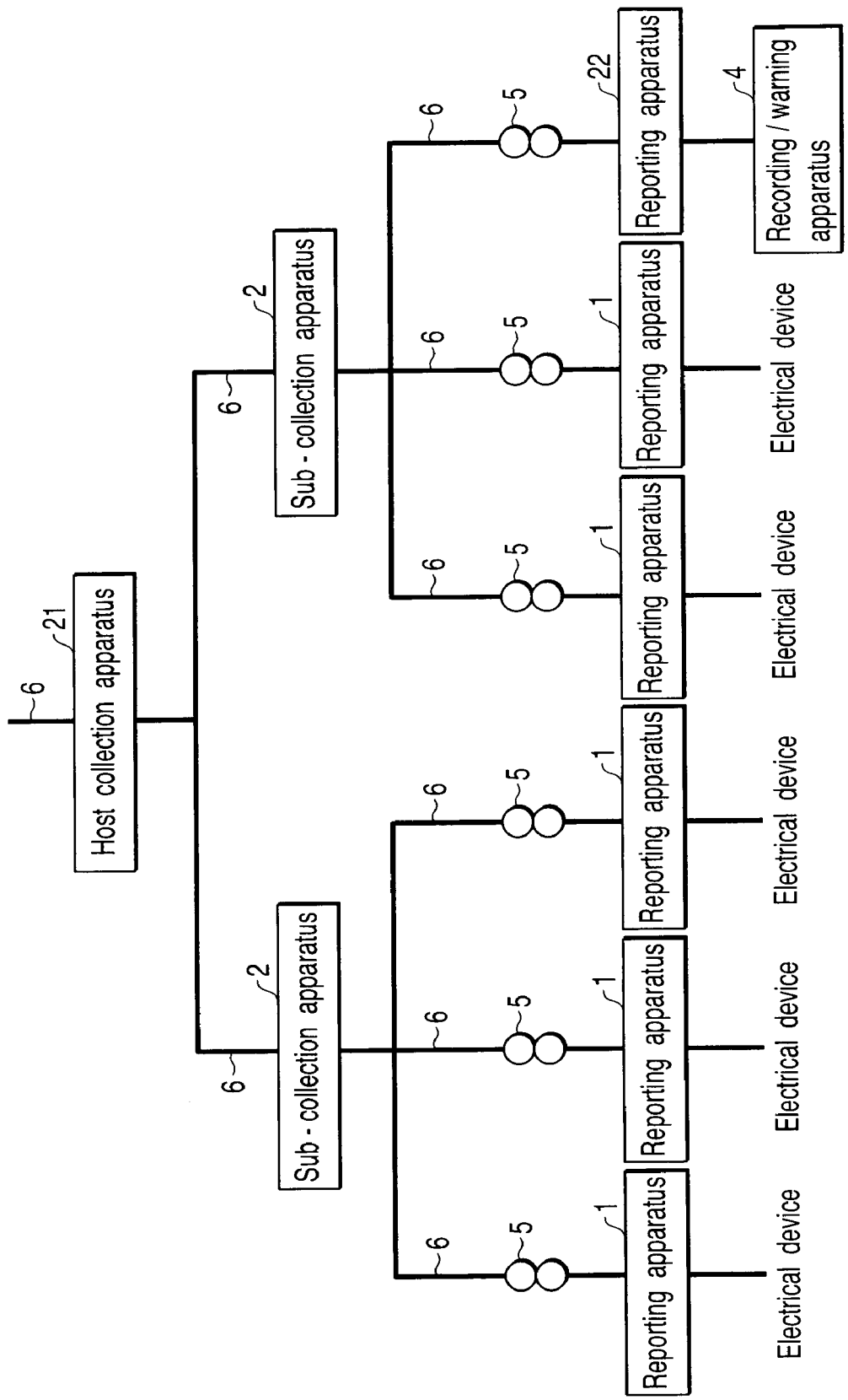
FIG. 17 is a block diagram showing a schematic configuration of a management system according to a second embodiment.

FIG. 17 is a block diagram showing a schematic structure of a management system according to the second embodiment.

The management system according to the second embodiment includes reporting apparatus 1, sub-collection apparatus 2, a recording/warning apparatus 4, a host collection apparatus 21, and a reporting apparatus 22.

The host collection apparatus 21 is disposed to a power supply system 6 on the most upstream side. The host collection apparatus 21 acquires reporting information output from the sub-collection apparatus 2. The host collection apparatus 21 outputs the acquired reporting information to the downstream side of the power supply system 6.

The reporting apparatus 22 is attached to a power supply plug of the recording/warning apparatus 4. The reporting apparatus 22 is inserted into an outlet 5. The reporting apparatus 22 supplies power fed via the power supply system 6 to the recording/warning apparatus 4. The reporting apparatus 22 outputs unique device identification information to the upstream side of the power supply system 6. The reporting apparatus 22 acquires reporting information transmitted from the host collection apparatus 21. The reporting apparatus 22 transmits the acquired reporting information to the recording/warning apparatus 4.

The recording/warning apparatus 4 has the same structure as that in the first embodiment, but it acquires reporting information via the reporting apparatus 22 rather than the host collection apparatus 21.

Figure 18:
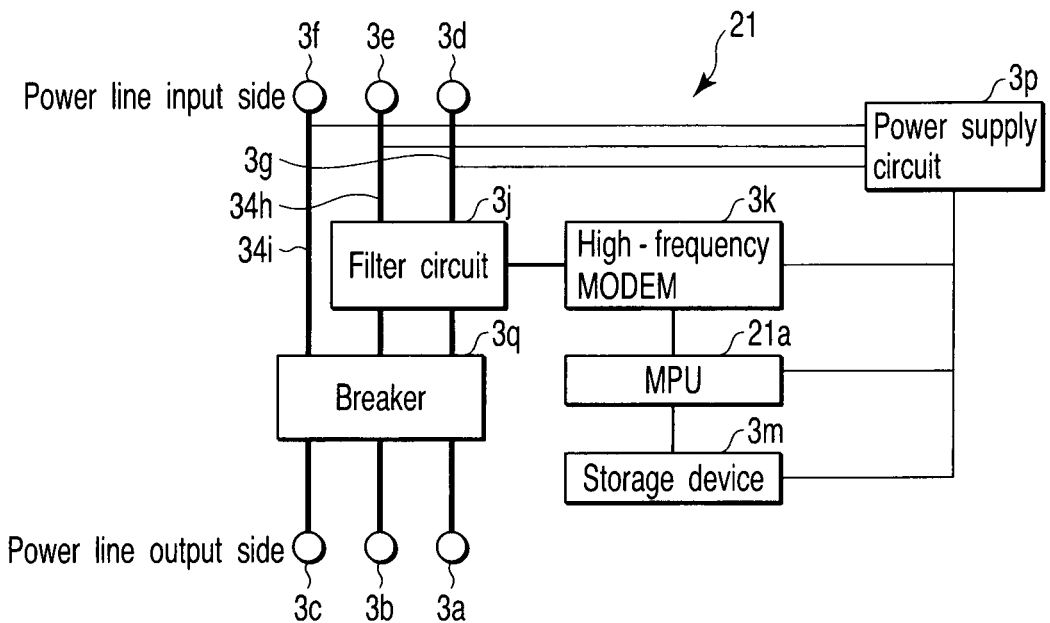
FIG. 18 is a block diagram showing a specific configuration of a host collection apparatus in FIG. 17.

FIG. 18 is a block diagram showing a specific configuration of the host collection apparatus 21.

The host collection apparatus 21 includes contacts 3a, 3b, 3c, 3d, 3e, and 3f, connection lines 3g, 3h, and 3i, a filter circuit 3j, a high-frequency MODEM 3k, a storage device 3m, a power supply circuit 3p, a breaker 3q, and an MPU 21a. That is, the host collection apparatus 21 has a configuration similar to that of the host collection apparatus 3, but is different from the host collection apparatus 3 in that the MPU 21a is provided in place of the MPU 3n. Further, another difference from FIG. 10 lies in that the dedicated communication line 7 that is used to connect the recording/warning apparatus 4 is not connected to the MPU 21a.

The MPU 21a can read information transmitted via the connection lines 3g and 3h by using the high-frequency MODEM 3k. Furthermore, the MPU 21a can read information stored in the storage device 3m as required. The MPU 21a processes received reporting information to include system identification information stored in the storage device 3m, and supplies the processed reporting information to the high-frequency MODEM 3k. Moreover, the MPU 21a can transmit, e.g., a signal that requests the sub-collection apparatus 2 to transmit information or a signal that instructs remedying software via the high-frequency MODEM 3k and the filter circuit 3j. It is to be noted that the MPU 21a includes a random access memory or a clock signal generation circuit required to execute a program.

Figure 19:
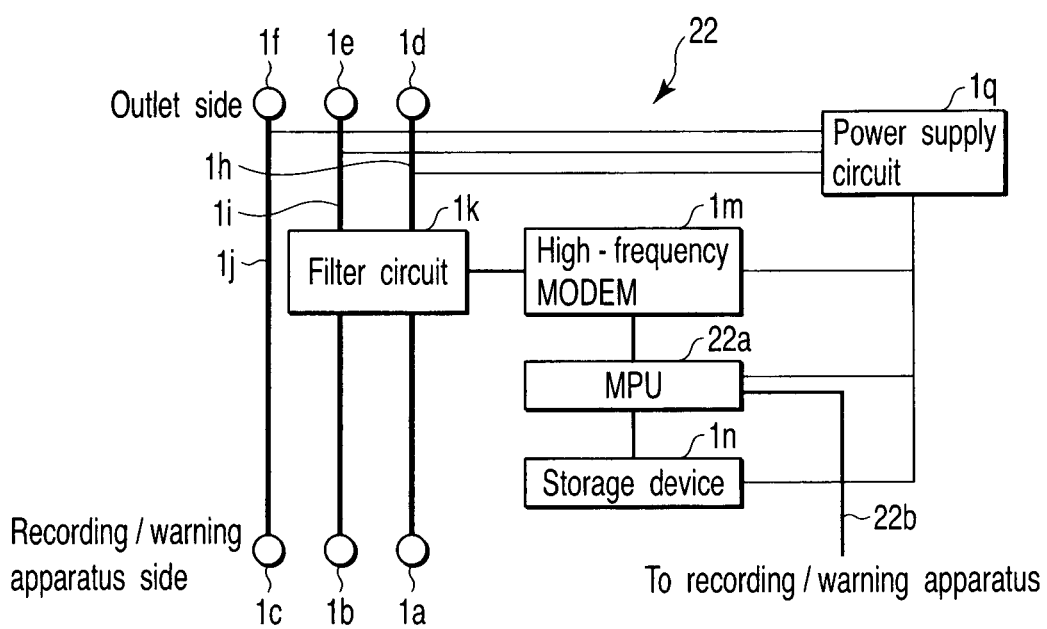
FIG. 19 is a block diagram showing a specific configuration of a reporting apparatus in FIG. 17.

FIG. 19 is a block diagram showing a specific configuration of the reporting apparatus 22.

The reporting apparatus 22 includes contacts 1a, 1b, and 1c, contacts 1d, 1e, and 1f, and connection lines 1h, 1i, and 1j, a filter circuit 1k, a high-frequency MODEM 1m, a storage device 1n, and a power supply circuit 1q, and an MPU 22a. That is, the reporting apparatus 22 has a configuration similar to that of the reporting apparatus 1, but is different from the reporting apparatus 1 in that the MPU 22a is provided in place of the MPU 1p and the signal line 22b is also provided. It is to be noted that the contacts 1a, 1b, and 1c are used to supply a power to the recording/warning apparatus.

The MPU 22a can read information stored in the storage device 1n as required. The MPU 22a operates in accordance with software stored in the storage device 1n, and generates reporting information including device identification information stored in the storage device 1n. The MPU 22a outputs the generated reporting information to the high-frequency MODEM 1m. The MPU 2a can read information transmitted via the connection lines 1h and 1i by using the high-frequency MODEM 1m. When the read information is reporting information transmitted from the host collection apparatus 21, the MPU 22a supplies this reporting information to the recording/warning apparatus 4. The signal line 22b through which the reporting information is transmitted to the recording/warning apparatus 4 can be connected to the recording/warning apparatus 4 side when an additional contact arranged near the contacts 1a, 1b, and 1c comes into contact with a fourth contact provided to a power supply plug of the recording/warning apparatus 4. Alternatively, as the signal line 22b through which the reporting information is transmitted to the recording/warning apparatus 4, a cable conforming to a general-purpose interface, e.g., universal serial bus (USB) can be used. It is to be noted that the MPU 22a includes a random access memory or a clock signal generation circuit required to execute a program. It is to be noted that the recording/warning apparatus 4 can be connected to the power supply system via an adapter specialized to have a function of extracting the reporting information transmitted from the host collection apparatus 21.

Figure 20:
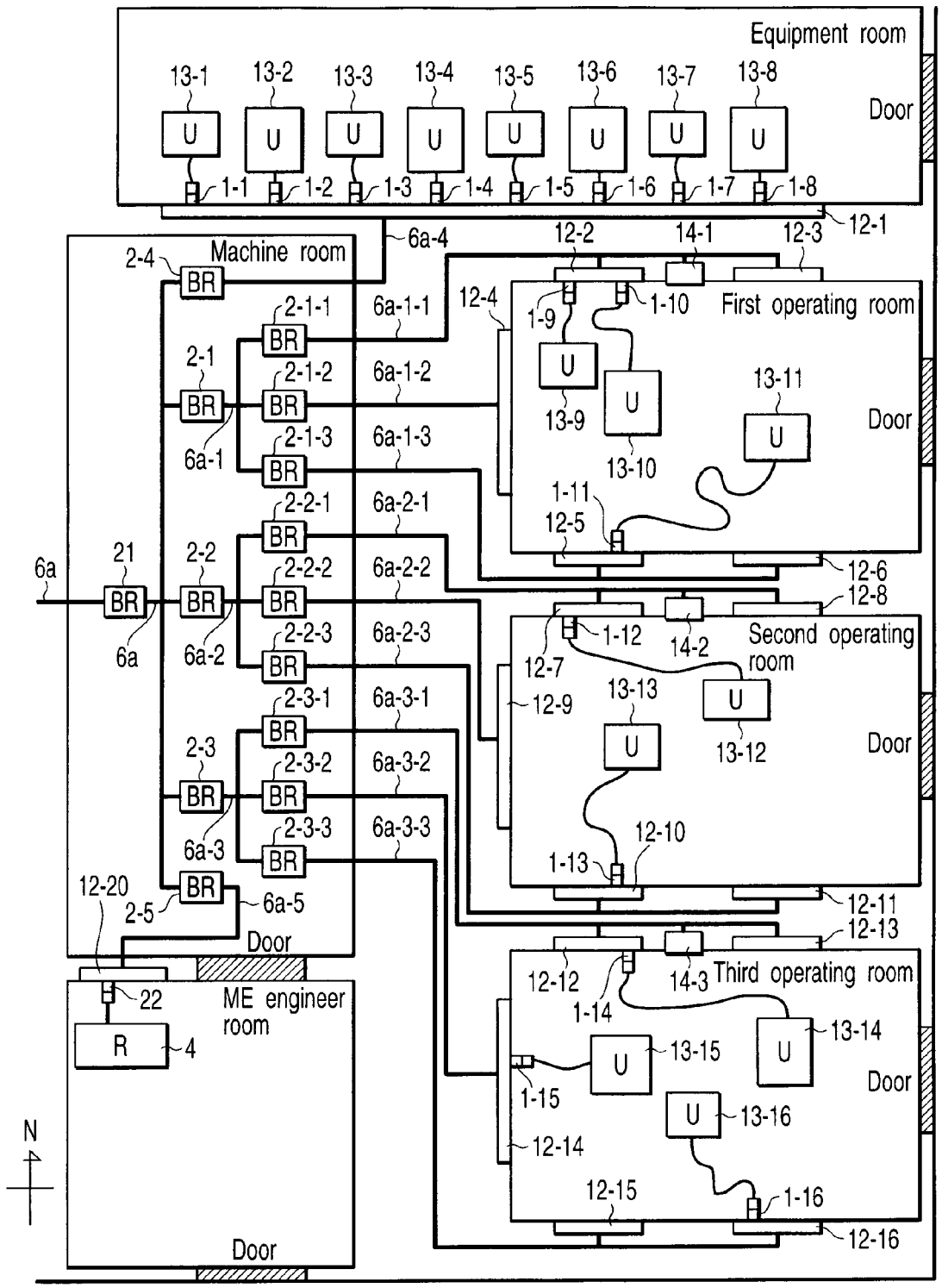
FIG. 20 is a view showing a specific example where a management system according to a second embodiment is applied to manage a use status of each electrical device in a hospital.

FIG. 20 is a view showing a specific example in which the thus configured management system in the second embodiment is applied to manage a use status of each electrical device in a hospital.

An outlet unit 12-1 in an equipment room is connected with a power supply system 6a-4. An outlet unit 12-20 in an ME engineer room is connected with a power supply system 6a-5. These power supply systems 6a-4 and 6a-5 as well as power supply systems 6a-1 to 6a-3 diverge from a power supply system 6a. A sub-collection apparatus 2-4 is connected with the power supply system 6a and the power supply system 6a-4 in such a manner that it has the power supply system 6a on an input side and the power supply system 6a-4 on an output side. A sub-collection apparatus 2-5 is connected with the power supply system 6a and the power supply system 6a-5 in such a manner that it has the power supply system 6a-4 on the input side and the power supply system 6a-5 on the output side. The host collection apparatus 21 is connected with the power supply system 6a.

The reporting apparatus 22 is inserted into an outlet 5 provided in the outlet unit 12-20.

In this manner, each reporting information transmitted from each reporting apparatus 1 is once acquired by the host collection apparatus 21, and then transmitted to the recording/warning apparatus 4 via the power supply system 6a, the sub-collection apparatus 2-5, the power supply system 6a-5, the outlet unit 12-20, and the reporting apparatus 22. Therefore, the recording/warning apparatus 4 can collect the reporting information transmitted from the reporting apparatus 1, and can perform various kinds of management processing similar to those in the first embodiment.

According to this second embodiment, the same effects as those of the first embodiment can be obtained. Moreover, according to the second embodiment, the dedicated communication line 7 does not have to arranged, and an existing power supply wiring line can be utilized as it is. Therefore, engineering works required to introduce the system can be facilitated as compared with the first embodiment.

Third Embodiment

A third embodiment will now be explained hereinafter with reference to FIGS. 21 to 24. It is to be noted that, in FIGS. 21 to 24, like reference numerals denote parts equal to those in FIGS. 1 to 20, thereby omitting a detailed explanation thereof.

A schematic configuration of a management system according to the third embodiment is the same as that depicted in FIG. 1, thereby omitting its illustration. The third embodiment is different from the first embodiment in contents of management processing in a recording/warning apparatus 4.

An operation of the management system according to the third embodiment will now be explained.

First to fourth databases created based on, e.g., an actual system configuration shown in FIG. 12 are respectively prepared in the recording/warning apparatus 4. The first database is the same as that in the first embodiment.

As shown in FIG. 21, the second database has model information added to contents of the second database in the first embodiment. The model information is information required to identify a model to which each electrical device belongs.

As shown in FIG. 22, the third database includes a data record in which maximum power consumption information is associated with the model information. The maximum power consumption information is indicative of a maximum power consumption in an electrical device belonging to a model represented by associated model information.

As shown in FIG. 23, the fourth database includes a data record in which rated power information is associated with system identification information. The rated power information is indicative of a rated power of a power supply system 6 to which associated system identification information is allocated.

Figure 24:
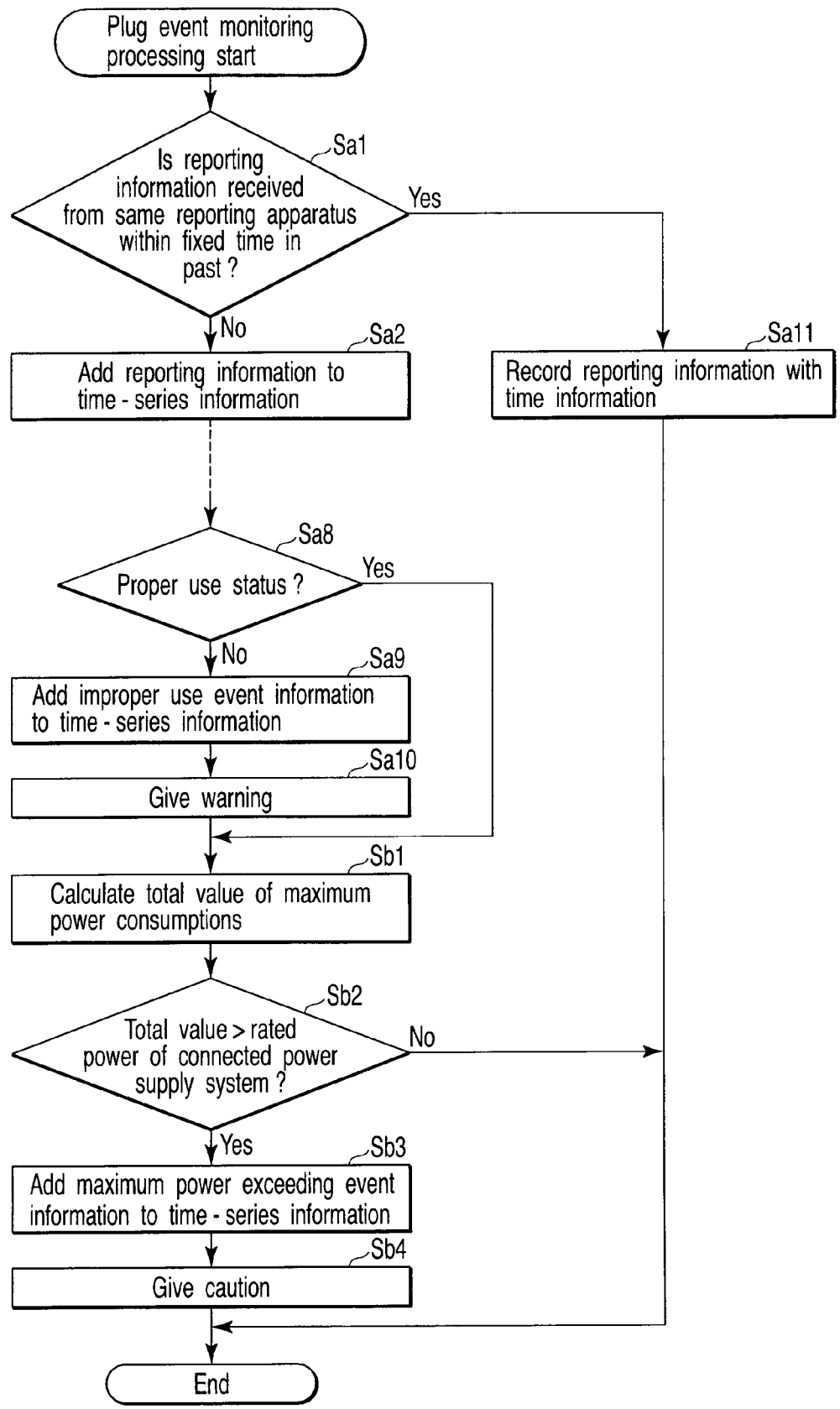
FIG. 24 is a flowchart of plug event monitoring processing in the third embodiment.

Meanwhile, upon receiving reporting information from a host collection apparatus 3, the recording/warning apparatus 4 starts such plug event monitoring processing as shown in FIG. 24. It is to be noted that, in FIG. 24, like reference numerals denote steps where the same processing as that in FIG. 16 is executed, thereby omitting a detailed explanation thereof.

The recording/warning apparatus 4 performs processing from a step Sa1 to a step Sa9 like the first embodiment. It is to be noted that steps Sa3 to Sa7 are omitted in FIG. 24.

When the step Sa9 is finished or when a proper use status is determined at the step Sa8, the recording/warning apparatus 4 advances to a step Sb1. At the step Sb1, the recording/warning apparatus 4 picks up all electrical devices 13 connected with the power supply system 6 indicated by system identification information added to currently received reporting information based on recorded information, and calculates a total value of maximum power consumptions of these electrical devices 13. Incidentally, if the plurality of pieces of system identification information are added to the currently received reporting information, this processing is carried out based on the oldest one in these pieces of system identification information added to the reporting information. That is, the electrical devices 13 connected with the power supply system on the most downstream side are determined as targets, and a total value of maximum power consumptions of these electrical devices 13 is calculated. It is to be noted that the maximum power consumption of each electrical device 13 can be obtained by searching in the second database with device identification information being used as a key to acquire model information and further searching in the third database with this model information being used as a key.

At a step Sb2, the recording/warning apparatus 4 confirms whether the calculated total value exceeds a rated power of the power supply system 6 to which the electrical device 13 is newly connected. The rated power can be obtained by using the system identification information added to the currently received reporting information as a key to search in the fourth database. If the plurality of pieces of system identification information are added to the currently received reporting information, this processing is carried out based on the oldest one in these pieces of system identification information added to the reporting information.

If the total value exceeds the rated power, the recording/warning apparatus 4 advances to a step Sb3 from the step Sb2. At the step Sb3, the recording/warning apparatus 4 adds maximum power exceeding event information to time-series information. The maximum power exceeding event information is indicative of, e.g., system identification information or a total value.

At a step Sb4, the recording/warning apparatus 4 gives a caution and urges the currently connected electrical device 13 to be connected to a different power supply system 6. For example, in the state depicted in FIG. 12, it is assumed that an operating microscope device having a maximum power consumption of 1500 W is connected to an outlet 5 in an outlet unit 12-3 when maximum power consumptions of electrical devices 13-9 and 13-10 are respectively 2000 W and 3000 W and a rated power of a power supply system 6a-1-1 is 6000 W. In this case, the maximum power consumption of each electrical device 13 connected with the power supply system 6a-1-1 becomes 6500 W, and it exceeds 6000 W that is the rated power of the power supply system 6a-1-1. Thus, the recording/warning apparatus 4 gives a message, e.g., "an operating microscope device having an ID XXXX is connected in the first operating room. Therefore, a total value of maximum powers of a device group connected with a north outlet system in the first operating room exceeds an allowable power of the north outlet system in the first operating room" to a manager in the form of voice or display. When an alarm unit 14 disposed in a current location of the electrical device 13 as a warning target gives a warning, a warning device 14-1 gives a warning in the form of, e.g., the above message. This caution may continue until a predetermine time elapses, or may continue until the manager instructs cancellation, or may continue until the current connection of the electrical device 13 is released.

Additionally, when giving the caution is finished, the recording/warning apparatus 4 terminates the plug event monitoring processing. It is to be noted that, when it is determined that the same reporting information as the currently received reporting information has been received within a fixed time in the past at the step Sa2, the recording/warning apparatus 4 terminates the plug event monitoring processing without executing processing at the steps Sa3 to Sa9 since this reporting information concerns the electrical device 13 from which occurrence of the plug event has been already detected.

The recording/warning apparatus 4 performs unplug event monitoring processing separately from the plug event monitoring processing like the first embodiment.

A caution giving operation by the recording/warning apparatus 4 can be carried out by outputting a warning sound or a voice message or displaying a character or an icon. Further, when the alarm unit 14 is disposed in a current location of the electrical device 13 as a warning target, the alarm unit 14 may give a warning.

As explained above, according to the third embodiment, the same effects as those of the first embodiment can be obtained. Furthermore, according to the third embodiment, if power supplies of all the electrical devices 13 connected with the single power supply system 6 are turned on and a situation where the rated power of the power supply system 6 is expected to be exceeded occurs, a caution is given when connection of the electrical device 13 that produces such a situation is achieved. Therefore, it is possible to avoid occurrence of the situation where a power consumption amount in the power supply system 6 exceeds the rated power when the power supplies of the electrical devices 13 are turned on without noticing such circumstances. That is, it is possible to avoid a situation where the breaker functions to shutdown operations of other electrical devices that have been already used. Many devices (e.g., a surgical equipment, a life support machine, a metal cutting machine tool, a security monitoring device, and others) that may be damaged when their power supplies are forcibly shut off to stop operations are utilized, and hence enabling avoidance of a situation where these devices are suddenly stopped is important.

Moreover, according to the third embodiment, when an event where the breaker functions occurs, a cause of this event can be concretely specified by analyzing time-series information, thus assuredly taking a preventative measure. Additionally, a table showing when and where cautions or warnings are given in the form of a list can be creased from the time-series information.

Fourth Embodiment

A fourth embodiment will now be explained with reference to FIGS. 25 to 27. It is to be noted that, in FIGS. 25 and 27, like reference numerals denote parts equal to those in FIGS. 1 to 24, thereby omitting a detailed explanation thereof.

A schematic configuration of a management system according to the fourth embodiment is the same as that depicted in FIG. 1, thus omitting an illustration thereof. Further, the fourth embodiment is different from the first embodiment in provision of a reporting apparatus 23 in place of the reporting apparatus 1 and contents of management processing by the recording/warning apparatus 4.

FIG. 25 is a block diagram showing a specific configuration of the reporting apparatus 23.

The reporting apparatus 23 includes contacts $1a$, $1b$, and $1c$, contacts $1d$, $1e$, and $1f$, connection lines $1h$, $1i$, and $1j$, a filter circuit $1k$, a high-frequency MODEM $1m$, a power supply circuit $1q$, a storage device $23a$, and an MPU $23b$. That is, the reporting apparatus 23 has a configuration similar to that of the reporting apparatus 1, but is different from the reporting apparatus 1 in that the storage device $23a$ and the MPU $23b$ are provided in place of the storage device $1n$ and the MPU $1p$.

The storage device $23a$ includes, e.g., an electrically erasable programmable read only memory (EEPROM). The storage device $23a$ can store software that drives the MPU $23b$, device identification information, and maximum power consumption information.

The MPU $23b$ can read information transmitted through the connection lines $1h$ and $1i$ by using the high-frequency MODEM $1m$. Furthermore, the MPU $23b$ can read information stored in the storage device $23a$ as required. The MPU $23b$ operates in accordance with software stored in the storage device $23a$, and generates reporting information including the device identification information and the maximum power consumption information stored in the storage device $23a$. The MPU $23b$ outputs the generated reporting information to the high-frequency MODEM $1m$. Moreover, the MPU $23b$ has a function of acquiring an instruction from an external rewriting device via the high-frequency MODEM 1 and writing software, device identification information, or maximum power consumption information in the storage device $23a$ in response to this instruction. It is to be noted that the MPU $23b$ includes a random access memory or a clock signal generation circuit required to execute a program.

Figure 26:
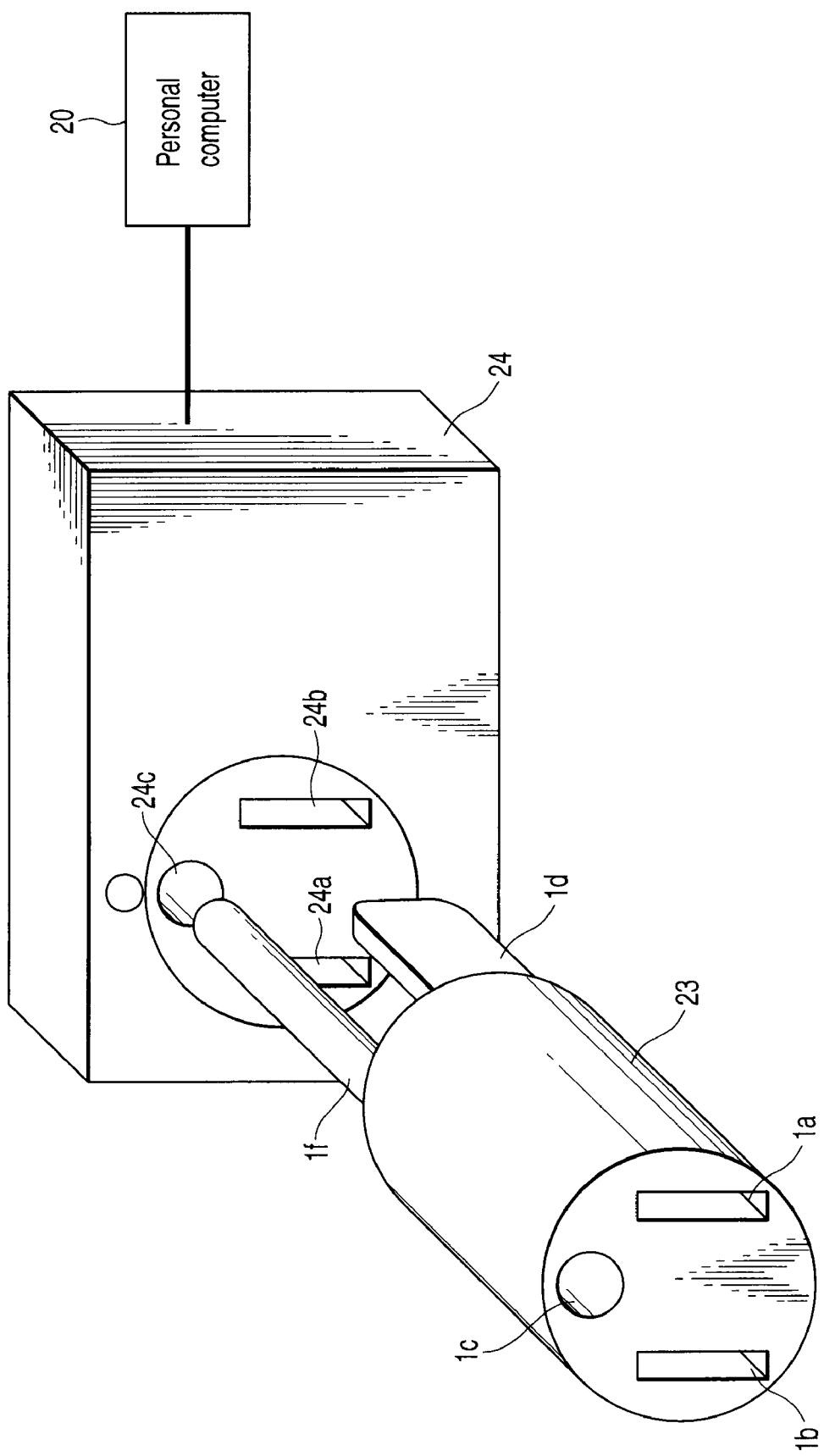
FIG. 26 is a perspective view showing an appearance of a rewriting device.
Figure 27:
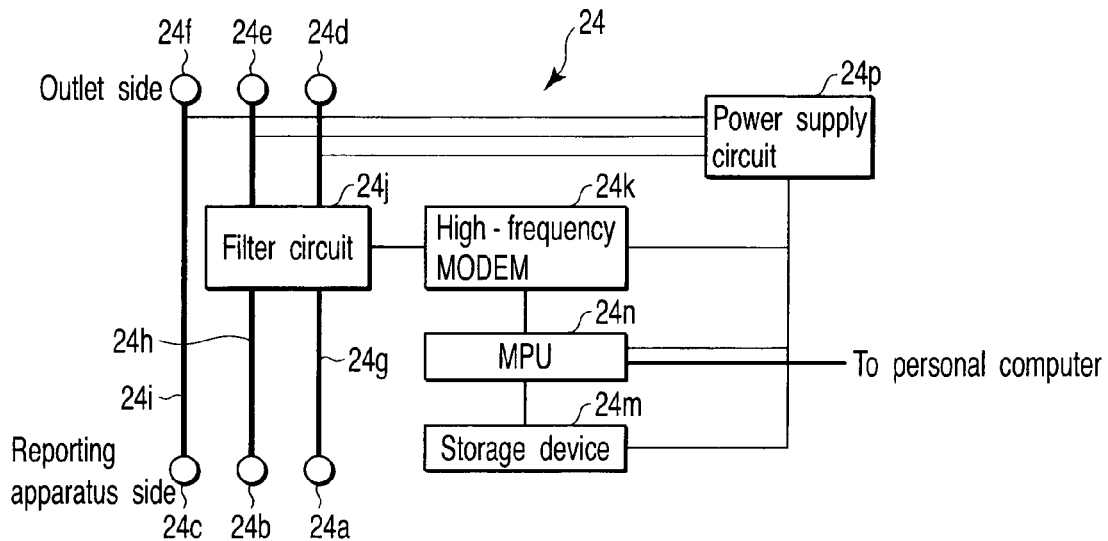
FIG. 27 is a block diagram showing a specific configuration of the rewriting device.

FIG. 26 is a perspective view showing an appearance of a rewriting device 24. FIG. 27 is a block diagram showing a specific configuration of the rewriting device 24.

The rewriting device 24 includes contacts $24a$, $24b$, and $24c$, contacts $24d$, $24e$, and $24f$, connection lines $24g$, $24h$, and $24i$, a filter circuit $24j$, a high-frequency MODEM $24k$, a storage device $24m$, an MPU $24n$, and a power supply circuit $24p$.

As shown in FIG. 26, the contacts $24a$, $24b$, and $24c$ are provided in three insertion openings. When the three contacts $1d$, $1e$, and $1f$ of the reporting apparatus 23 are respectively inserted into these insertion openings, the contacts $1d$, $1e$, and $1f$ come into contact with the contacts $24a$, $24b$, and $24c$.

The contacts $24d$, $24e$, and $24f$ are provided in a power supply plug. When this power supply plug is inserted into an outlet, they come into contact with the three contacts provided in the outlet.

The connection lines $24g$, $24h$, and $24i$ connect the contacts $24a$, $24b$, and $24c$ with the contacts $24d$, $24e$, and $24f$, respectively. It is to be noted that the contacts $24c$ and $24f$ are used for grounding and the connection line $24i$ is a grounding line.

The filter circuit $24j$ separates a low-frequency alternating voltage transmitted through the connection lines $24g$ and $24h$ from a high-frequency signal superimposed on this alternating voltage. The filter circuit $24j$ transmits a high-frequency signal component alone to the high-frequency MODEM $24k$, and supplies the alternating voltage toward the contacts 24*a* and 24*b*. Moreover, the filter circuit 24*j* superimposes a high-frequency signal output from the high-frequency MODEM 24*k* on the alternating voltage to be transmitted toward the contacts 24*a* and 24*b* alone.

The high-frequency MODEM 24*k* demodulates the high-frequency signal supplied from the filter circuit 24*j* to extract information. Additionally, the high-frequency MODEM 24*k* modulates a signal supplied from the MPU 24*n* to obtain a high-frequency signal.

The storage device 24*m* includes a non-volatile memory in which information can be electrically rewritten like EEPROM. The storage device 24*m* stores software that drives the MPU 24*n*.

The MPU 24*n* can read information transmitted through the connection lines 24*g* and 24*h* by using the high-frequency MODEM 24*k*. An external personal computer 20 is connected with the MPU 24*n* by utilizing, e.g., an interface. The MPU 24*n* generates instruction information that is used to instruct the reporting apparatus 23 to rewrite software, device identification information, or maximum power consumption information under control of the personal computer 20. The MPU 24*n* outputs a signal including the generated instruction information to the high-frequency MODEM 24*k*. It is to be noted that the MPU 24*n* includes a random access memory or a clock signal generation circuit required to execute a program.

The power supply circuit 24*p* is connected with the connection lines 24*g*, 24*h*, and 24*i*. The power supply circuit 24*p* obtains a power from the outlet through the connection lines 24*g*, 24*h*, and 24*i* to transform it, and supplies the transformed power to the high-frequency MODEM 24*k*, the storage device 24*m*, and the MPU 24*n*.

An operation of the management system according to the fourth embodiment will now be explained.

The reporting apparatus 23 is attached to the power supply plug of each electrical device 13 as a management target. It is to be noted that, when these reporting apparatus 23 must be discriminated from each other in the following explanation, reference numerals 23-1 to 23-16 are given to the respective devices. That is, for example, the reporting apparatus 23-1 to 23-16 are attached in place of the reporting apparatus 1-1 to 1-13 depicted in FIG. 12.

A manager uses the rewriting device 24 to write device identification information, corresponding device information, model information, and maximum power consumption information concerning each electrical device 13 as an attachment target in the storage device 31*a* of each reporting apparatus 23 in advance. The device identification information may be identification information arbitrarily allocated to manage this equipment, or may be identification information created to also include a production number and a model number of the electrical device 13. The corresponding device information is indicative of a name of the electrical device 13 as an attachment target. The model information is indicative of a model of the electrical device 13 as an attachment target. The maximum power consumption information includes information of a maximum power consumption of the electrical device 13 as an attachment target.

When connecting the electrical device as a management target to the outlet, the reporting apparatus 23 attached to this electrical device is connected with the power supply system 6. For example, when the electrical device 13-1 is connected with an outlet provided in an outlet unit 12-1 in an equipment room depicted in FIG. 12, the reporting apparatus 23-1 attached to a power supply connector of this electrical device 13-1 is connected with the power supply system 6*b*. Then, in the reporting apparatus 23-1, a power generated by the power supply circuit 1*q* is supplied to the MPU 31*b*, thereby activating the MPU 31*b*. At this time, the MPU 31*b* reads the device identification information and the maximum power consumption information from the storage device 31*a*, and generates a signal including the device identification information and the maximum power consumption information. A high-frequency signal obtained by modulating this signal by the MODEM 1*m* is supplied to the outlet side via the filter circuit 1*k*. The high-frequency signal supplied from the reporting apparatus 23-1 in this manner is fed to the power supply system 6*b* from the outlet provided in the outlet unit 12-1.

Thereafter, the reporting apparatus 23-1 repeatedly transmits a high-frequency signal indicative of reporting information at each predetermined timing as long as it stays connected with the power supply system 6*b*. Although the reporting apparatus 23-1 may transmit a high-frequency signal at an arbitrary timing, transmitting this signal in accordance with a fixed cycle can be considered. Setting one cycle in this example to approximately one second can practically suffice.

The other reporting apparatus 23 also operate like the reporting apparatus 23-1. However, a destination of a high-frequency signal is the power supply system 6 to which the reporting apparatus 23 is connected. For example, in a state that is similar to FIG. 12, high-frequency signals are transmitted from the reporting apparatus 23-9 to the power supply system 6*a*-1-1, from the reporting apparatus 23-11 to the power supply system 6*a*-1-3, and from the reporting apparatus 23-15 to the power supply system 6*a*-3-2.

Further, the reporting apparatus 23 detects collision and retires transmission as required like the reporting apparatus 1.

The high-frequency signal fed to the power supply system 6 as explained above is transmitted through the power supply system 6 to be supplied to the recording/warning apparatus 4 like the first embodiment.

For example, a first database depicted in FIG. 14 and a fourth database shown in FIG. 23 are respectively prepared in the recording/warning apparatus 4.

When the recording/warning apparatus 4 receives reporting information from the host collection apparatus 3, it starts plug event monitoring processing. A flow of this plug event monitoring processing is the same as that depicted in the flowchart of FIG. 24. However, in the fourth embodiment, the recording/warning apparatus 4 identifies an electrical device at the step Sa1 based on device identification information, corresponding device information, and model information included in the reporting information. Further, the recording/warning apparatus 4 calculates a total value of maximum power consumptions at the step Sb1 as a total value of maximum power consumptions indicated in maximum power consumption information included in the reporting information.

The recording/warning apparatus 4 performs unplug event monitoring processing separately from the plug event monitoring processing like the first embodiment.

As explained above, according the fourth embodiment, the same effects as those in the first and the third embodiments can be obtained.

Furthermore, according to the fourth embodiment, such a second database as depicted in FIG. 15 or 21 or a third database shown in FIG. 22 does not have to be prepared in the recording/warning apparatus 4. When an electrical device as a monitoring target is newly added, a manager does not have to perform an operation of registering a name, a type, or a maximum power consumption concerning this electrical device 13 in the recording/warning apparatus 4. Instead, an operation of writing these pieces of information in the reporting apparatus 23 is required, but this operation can be performed near the electrical device 13 as a part of an operation of attaching the reporting apparatus 23 to the electrical device 13. Therefore, the operation is usually easier than that of registering the information in the recording/warning apparatus 4 distanced from the electrical device 13, and an input error hardly occurs.

That is, of the several databases included in the first to the third embodiments, the database concerning information inherent to an electrical device can be configured as a distributed database in which its data record is held in each reporting apparatus like this fourth embodiment. When each reporting apparatus holds the data record concerning an electrical device to which this reporting apparatus is attached and transmits this data to a management apparatus at the time of connection to an outlet, the management apparatus collects the data records that concern all actually used (i.e., all required) electrical device to create a database. Moreover, when information is input to the reporting apparatus or when information is updated, it is all automatically reflected in the database of the management apparatus, which is convenient.

Fifth Embodiment

A fifth embodiment will now be explained with reference to FIGS. 28 and 29. It is to be noted that, in FIGS. 28 and 29, like reference numerals denote parts equal to those in FIGS. 1 to 27, thereby omitting a detailed explanation thereof.

A schematic configuration of a management system according to the fifth embodiment is the same as that depicted in FIG. 1, thereby omitting an illustration thereof. Further, the fifth embodiment is different from the first embodiment in provision of a reporting apparatus 25 in place the reporting apparatus 1 and contents of management processing in a recording/warning apparatus 4.

Figure 28:
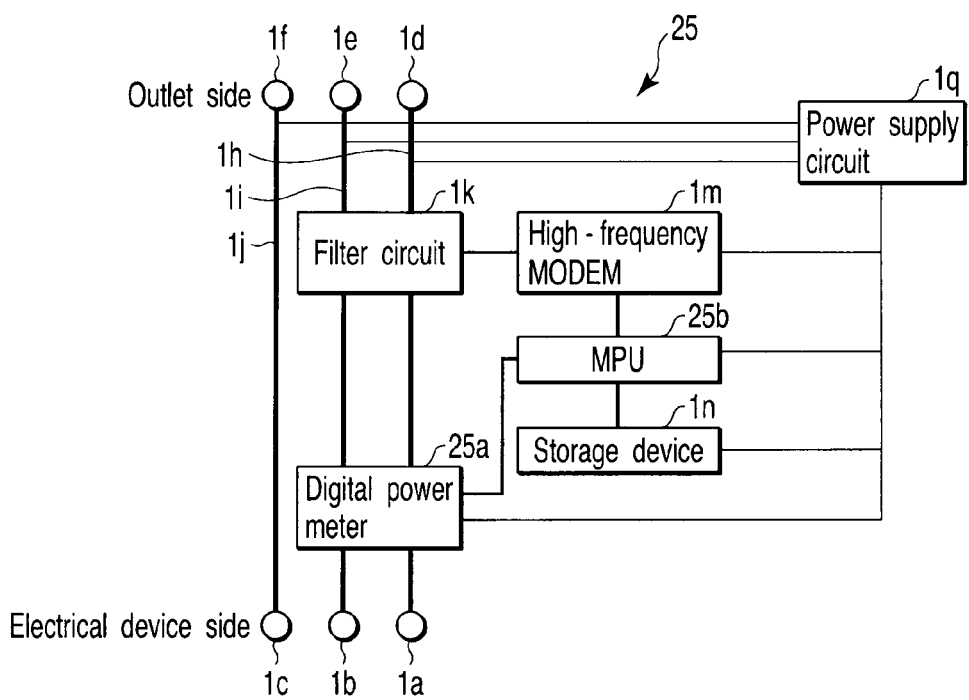
FIG. 28 is a block diagram showing a specific configuration of a reporting apparatus in a fifth embodiment.

FIG. 28 is a block diagram showing a specific configuration of the reporting apparatus 25.

The reporting apparatus 25 includes contacts $1a$, $1b$, and $1c$, contacts $1d$, $1e$, and $1f$, connection lines $1h$, $1i$, and $1j$, a filter circuit $1k$, a high-frequency MODEM $1m$, a storage device $1n$, a power supply circuit $1q$, a digital power meter $25a$, and an MPU $25b$. That is, the reporting apparatus 25 has a configuration similar to that of the reporting apparatus 1, but is different from the reporting apparatus 1 in that the MPU $25b$ is provided in place of the MPU $1p$ and the digital power meter $25a$ is added.

The digital power meter $25a$ measures a power consumption of an electrical device 13 having the reporting apparatus 25 attached thereto in real time. The digital power meter $25a$ transmits a power measured value to the MPU $25b$.

The MPU $25b$ can read information transmitted via the connection lines $1h$ and $1i$ by using the high-frequency MODEM $1m$. Furthermore, the MPU $25b$ can read information stored in the storage device $1n$ as required. Moreover, the MPU $25b$ operates in accordance with software stored in the storage device $1n$, and generates reporting information including device identification information held in the storage device $1n$ and the power measured value obtained from the digital power meter $25a$. The MPU $25b$ outputs the generated reporting information to the high-frequency MODEM $1m$. It is to be noted that the MPU $25b$ includes a random access memory or a clock signal generation circuit required to execute a program.

An operation of the management system according to the fifth embodiment will now be explained.

The reporting apparatus 25 is attached to a power supply plug of the electrical device 13 as a management target. It is to be noted that, when these reporting apparatus 25 must be discriminated from each other in the following explanation, reference numerals 25-1 to 25-16 are given. That is, the reporting apparatus 25-1 to 25-16 are respectively attached in place of the reporting apparatus 1-1 to 1-13 shown in FIG. 12, for example.

When connecting the electrical device as a management target to an outlet 5, the reporting apparatus 25 attached to this electrical device is connected to a power supply system 6. For example, when an electrical device 13-1 is connected with an outlet provided in an outlet unit 12-1 in an equipment room depicted in FIG. 12, a reporting apparatus 25-1 attached to a power supply connector of this electrical device 13-1 is connected with a power supply system $6b$. Then, in the reporting apparatus 25-1, a power generated by the power supply circuit $1q$ shown in FIG. 28 is supplied to the MPU $31b$, thereby activating the MPU $31b$. At this time, the MPU $31b$ reads device identification information from the storage device $1n$, acquires a power measured value output from the digital power meter $25a$, and generates a signal including reporting information that includes this device identification information and the power measured value. A high-frequency signal obtained by modulating this signal by using the high-frequency MODEM $1m$ is supplied to the outlet side via the filter circuit $1k$. The high-frequency signal transmitted from the reporting apparatus 25-1 in this manner is transmitted to the power supply system $6b$ from the outlet 5 provided in the outlet unit 12-1.

Thereafter, the reporting apparatus 25-1 repeatedly transmits the high-frequency signal indicative of the reporting information at each predetermined timing as long as it stays connected with the power supply system $6b$. It is to be noted that the MPU $25b$ acquires the power measured value output from the digital power meter $25a$ at each timing mentioned above to include the power measured value indicative of a measured value of a power consumption at this moment in the reporting information. Although the reporting apparatus 25-1 may transmit the high-frequency signal at an arbitrary timing, transmitting this signal in accordance with each fixed cycle can be considered. Setting one cycle in this example to approximately one second can practically suffice.

The other reporting apparatus 25 operate like the reporting apparatus 25-1. However, a destination of the high-frequency signal is the power supply system 6 to which each reporting apparatus 25 is connected. For example, in a state similar to FIG. 12, the respective high-frequency signals are transmitted from the reporting apparatus 25-9 to the power supply system $6a$-1-1, from the reporting apparatus 25-11 to the power supply system $6a$-1-3, from the reporting apparatus 25-15 to the power supply system $6a$-3-2.

Moreover, the reporting apparatus 25 detects collision and retries transmission as required like the reporting apparatus 1.

As explained above, the high-frequency signal transmitted to the power supply system 6 is transmitted through the power supply system 6 to be supplied to the recording/warning apparatus 4 like the first embodiment.

First to fourth databases are respectively prepared in the recording/warning apparatus 4 like the third embodiment.

Figure 29:
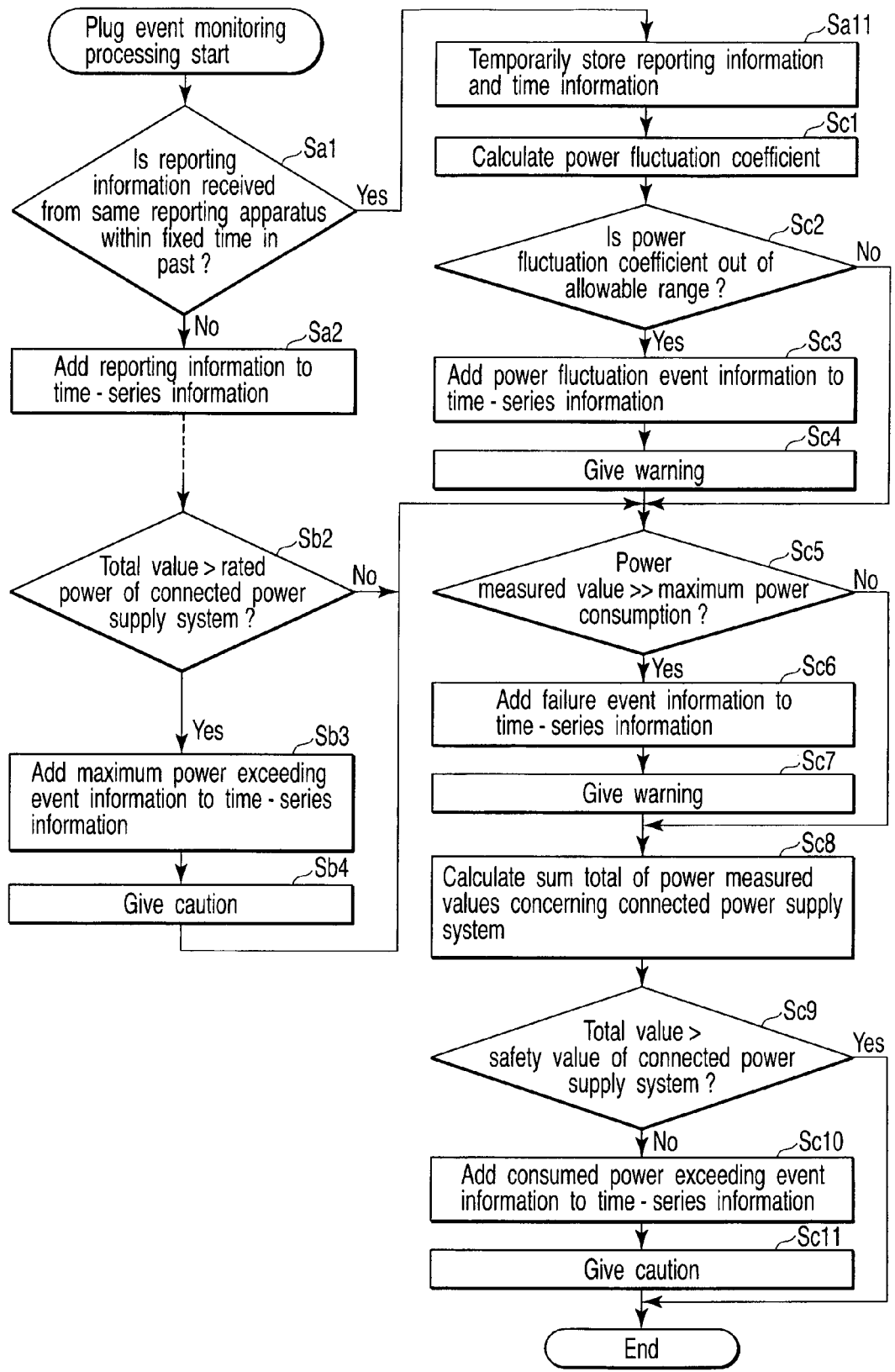
FIG. 29 is a flowchart of plug event monitoring processing in the fifth embodiment.

Meanwhile, when the recording/warning apparatus 4 receives reporting apparatus from a host collection apparatus 3, it start such plug event monitoring processing as shown in FIG. 29. It is to be noted that, in FIG. 29, like reference numerals denote steps at which the same processing as that in FIGS. 16 and 24 is executed, thereby omitting a detailed explanation thereof.

The recording/warning apparatus 4 executes processing at a step Sa1 like the first embodiment. Additionally, when NO is determined at the step Sa1, the recording/warning apparatus 4 executes processing at steps Sa2 to Sa9 and steps Sb1 to Sb3 like the first and the third embodiments. It is to be noted that the steps Sa3 to Sa7 and the step Sb1 are omitted in FIG. 29.

On the other hand, when YES is determined at the step Sa1, the recording/warning apparatus 4 executes processing at a step Sa10 like the first embodiment, and then advances to a step Sc1. At the step Sc1, the recording/warning apparatus 4 calculates a fluctuation coefficient of a power consumption (which will be referred to as a power fluctuation coefficient hereinafter) of an electrical device 13 to which device identification information included in a currently received reporting information is allocated. The power fluctuation coefficient can be calculated based on power measured values respectively included in the currently received reporting information and previously received reporting information including the same device identification information.

At a step Sc2, the recording/warning apparatus 4 confirms whether the calculated power fluctuation coefficient deviates from a predetermined allowable range (e.g., 80 to 120%). The allowable range may be fixedly given as a design value, or may be arbitrarily set by a manager. Actually, the allowable range differs depending on a type of each electrical device. For example, in an electric scalpel, a power consumption slightly increases during cautery. Furthermore, in an operating microscope, since a power consumption of an illumination lamp is considerably larger than a power consumption based on an operation of a mechanical part, the power consumption varies depending on whether the illumination lamp is on. As explained above, although a power consumption of an electrical device varies even in a normal operating state, its fluctuation coefficient differs depending on a model of each electrical device. Thus, considering the above-explained properties, it is good enough to prepare a table showing each allowable range determined in accordance with each electrical device and adaptively determining each allowable range used at the step Sc2 based on this table.

Incidentally, in the case of, e.g., a bed warmer, it functions to maintain a temperature of warm water detected by a thermostat substantially constant, and hence a fluctuation in a power consumption in a normal state is very large. In the case of such an electrical device, such a fluctuation in power does not have to be checked. This can be realized by, e.g., previously preparing a database representing a list of electrical devices that are not subjected to power fluctuation check and forcibly skipping the processing at steps Sc1 to Sc3 in regard to the electrical devices registered in this database. Alternatively, this can be realized by setting each allowable range to a very large range, e.g., "infinity" in a table showing each allowable range set in accordance with each electrical device.

If a power fluctuation coefficient deviates from the allowable range, the recording/warning apparatus 4 advances to the step Sc3 from the Sc2. At the step Sc3, the recording/warning apparatus 4 adds power fluctuation event information as well as time information indicative of a clock time at this moment to time-series information. The power fluctuation event information is indicative of, e.g., system identification information or a power fluctuation coefficient of a connected power supply system.

At a step Sc4, the recording/warning apparatus 4 gives a warning indicating that a power consumption of an electrical device 13 is abnormal and thereby urges to take a countermeasure. This warning may continue until a predetermined time elapses, or may continue until a manager instructs cancellation, or may continue until connection of the electrical device 13 as a current warning target is released.

It is to be noted that detection of the power fluctuation event can be utilized to manage a change in an operating state of an electrical device. For example, when the allowable range is appropriately set considering a difference between a power consumption during cautery and a power consumption in a standby mode in, e.g., an electric scalpel, a power fluctuation event can be produced in accordance with start or stop of cautery by the electric scalpel. Furthermore, in the case of an operating microscope, when the allowable range is appropriately set considering a power consumption of an illumination lamp, a power fluctuation event can be produced in accordance with on/off of the illumination lamp. An operating state of an electrical device can be detected in this manner. It is to be noted that, when detecting an operating state of an electrical device in this manner, generation of a warning at the step Sc4 is not required, executing processing of notifying an ME engineer based on additionally recording a power fluctuation event in time-series information or displaying an operating state of the electrical device is useful.

When giving the caution is finished at the step Sb4, when giving the warning is finished at the step Sc4, or when it is determined that a power fluctuation coefficient falls within the allowable range at the step Sc2, the recording/warning apparatus 4 advances to a step Sc5 from each step. That is, when it is determined that the power fluctuation coefficient falls within the allowable range at the step Sc2, it can be determined that a power consumption of a corresponding electrical device 13 is not abnormal, and hence the recording/warning apparatus 4 does not execute the processing at the steps Sc3 and Sc4.

At the step Sc5, the recording/warning apparatus 4 confirms whether a power measured value included in the currently received reporting information greatly exceeds a maximum power consumption of the electrical device whose reporting information has been transmitted.

If the power measured value greatly exceeds the maximum power consumption, this electrical device may possibly have a failure (e.g., a short circuit or leakage of current). Thus, the recording/warning apparatus 4 advances to a step Sc6 from the step Sc5. Moreover, at the step Sc6, the recording/warning apparatus 4 adds failure event information to the time-series information. The failure event information is indicative of, e.g., an identified electrical device 13 or a power measured value.

At a step Sc7, the recording/warning apparatus 4 gives a warning and thereby urges to take a countermeasure for a failure of the electrical device.

When giving the warning is finished at the step Sc7, or when it is determined that the power measured value does not greatly exceed the maximum power consumption at the step Sc5, the recording/warning apparatus 4 advances to a step Sc8. At the step Sc8, the recording/warning apparatus 4 picks up all electrical devices 13 connected with the power supply system to which the electrical device 13 from which the currently received reporting apparatus has been transmitted is connected (which will be referred to as a connected power supply system hereinafter) based on time-series information, and calculates a total value of latest reported power measured values of these respective electrical devices 13.

At a step Sc9, the recording/warning apparatus 4 confirms whether the calculated total value is smaller than a safety value of the connected power supply system. It is to be noted that the safety value is smaller than a rated power and can be determined by preparing a database in which the safety value is added to contents in, e.g., the database depicted in FIG. 23 and making reference to the prepared database. Alternatively, the safety value can be determined as a value obtained by multiplying a preset coefficient that is less than 1 by the rated power.

If the total value is not smaller than the safety value, a total power consumption of the connected power supply system may possibly reach the rated power. Thus, the recording/warning apparatus 4 advances to a step Sc10 from the step Sc9. At the step Sc10, the recording/warning apparatus 4 adds power consumption exceeding event information to time-series information. The power consumption exceeding event information is indicative of, e.g., system identification information or a total power consumption of the connected power supply system.

At a step Sc11, the recording/warning apparatus 4 gives a caution and urges to reconnect some of the electrical devices 13 to another power supply system 6.

Further, when giving the caution is finished at the step Sc11, the recording/warning apparatus 4 terminates the plug event monitoring processing. It is to be noted that, if it is determined that the total value falls within the safety range at the step Sc9, the recording/warning apparatus 4 terminates the plug event monitoring processing without executing the processing at the steps Sc10 and Sc11.

The recording/warning apparatus 4 executes unplug event monitoring processing separately from the plug event monitoring processing like the first embodiment.

The warning operation by the recording/warning apparatus 4 can be executed by outputting a warning sound or a voice message or displaying a character or an icon. Furthermore, when an alarm unit 14 is disposed in a current location of an electrical device as a warning target, the alarm unit 14 may give a warning.

As explained above, according to the fifth embodiment, the same effects as those of the first and the third embodiments can be obtained. Moreover, according to the fifth embodiment, when a failure, e.g., a short circuit or leakage of current might have occurred in the electrical device 13 or the power supply system 6, a warning is given based on a fluctuation in a power consumption caused due to this failure. Therefore, a situation where such a failure has occurred can be prevented from being left.

Additionally, when time-series information is analyzed, a state where the electrical device 13 is in a standby mode while being simply connected with the outlet 5 can be discriminated from a state where it is actually operating, thus calculating actual operating hours. Further, a degree of consumption of the electrical device 13 can be managed based on the actual operating hours. Specifically, if the actual operating hours of a given electrical device 13 exceed a predetermined value, execution of maintenance, e.g., replacement of a consumable part can be urged. Furthermore, a table showing where and when cautions or warnings are given can be created in the form of a list from the time-series information.

Moreover, since a total power consumption of each power supply system is measured, management that is highly detailed as compared with management achieved by the processing at the steps Sb1 to Sb3 can be performed. For example, when a maximum power consumption already exceeds an allowable value but continuation is allowed due to unavoidable circumstances from necessity in an operation (an operative treatment), a sum total of the power measured values may be possibly sufficiently small. In such a case, before a device with a large maximum power consumption (e.g., an operating microscope) is changed to enter a use status with a large power consumption (e.g., a status where an illumination lamp is turned on), an ME engineer may offer advice to change any other device (e.g., a bed warmer) to enter a use status with a small power consumption (e.g., a status where a temperature setting is lowered).

Additionally, in view of a sum total of maximum power consumptions, selecting and arranging an electrical device and a power supply system to be connected with each other in order to achieve leveling is not necessarily appropriate. Arranging these members to level powers of respective power supply systems based on measured values may be appropriate in some cases. For example, assuming that a first electrical device (a maximum power consumption=1000 W, a power measured value=1000 W) and a second electrical device (a maximum power consumption=1000 W, a power measured value=100 W) are respectively connected with a first power supply system and a third electrical device (a maximum power consumption=1000 W, a power measured value=800 W) and a fourth electrical device (a maximum power consumption=800 W, a power measured value=800 W) are respectively connected with a second power supply system, it can be understood that leveling can be achieved by counter-changing these electrical devices in such a manner that the second electrical device is connected with the second power supply system and the third electrical device is connected with the first power supply system. When management is carried out based on both the maximum power consumption and the power measured value, an ME engineer can recognize such an achievement.

It is to be noted that, when a sum total of power measured values of each power supply system is displayed in the form of, e.g., a time-series graph based on time-series information, providing information that is useful for management of each electrical device can help an ME engineer.

It is to be noted that a simpler digital ohm meter can be used in place of the digital power meter 25*a* to detect whether each electrical device 13 is operating. In this case, although a defect in a power consumption cannot be monitored, monitoring an actual operating status like management of actual operating hours can be carried out. Furthermore, the configuration of the reporting apparatus 25 can be simplified as compared with an example where the digital power meter 25*a* is mounted.

Sixth Embodiment

A sixth embodiment will now be explained with reference to FIG. 30. It is to be noted that, in FIG. 30, like reference numerals denote parts equal to those in FIGS. 1 to 29, thereby omitting a detailed explanation thereof.

A schematic configuration of a management system according to the sixth embodiment is the same as that depicted in FIG. 1, thus omitting an illustration thereof. Moreover, the sixth embodiment is different from the first embodiment in provision of a reporting apparatus 26 in place of the reporting apparatus 1 and contents of management processing by a recording/warning apparatus 4.

FIG. 30 is a block diagram showing a specific configuration of the reporting apparatus 26.

The reporting apparatus 26 includes contacts 1*a*, 1*b*, and 1*c*, contacts 1*d*, 1*e*, and 1*f*, connection lines 1*h*, 1*i*, and 1*j*, a filter circuit 1*k*, a high-frequency MODEM 1*m*, a power supply circuit 1*q*, a digital power meter 25*a*, a storage device 26*a*, and an MPU 26*b*. That is, the reporting apparatus 26 has a configuration similar to that of the reporting apparatus 1, but is different from the reporting apparatus 1 in provision of the storage device 26*a* and the MPU 26*b* in place of the storage device 1*n* and the MPU 1*p* and addition of the digital power meter 25*a*.

The storage device 26a includes, e.g., an EEPROM. The storage device 26a can store software that drives the MPU 26b, device identification information, and maximum power consumption information.

The MPU 26b can read information transmitted through the connection lines 1h and 1i by using a high-frequency MODEM 1m. Further, the MPU 26b can read information stored in the storage device 26a as required. The MPU 26b operates in accordance with the software stored in the storage device 26a, and generates a signal including reporting information that includes the device identification information and the maximum power consumption information stored in the storage device 26a. The MPU 26b outputs the generated signal to the high-frequency MODEM 1m. Additionally, the MPU 26b has a function of acquiring an instruction from an external rewriting device through the high-frequency MODEM 1m and writing software, device identification information, or maximum power consumption information in the storage device 26a in response to this instruction. It is to be noted that the MPU 26b includes a random access memory or a clock signal generation circuit required to execute a program.

An operation of a management system according to the sixth embodiment will now be explained.

The reporting apparatus 26 is attached to a power supply plug of an electrical device 13 as a management target. It is to be noted that, when the reporting apparatus 26 must be discriminated from each other, reference numerals 26-1 to 26-13 are given. That is, the reporting apparatus 26-1 to 26-16 are respectively attached in place of, e.g., the reporting apparatus 1-1 to 1-13 depicted in FIG. 12.

A manager uses the rewriting device 24 to write device identification information and maximum power consumption information concerning an electrical device 13 as an attachment target in the storage device 26a of each reporting apparatus 26 in advance. The device identification information may be identification information arbitrarily assigned for management of this device, or may be identification information created with a production number and a model number of the electrical device 13 being included therein. The maximum power consumption information includes information of a maximum power consumption of the electrical device 13 as an attachment target.

When connecting the electrical device as a management target to an outlet 5, the reporting apparatus 26 attached to this electrical device is connected with a power supply system 6. For example, when an electrical device 13-1 is connected with an outlet 5 provided in an outlet unit 12-1 in an equipment room depicted in FIG. 12, the reporting apparatus 26-1 attached to a power supply connector of this electrical device 13-1 is connected with a power supply system 6b. Then, a power generated by the power supply circuit 1q in the reporting apparatus 26-1 is supplied to the MPU 26b, thereby activating the MPU 26b. At this time, the MPU 26b reads the device identification information and the maximum power consumption information from the storage device 26a, acquires a power measured value output from the digital power meter 25a, and generates a signal including reporting information including the device identification information, the maximum power consumption information, and the power measured value. A high-frequency signal obtained by modulating this signal by using the high-frequency MODEM 1m is transmitted to the outlet side via the filter circuit 1k. The high-frequency signal transmitted from the reporting apparatus 26-1 in this manner is supplied to the power supply system 6b from the outlet 5 provided in the outlet unit 12-1.

Thereafter, the reporting apparatus 26-1 repeatedly transmits the high-frequency signal indicative of the reporting information at each predetermined timing as long as it stays connected with the power supply system 6b. It is to be noted that the MPU 26b acquires the power measured value output from the digital power meter 25a at each timing mentioned above to include the power measured value indicative of a measured value of a power consumption at this moment in the reporting information. Although the reporting apparatus 26-1 may transmit the high-frequency signal at an arbitrary timing, transmitting this signal in accordance with each fixed cycle can be considered. In this example, setting one cycle to approximately one second can practically suffice.

The other reporting apparatus 26 operate like the reporting apparatus 26-1. However, a destination of the high-frequency signal is the power supply system 6 to which the reporting apparatus 26 is connected. For example, in a state similar to FIG. 12, the high-frequency signals are transmitted from the reporting apparatus 26-9 to the power supply system 6a-1-1, from the reporting apparatus 26-11 to the power supply system 6a-1-3, and from the reporting apparatus 26-15 to the power supply system 6a-3-2, respectively.

Furthermore, the reporting apparatus 26 also detects collision and retries transmission as required like the reporting apparatus 1.

As explained above, the high-frequency signal fed to the power supply system 6 is transmitted through the power supply system 6 to be supplied to the recording/warning apparatus 4 like the first embodiment.

First and second databases depicted in, e.g., FIGS. 14 and 15 and a fourth database shown in FIG. 23 are respectively prepared in the recording/warning apparatus 4.

When the recording/warning apparatus 4 receives reporting information from the host collection apparatus 3, it starts plug event monitoring processing. A flow of this plug event monitoring processing is the same as that depicted in the flowchart of FIG. 29. However, in the sixth embodiment, the recording/warning apparatus 4 calculates a total value of maximum power consumptions as a total value of maximum power consumptions indicated in the maximum power consumption information included in the reporting information at a step Sb1.

The recording/warning apparatus 4 carries out unplug event monitoring processing separately from the plug event monitoring processing like the first embodiment.

As explained above, according to the sixth embodiment, the same effects as those of the first to the fifth embodiments can be obtained.

Moreover, according to the sixth embodiment, a third database does not have to be prepared in the recording/warning apparatus 4. When newly adding an electrical device 13 as a monitoring target, a manager does not have to perform an operation of registering a maximum power consumption concerning this electrical device 13 in the recording/warning apparatus 4. Although an operation of writing the maximum power consumption information indicative of a maximum power consumption in the reporting apparatus 26 is required, this operation can be performed near the electrical device 13 as a part of an operation of attaching the reporting apparatus 26 to the electrical device 13. Therefore, the operation is usually easier than that when registering the maximum power consumption in the recording/warning apparatus 4 distanced from the electrical device 13, and an input error hardly occurs.

Seventh Embodiment

A seventh embodiment will now be explained with reference to FIGS. 31 to 33. It is to be noted that, in FIGS. 31 to 33, like reference numerals denote parts equal to those in FIGS. 1 to 30, thereby omitting a detailed explanation thereof.

A schematic configuration of a management system according to the seventh embodiment is the same as that depicted in FIG. 1, thus omitting an illustration thereof. Moreover, the seventh embodiment is different from the first embodiment in provision of a reporting apparatus 25, a sub-collection apparatus 27, and a host collection apparatus 28 in place of the reporting apparatus 1, the sub-collection apparatus 2, and the host collection apparatus 3 and contents of management processing by the recording/warning apparatus 4.

FIG. 31 is a block diagram showing a specific configuration of the sub-collection apparatus 27.

The sub-collection apparatus 27 includes contacts 2a, 2b, 2c, 2d, 2e, and 2f, connection lines 2g, 2h, and 2i, a filter circuit 2j and 2k, a high-frequency MODEM 2m, a storage device 2n, a power supply circuit 2q, a breaker 2r, a digital power meter 27a, and an MPU 27b. That is, the sub-collection apparatus 27 has a configuration similar to that of the sub-collection apparatus 2, but is different from the sub-collection apparatus 2 in provision of the MPU 27b in place of the MPU 2p and addition of the digital power meter 27a.

The digital power meter 27a measures a power consumption of the sub-collection apparatus 27 on a power line output side. The digital power meter 27a supplies a power measured value to the MPU 27b.

The MPU 27b can read information transmitted through the connection lines 2g and 2h by using the high-frequency MODEM 2m. Additionally, the MPU 27b can read information stored in the storage device 2n as required. The MPU 27b processes received reporting information to include system identification information stored in the storage device 2n and a power measured value output from the digital power meter 27a, and outputs a signal including the processed reporting information to the high-frequency MODEM 2m. Additionally, the MPU 27b can transmit a signal requesting the reporting apparatus 25 to supply information or a signal instructing remedying software through the high-frequency MODEM 2m and the filter circuit 2j. It is to be noted that the MPU 27b includes a random access memory or a clock signal generation circuit required to execute a program.

Figure 32:
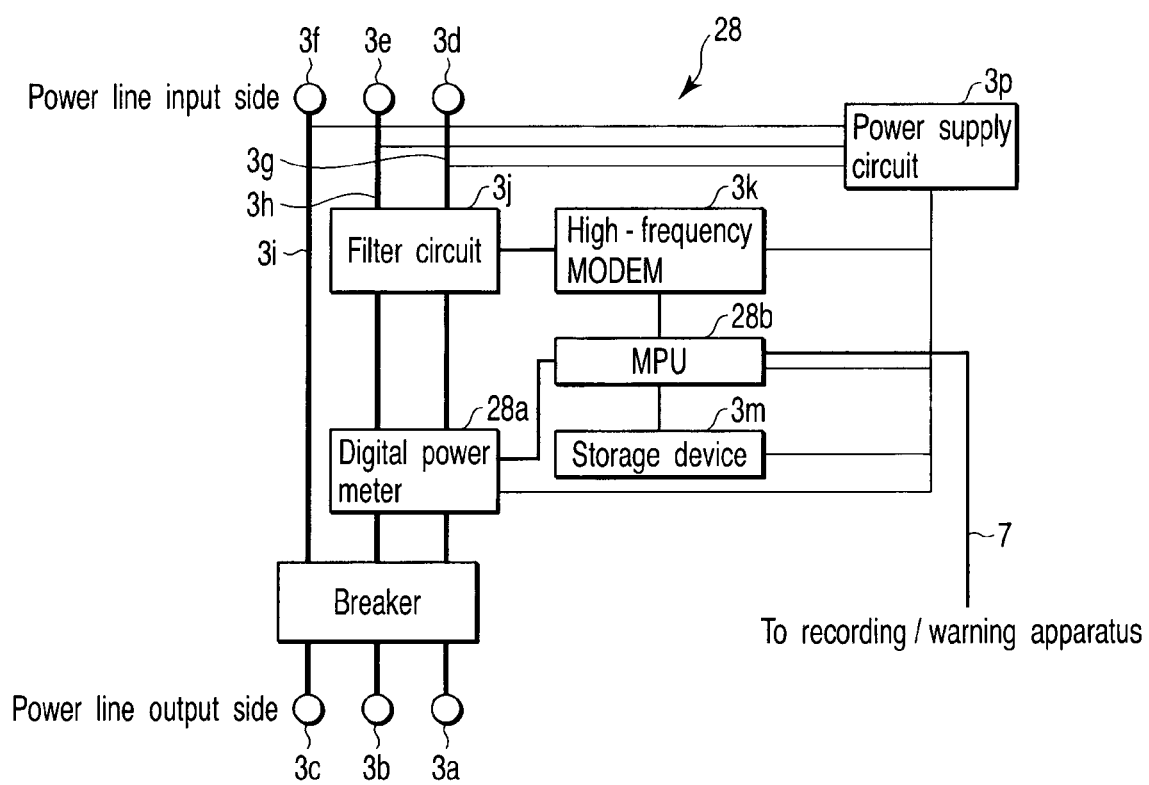
FIG. 32 is a block diagram showing a specific configuration of a host collection apparatus in the seventh embodiment.

FIG. 32 is a block diagram showing a specific configuration of the host collection apparatus 28.

The host collection apparatus 28 includes contacts 3a, 3b, 3c, 3d, 3e, and 3f, connection lines 3g, 3h, and 3j, a filter circuit 3j, a high-frequency MODEM 3k, a storage device 3m, a power supply circuit 3p, a breaker 3q, a digital power meter 28a, and an MPU 28b. That is, the host collection apparatus 28 has a configuration similar to that of the host collection apparatus 3, but is different from the host collection apparatus 3 in that the MPU 28b is provided in place of the MPU 3n and the digital power meter 28a is additionally provided.

The digital power meter 28a measures a power consumption of the host collection apparatus 28 on a power line output side in real time. The digital power meter 28a transmits a power measured value to the MPU 28b.

The MPU 28b can read information fed via the connection lines 3g and 3h by using the high-frequency MODEM 3k. Further, the MPU 28b can read information stored in the storage device 3m as required. The MPU 28b processes received reporting information to include system identification information stored in the storage device 3m and a power measured value output from the digital power meter 28a and outputs a signal including the processed reporting information to the high-frequency MODEM 3k. Furthermore, the MPU 28b can transmit a signal requesting the reporting apparatus 25 to send information or a signal instructing remedying software through the high-frequency MODEM 3k and the filter circuit 3j. It is to be noted that the MPU 28b includes a random access memory or a clock signal generation circuit required to execute a program.

An operation of a management system according to the seventh embodiment will now be explained.

The reporting apparatus 25 is attached to a power supply plug of an electrical device 13 as a management target. Moreover, the sub-collection apparatus 27 is connected to a power supply system at the same position as that of the sub-collection apparatus 2, and the host collection apparatus 28 is connected with the same at the same position as that of the host collection apparatus 3. It is to be noted that, when the reporting apparatus 25 must be discriminated from each other in the following explanation, reference numerals 25-1 to 25-16 are given. When the sub-collection apparatus 27 must be discriminated from each other, reference numerals 27-1 to 27-3, 27-1-1 to 27-1-3, 27-2-1 to 27-2-3, and 27-3-1 to 27-3-3 are given. Additionally, when the sub-collection apparatus 28 must be discriminated from each other, reference numerals 7-1 and 7-2 are given. That is, for example, the reporting apparatus 25-1 to 25-16 are attached in place of the reporting apparatus 1-1 to 1-13 depicted in, e.g., FIG. 12, and the sub-collection apparatus 27-1 to 27-3, 27-1-1 to 27-1-3, 27-2-1 to 27-2-3, and 27-3-1 to 27-3-3 and the host collection apparatus 28-1 and 28-2 are respectively provided in place of the sub-collection apparatus 2-1 to 2-3, 2-1-1 to 2-1-3, 2-2-1 to 2-2-3, 2-3-1 to 2-3-3 and the host collection apparatus 3-1 and 3-2.

When connecting an electrical device as a management target to an outlet, the reporting apparatus 25 attached to this electrical device is connected with the power supply system 6. For example, when the electrical device 13-1 is connected with an outlet 5 provided in an outlet unit 12-1 in an equipment room depicted in FIG. 12, the reporting apparatus 25-1 attached to a power supply connector of this electrical device 13-1 is connected to the power supply system 6b. Then, the reporting apparatus 25-1 generates reporting information as explained above in conjunction with the fifth embodiment, and transmits a high-frequency signal indicative of this reporting information to the power supply system 6b.

The other reporting apparatus 25 operate like the reporting apparatus 25-1. However, a destination of the high-frequency signal is the power supply system 6 to which the reporting apparatus 25 is connected. For example, in a state similar to FIG. 12, the high-frequency signals are transmitted from the reporting apparatus 25-9 to the power supply system 6a-1-1, from the reporting apparatus 25-11 to the power supply system 6a-1-3, and from the reporting apparatus 25-15 to the power supply system 6a-3-2, respectively.

The high-frequency signal transmitted to the power supply system 6b as explained above reaches the host collection apparatus 28-2. Then, in the host-collection apparatus 28-2, this high-frequency signal is separated from an alternating voltage by the filter circuit 3j and demodulated by the high-frequency MODEM 3k, thereby extracting reporting information. The MPU 28b processes the extracted reporting information to include system identification information stored in the storage device 3m and a power measured value output from the digital power meter 28a, and supplies the processed reporting information to the recording/warning apparatus 4.

On the other hand, the high-frequency signal supplied, e.g., from the reporting apparatus 25-9 to the power supply system 6a-1-1 reaches the sub-collection apparatus 27-1-1. Then, in the sub-collection apparatus 27-1-1, this high-frequency signal is separated from an alternating voltage by the filter circuit 2j and demodulated by the high-frequency MODEM 2m, thereby extracting reporting information. The MPU 27b processes the extracted reporting information to include system identification information stored in the storage device 2n. Then, a high-frequency signal obtained by modulating a signal including the processed reporting information by the high-frequency MODEM 2m is transmitted to the power line input side via the filter circuit 2k. The high-frequency signal fed from the sub-collection apparatus 27-1-1 in this manner is transmitted to the power supply system 6a-1 to reach the sub-collection apparatus 27-1. Additionally, the MPU 27b generates a signal including notification information that includes system identification information stored in the storage device 2n and a power measured value read from the digital power meter 27a. Further, a high-frequency signal obtained by modulating this signal by the high-frequency MODEM 2m is superimposed on an alternating voltage to be transmitted to the power line input side via the filter circuit 2k. Then, the sub-collection apparatus 27-1 transmits the high-frequency signal to the power supply system 6a like the sub-collection apparatus 27-1-1. The high-frequency signal supplied to the power supply system 6a reaches the host collection apparatus 28-1. As explained above, in the sub-collection apparatus 27-1 to 27-3, 27-1-1 to 27-1-3, 27-2-1 to 27-2-3, and 27-3-1 to 27-3-3, reporting information is relayed.

When the high-frequency signal is input to the host collection apparatus 27-1 as explained above, the host collection apparatus 27-1 transmits reporting information to the recording/warning apparatus 4 like the host collection apparatus 27-2.

As explained above, reporting information transmitted from each reporting apparatus 25 is transmitted to the recording/warning apparatus 4 in a state where system identification information of the sub-collection apparatus 27 or the host collection apparatus 28 that has relayed the reporting information is added to the reporting information, or a power measured value is transmitted to the recording/warning apparatus 4 in a state where corresponding system identification information to which the digital power meter 27a or the digital power meter 28a that has measured the power measured value is added to the power measured value.

First to fourth databases are respectively prepared in the recording/warning apparatus 4 like the third embodiment.

Meanwhile, when the recording/warning apparatus 4 receives reporting information from the host collection apparatus 28, it executes such plug event monitoring processing as shown in FIG. 29. On the other hand, when the recording/warning apparatus 4 receives notification information from the host collection apparatus 28, it starts reported-power difference monitoring processing shown in FIG. 33.

At a step Sd1, the recording/warning apparatus 4 calculates a reported-power difference. For example, the recording/warning apparatus 4 extracts the latest power measured values concerning respective electrical devices connected with a power supply system corresponding to system identification information included in currently received notification information from time-series information, and calculates a total value of these power measured values. Then, the recording/warning apparatus 4 calculates the reported-power difference as a difference between the thus calculated total value and a power measured value included in the currently received notification information. At a step Sd2, the recording/warning apparatus 4 confirms whether a state where the reported-power difference exceeds a preset allowable value (e.g., 10 W) continues in the fixed period. The allowable value may be fixedly given as a design value, or may be arbitrarily set by a manager.

Although the reported-power difference also occurs in a state where a corresponding power supply system causes leakage of current, it mainly occurs when an electrical device 13 to which the reporting apparatus 25 is not attached is used. Therefore, this is defined as an unauthorized device connection event.

If YES is determined at the step Sd2, the recording/warning apparatus 4 advances to a step Sd3 from the step Sd2. At the step Sd3, the recording/warning apparatus 4 adds unauthorized device connection event information to time-series information. The unauthorized device connection event information is indicative of, e.g., system identification information of a power supply system that is determined to be connected with an unauthorized device.

At a step Sd4, the recording/warning apparatus 4 gives a caution about occurrence of an unauthorized device connection event and thereby urges to take a countermeasure. This caution is given to enable determining a power supply system 6 in which the unauthorized device connection event occurs. Further, this caution requests removal of an unauthorized device, calls attention since the unauthorized device is used, or urges to take an appropriate measure, e.g., requesting urgent attachment of a reporting apparatus. This caution may continue until a predetermined time elapses, or may continue until a manager instructs cancellation, or may continue until the unauthorized device connection event concerning the power supply system 6 as a current caution target is eliminated.

Furthermore, when giving the caution is finished, the recording/warning apparatus 4 terminates the plug event monitoring processing. It is to be noted that, if NO is determined at the step Sd2, the recording/warning apparatus 4 terminates the reported-power difference monitoring processing without executing the processing at the step Sd3.

The recording/warning apparatus 4 carries out unplug event monitoring processing separately from the plug event monitoring processing and the reported-power difference monitoring processing like the first embodiment.

The warning operation by the recording/warning apparatus 4 can be carried out by outputting a warning sound or a voice message or displaying a character or an icon. Moreover, if an alarm unit 14 is disposed in a room where the power supply system 6 as a warning target is wired, the alarm unit 14 may give a warning.

As explained above, according to the seventh embodiment, the same effects as those of the first, the third, and the fifth embodiments can be obtained. Additionally, according to the seventh embodiment, a warning is given when the unauthorized device connection event occurs. Therefore, it is possible to avoid a situation where an electrical device 13 that cannot be managed because a reporting apparatus 25 is not attached is used, or call attention to prevent an inconvenience, e.g., tripping of a breaker due to this situation.

Further, when time-series information is analyzed, a table showing where and when a warning of the unauthorized device connection event is produced can be created in the form of a list. Based on information in such a list, it is possible to reveal a room where an operator has violated rules and obtain statistical evidences, e.g., a frequency of violation.

It is to be noted that, when the sub-collection apparatus 27 is connected to the power line output side, the host collection apparatus 3 may be used. All the host collection apparatus may be determined as the host collection apparatus 3 by connecting the sub-collection apparatus 27 to the power line output side of all the host collection apparatus.

Furthermore, the reporting apparatus 26 may be provided in place of the reporting apparatus 25. In this case, the recording/warning apparatus 4 calculates a total value of maximum power consumptions at the step Sb1 as a total value of maximum power consumptions indicated in maximum power consumption information included in reporting information. When such a configuration is adopted, a third database does not have to be prepared in the recording/warning apparatus 4. When an electrical device 13 as a monitoring target is newly added, a manager does not have to perform an operation of registering a maximum power consumption concerning this electrical device 13 in the recording/warning apparatus 4. Although an operation of writing maximum power consumption information indicative of a maximum power consumption in the reporting apparatus 26 is required, this operation can be performed near this electrical device 13 as a part of an operation of attaching the reporting apparatus 26 to the electrical device 13. Therefore, the operation is usually easier than that when registering the maximum power consumption in the recording/warning apparatus 4 distanced from the electrical device 13, and an input error hardly occurs.

Eighth Embodiment

An eighth embodiment will now be explained with reference to FIGS. 34 to 36. It is to be noted that, in FIGS. 34 to 36, like reference numerals denote parts equal to those in FIGS. 1 to 33, thereby omitting a detailed explanation thereof.

A schematic configuration of a management system according to the eighth embodiment is the same as that depicted in FIG. 1, thereby omitting an illustration thereof. Furthermore, the eighth embodiment is different from the first embodiment in provision of a reporting apparatus 29, a sub-collection apparatus 30, and a host collection apparatus 31 in place of the reporting apparatus 1, the sub-collection apparatus 2, and the host collection apparatus 3 and contents of management processing by a recording/warning apparatus 4.

Figure 34:
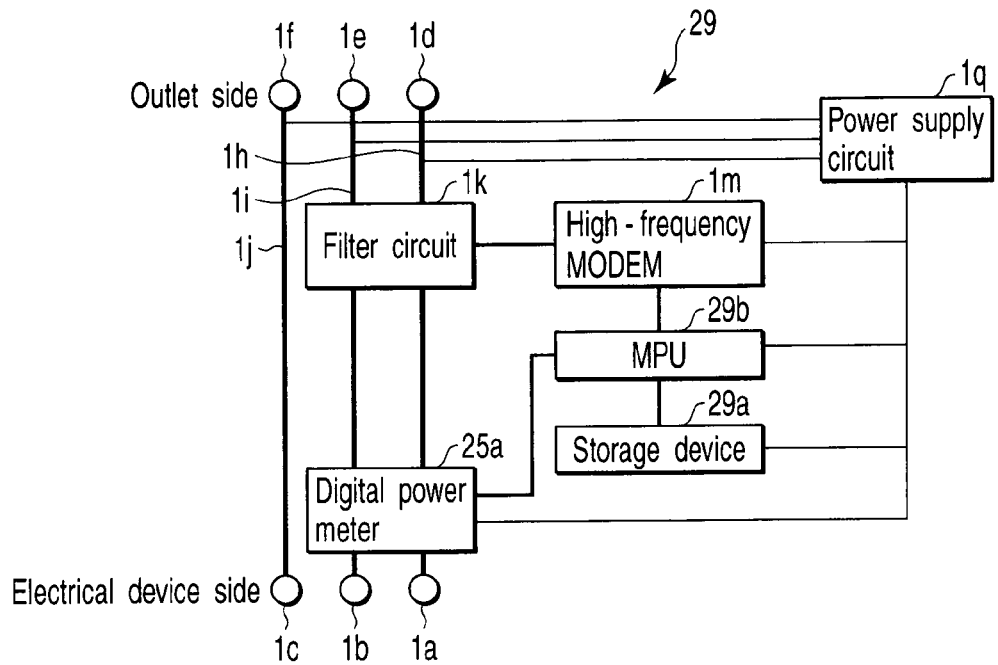
FIG. 34 is a block diagram showing a specific configuration of a reporting apparatus in an eighth embodiment.

FIG. 34 is a block diagram showing a specific configuration of the reporting apparatus 29.

The reporting apparatus 29 includes contacts 1a, 1b, and 1c, contacts 1d, 1e, and 1f, connection lines 1h, 1i, and 1j, a filter circuit 1k, a high-frequency MODEM 1m, a power supply circuit 1q, a digital power meter 25a, a storage device 29a, and an MPU 29b. That is, the reporting apparatus 29 has a configuration similar to that of the reporting apparatus 1, but is different from the reporting apparatus 1 in that the storage device 29a and the MPU 29b are provided in place of the storage device 1n and the MPU 1p and the digital power meter 25a is additionally provided.

The storage device 29a includes, e.g., an EEPROM. The storage device 29a can store software that drives the MPU 29b, device identification information, maximum power consumption information, device information, and use condition information.

The MPU 29b can read information transmitted through the connection lines 1h and 1i by using the high-frequency MODEM 1m. Further, the MPU 29b can read information stored in the storage device 29a as required. The MPU 29b operates in accordance with software stored in the storage device 29a, and generates reporting information including device identification information, maximum power consumption information, device information, and use condition information stored in the storage device 29a. The MPU 29b outputs a signal including the generated reporting information to the high-frequency MODEM 1m. Furthermore, the MPU 29b has a function of acquiring an instruction from an external rewriting device via the high-frequency MODEM 1m and writing software, device identification information, or maximum power consumption information in the storage device 29a in response to this instruction. It is to be noted that the MPU 29b includes a random access memory or a clock signal generation circuit required to execute a program.

Figure 35:
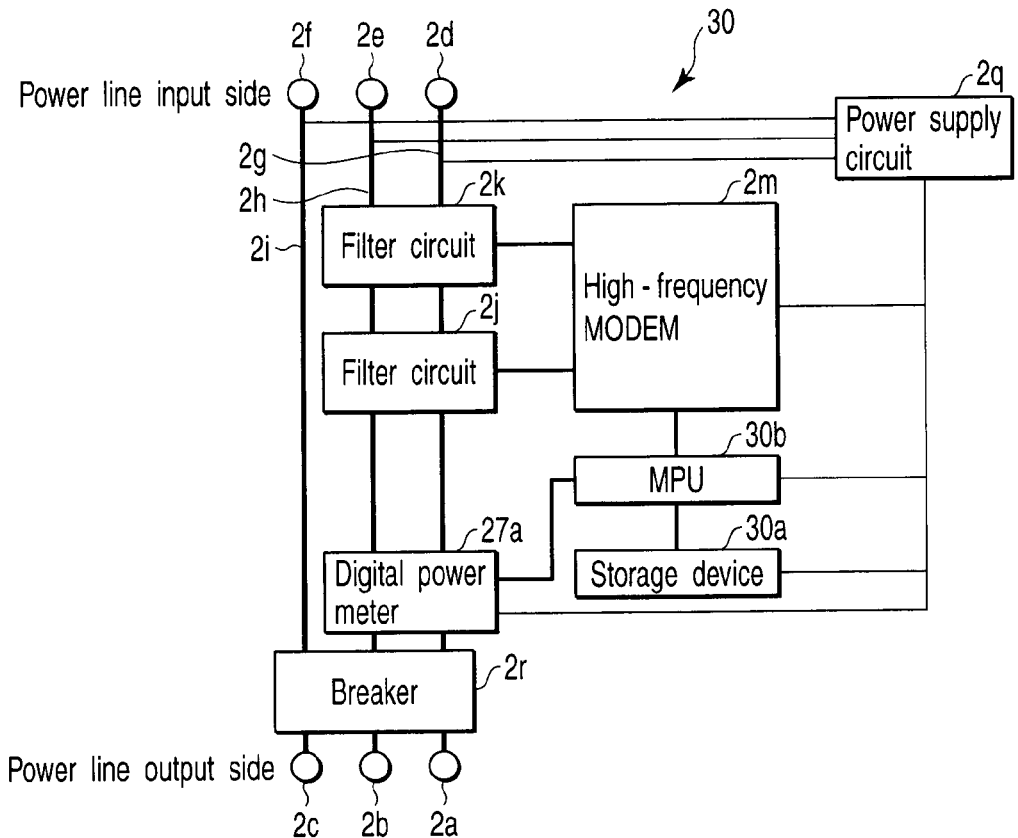
FIG. 35 is a block diagram showing a specific configuration of a sub-collection apparatus in the eighth embodiment.

FIG. 35 is a block diagram showing a specific configuration of the sub-collection apparatus 30.

The sub-collection apparatus 30 includes contacts 2a, 2b, 2c, 2d, 2e, and 2f, connection lines 2g, 2h, and 2i, filter circuits 2j and 2k, a high-frequency MODEM 2m, a power supply circuit 2q, a breaker 2r, a digital power meter 27a, a storage device 30a, and an MPU 30b. That is, the sub-collection apparatus 20 has a configuration similar to that of the sub-collection apparatus 2, but is different from the sub-collection apparatus 2 in that the storage device 30a and the MPU 30b are provided in place of the storage device 2n and the MPU 2p and the digital power meter 27a is additionally provided.

The storage device 30a includes, e.g., an EEPROM. The storage device 30a can store software that drives the MPU 30b, system identification information, wiring information, and rated power information.

The MPU 30b can read information transmitted through the connection lines 2g and 2h by using the high-frequency MODEM 2m. Moreover, the MPU 30b can read information stored in the storage device 30a as required. The MPU 30b processes received reporting information to include system identification information stored in the storage device 2n, and outputs a signal including the processed reporting information to the high-frequency MODEM 2m. Additionally, the MPU 30b generates first notification information including system identification information, wiring information, and rated power information stored in the storage device 30a, and outputs a signal including this first notification information to the high-frequency MODEM 2m. Further, the MPU 30b generates second notification information including system identification information stored in the storage device 30a and a power measured value read from the digital power meter 27a, and outputs a signal including this second notification information to the high-frequency MODEM 2m. Furthermore, the MPU 30b can transmit a signal requesting the reporting apparatus 29 to send information or a signal instructing remedying software via the high-frequency MODEM 2m and the filter circuit 2j. It is to be noted that the MPU 30b includes a random access memory or a clock signal generation circuit required to execute a program.

FIG. 36 is a block diagram showing a specific configuration of the host collection apparatus 31.

The host collection apparatus 31 includes contacts 3a, 3b, 3c, 3d, 3e, and 3f, connection lines 3g, 3h, and 3i, a filter circuit 3j, a high-frequency MODEM 3k, a power supply circuit 3p, a breaker 3q, a digital power meter 28a, a storage device 31a, and an MPU 31b. That is, the host collection apparatus 31 has a configuration similar to that of the host collection apparatus 3, but is different from the host collection apparatus 3 in that the storage device 31a and the MPU 31b are provided in place of the storage device 3m and the MPU 3n and the digital power meter 28a is additionally provided.

The storage device 31a includes, e.g., an EEPROM. The storage device 31a can store software that drives the MPU 31b, system identification information, wiring information, and rated power information.

The MPU 31b can read information transmitted through the connection lines 3g and 3h by using the high-frequency MODEM 3k. Moreover, the MPU 31b can read information stored in the storage device 3m as required. The MPU 31b processes received reporting information to include system identification information stored in the storage device 3m, and outputs a signal including the processed reporting information to the high-frequency MODEM 3k. Additionally, the MPU 31b generates first notification information including system identification information, wiring information, rated power information, and cutoff power information stored in the storage device 3m, and outputs a signal including this first notification information to the high-frequency MODEM 2m. Further, the MPU 31b generates second notification information including system identification information stored in the storage device 3m and a power measured value read from the digital power meter 28a, and outputs a signal including this second notification information to the high-frequency MODEM 2m. Furthermore, the MPU 31b can transmit a signal requesting the reporting apparatus 29 to send information or a signal instructing remedying software through the high-frequency MODEM 3k and the filter circuit 3j. It is to be noted that the MPU 31b includes a random access memory or a clock signal generation circuit required to execute program.

An operation of the management system according to the eighth embodiment will now be explained.

The reporting apparatus 29 is attached to a power supply plug of an electrical device 13 as a management target. Moreover, the sub-collection apparatus 30 is connected to a power supply system 6 at the same position as that of the sub-collection apparatus 2, and the host collection apparatus 31 is connected to the same at the same position as that of the host collection apparatus 3. It is to be noted that, when the reporting apparatus 29 must be discriminated from each other, reference numerals 29-1 to 29-16 are given. When the sub-collection apparatus 30 must be discriminated from each other, reference numerals 30-1 to 30-3, 30-1-1 to 30-1-3, 30-2-1 to 30-2-3, and 30-3-1 to 30-3-3 are given. Additionally, when the host collection apparatus 31 must be discriminated from each other, reference numerals 31-1 and 31-2 are given. That is, the reporting apparatus 29-1 to 29-16 are respectively attached in place of, e.g., the reporting apparatus 1-1 to 1-13 shown in FIG. 12, and the sub-collection apparatus 30-1 to 30-3, 30-1-1 to 30-1-3, 30-2-1 to 30-2-3, and 30-3-1 to 30-3-3 and the host collection apparatus 31-1 and 31-2 are provided in place of the sub-collection apparatus 2-1 to 2-3, 2-1-1 to 2-1-3, 2-2-1 to 2-2-3, and 2-3-1 to 2-3-3 and the host collection apparatus 3-1 and 3-2.

A manager uses the rewriting device 24 to write device identification information, maximum power consumption information, device information, and use condition information concerning an electrical device 13 as an attachment target in the storage device 29a of each reporting apparatus 29 in advance. The device identification information may be identification information arbitrarily allocated for management of this device, or may be identification information created to include a production number and a model number of the electrical device 13. The maximum power consumption information includes information of a maximum power consumption of the electrical device 13 as an attachment target. The device information is information useful for the manager to specify the electrical device 13, e.g., a model name of the electrical device 13 as an attachment target. The use condition information is indicative of use conditions, e.g., a usable location, a banned location, or whether connection to an outlet should be constantly achieved in relation to the electrical device 13 as an attachment target.

Moreover, the manager writes system identification information, wiring information, rated power information, and cutoff power information in the storage devices 30a and 31a of the sub-collection apparatus 30 and the host collection apparatus 31 in advance. The system identification information is identification information allocated to the power supply system 6 connected to the power line output side of the sub-collection apparatus 30 or the host collection apparatus 31 having the storage device 30a or 31a provided therein. The wiring information is indicative of a location (e.g., a room or a position of the outlet 5) to which the power supply system 6 having the system identification information allocated thereto is wired. The rated power information is indicative of a rated power of the power supply system 6 to which the system identification information is allocated. The cutoff power information is indicative of a power on the power line output side when breakers 2r and 3q block off the power line output side.

When connecting the electrical device as a management target to the outlet 5, the reporting apparatus 29 attached to this electrical device is connected with the power supply system 6. For example, when the electrical device 13-1 is connected with the outlet 5 provided in an outlet unit 12-1 in an equipment room depicted in FIG. 12, the reporting apparatus 29-1 attached to a power supply connector of this electrical device 13-1 is connected with the power supply system 6b. Then, in the reporting apparatus 29-1, a power generated by the power supply circuit 1q is supplied to the MPU 29b, thereby activating the MPU 29b. At this time, the MPU 29b reads device identification information, maximum power consumption information, device information, and use condition information from the storage device 26a, acquires a power measured value output from the digital power meter 25a, and generates a signal including reporting information that includes the device identification information, the maximum power consumption information, the device information, the use condition information, and the power measured value. A high-frequency signal obtained by modulating this signal by using the high-frequency MODEM 1m is transmitted to the outlet side via the filter circuit 1k. The high-frequency signal transmitted from the reporting apparatus 29-1 in this manner is supplied to the power supply system 6b from the outlet provided in the outlet unit 12-1.

Thereafter, the reporting apparatus 29-1 repeatedly transmits the high-frequency signal indicative of the reporting information at each predetermined timing as long as it stays connected with the power supply system 6b. It is to be noted that the MPU 29b acquires the power measured value output from the digital power meter 25a at the timing mentioned above to thereby include the power measured value indicative of a measured value of a power consumption at this moment in the reporting information. Although the reporting apparatus 29-1 may transmit the high-frequency signal at an arbitrary timing, transmitting this signal in accordance with each fixed cycle can be considered. In this example, setting one cycle to approximately one second can practically suffice.

The other reporting apparatus 29 also operate like the reporting apparatus 29-1. However, a destination of the high-frequency signal is the power supply system 6 to which the reporting apparatus 29 is connected. For example, in a state similar to FIG. 12, the high-frequency signals are transmitted from the reporting apparatus 29-9 to the power supply system 6a-1-1, from the reporting apparatus 29-11 to the power supply system 6a-1-3, and from the reporting apparatus 29-15 to the power supply system 6a-3-2, respectively.

Moreover, the reporting apparatus 29 also detects collision and retries transmission as required like the reporting apparatus 1.

The high-frequency signal transmitted to the power supply system 6b as explained above reaches the host collection apparatus 31-2. Then, in the host collection apparatus 31-2, this high-frequency signal is separated from an alternating voltage by the filter circuit 3j and demodulated by the high-frequency MODEM 3k, thereby extracting reporting information. The MPU 31b processes the extracted reporting information to include system identification information stored in the storage device 31a, and transmits the processed reporting information to the recording/warning apparatus 4. Additionally, the MPU 31b generates first notification information including system identification information, wiring information, rated power information, and cutoff power information stored in the storage device 31a in response to a request from the recording/warning apparatus 4, and transmits this first notification information to the recording/warning apparatus 4. Further, the MPU 31b generates second notification information including the system identification information stored in the storage device 31a and a power measured value output from the digital power meter 28a in response to a request from the recording/warning apparatus 4, and transmits this second notification information to the recording/warning apparatus 4.

On the other hand, for example, the high-frequency signal transmitted from the reporting apparatus 29-9 to the power supply system 6a-1-1 reaches the sub-collection apparatus 30-1-1. Then, in the sub-collection apparatus 30-1-1, this high-frequency signal is separated from an alternating voltage by the filter circuit 2j and demodulated by the high-frequency MODEM 2m, thereby extracting reporting information. The MPU 30b processes the extracted reporting information to include system identification information stored in the storage device 30a. Furthermore, a high-frequency signal obtained by modulating the processed reporting information by the high-frequency MODEM 2m is transmitted to the power line input side via the filter circuit 2k. Moreover, the MPU 30b generates first notification information including the system identification information, wiring information, rated power information, and cutoff power information stored in the storage device 31a in response to a request from the recording/warning apparatus 4. A high-frequency signal obtained by modulating a signal including this first notification information by the high-frequency MODEM 2m is superimposed on an alternating voltage and transmitted to the power line input side via the filter circuit 2k. Additionally, the MPU 30 generates second notification information including the system identification information stored in the storage device 31a and a power measured value output from the digital power meter 28a in response to a request from the recording/warning apparatus 4. A high-frequency signal obtained by modulating a signal including this second notification information by the high-frequency MODEM 2m is superimposed on an alternating voltage and transmitted to the power line input side via the filter circuit 2k. The high-frequency signal fed from the sub-collection apparatus 30-1-1 in this manner is transmitted to the power supply system 6a-1 to reach the sub-collection apparatus 30-1. Then, the sub-collection apparatus 30-1 supplies the high-frequency signal to the power supply system 6a like the sub-collection apparatus 30-1-1. The high-frequency signal transmitted to the power supply system 6a reaches the host collection apparatus 31-1. As explained above, in the sub-collection apparatus 30-1 to 30-3, 30-1-1 to 30-1-3, 30-2-1 to 30-2-3, and 30-3-1 to 30-3-3, reporting information is relayed.

Upon receiving the high-frequency signal as explained above, the host collection apparatus 31-1 transmits reporting information to the recording/warning apparatus 4 like the host collection apparatus 31-2.

In this manner, the recording/warning apparatus 4 can collect the reporting information transmitted from each reporting apparatus 29, the system identification information, the wiring information, the rated power information, and the cutoff power information of the sub-collection apparatus 30 or the host collection apparatus 31 that has relayed the reporting information, or the measured value obtained by the digital power meter 27a or the digital power meter 28a. The recording/warning apparatus 4 constitutes first to fourth databases based on the collected information.

Moreover, the recording/warning apparatus 4 executes the same plug event monitoring processing as that in the third embodiment while making reference to each of the thus constituted databases.

As explained above, according to the eighth embodiment, the same effects as those of the seventh embodiment can be obtained.

Additionally, according to the eighth embodiment, the first to the fourth databases do not have to be prepared in the recording/warning apparatus 4, and the same effects as those of the fourth embodiment can be obtained.

Further, although an operation of writing various kinds of information in the sub-collection apparatus 30 and the host collection apparatus 31 is required, this is restricted to an occasion of configuring a system or changing a structure of the power supply system 6, and its frequency is generally small.

Furthermore, as explained above, the fact that the databases in the recording/warning apparatus 4 do not have to be updated is very convenient when using the plurality of recording/warning apparatus 4 to manage each system. That is, when each of the plurality of recording/warning apparatus 4 has databases, all the databases must be updated when changing any system, which is troublesome. Moreover, updating databases in some of the recording/warning apparatus 4 may be possibly forgotten, but these inconveniences can be effectively avoided according to the eighth embodiment.

Ninth Embodiment

A ninth embodiment will now be explained hereinafter with reference to FIGS. 37 to 41. It is to be noted that, in FIGS. 37 to 41, like reference numerals denote parts equal to those in FIGS. 1 to 36, thereby omitting a detailed explanation thereof.

Figure 37:
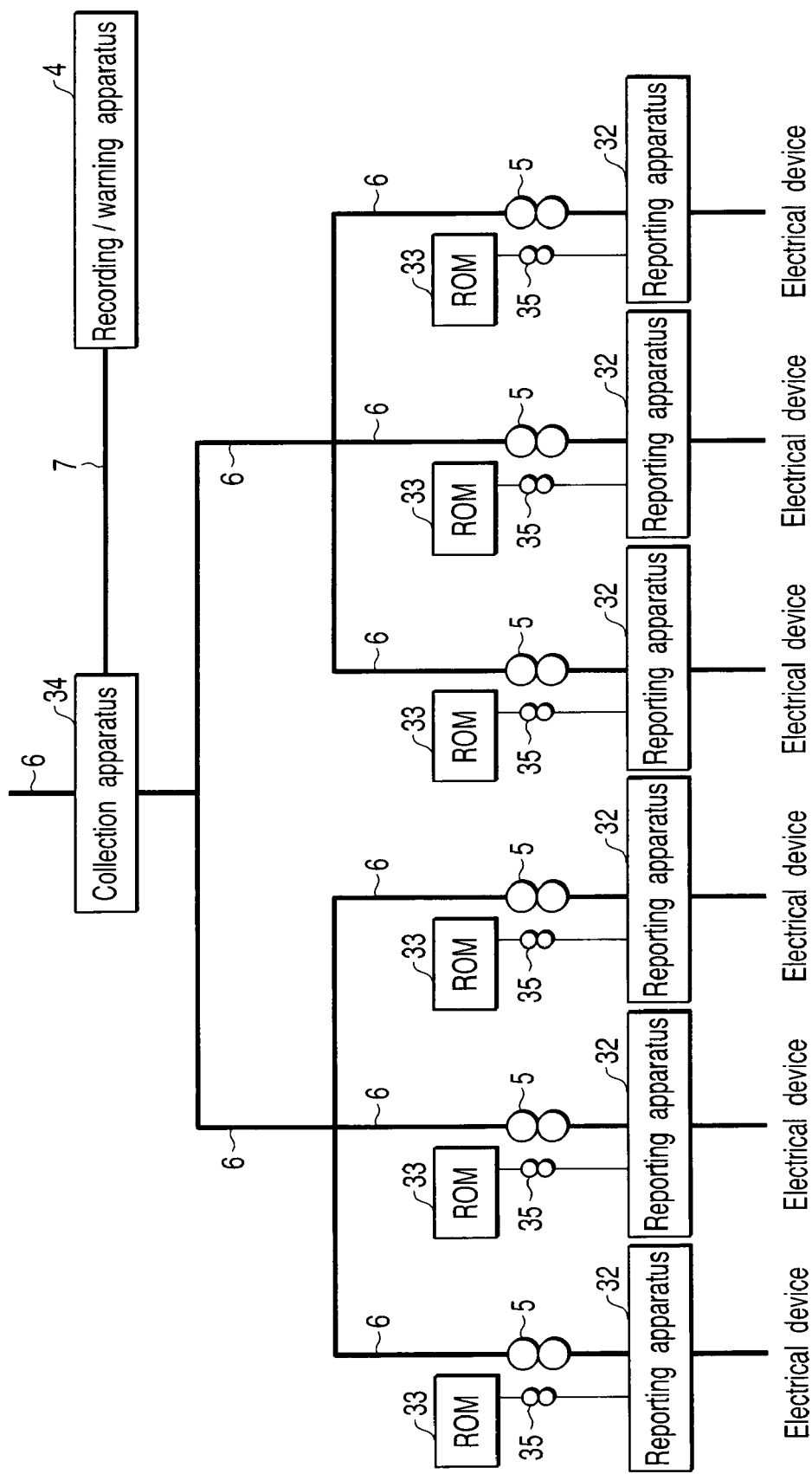
FIG. 37 is a block diagram showing a schematic configuration of a management system in a ninth embodiment.

FIG. 37 is a block diagram showing a schematic configuration of a management system according to the ninth embodiment.

The management system according to the ninth embodiment includes a recording/warning apparatus 4, reporting apparatus 32, ROMs 33, and an collection apparatus 34.

The reporting apparatus 32 is attached to a power supply plug of an electrical device as a management target. The reporting apparatus 32 is inserted into an outlet 5. The outlet 5 is disposed to a power supply system 6 through which a power is supplied to the electrical device. The reporting apparatus 1 supplies the power fed via the power supply system 6 to the electrical device. The reporting apparatus 32 outputs reporting information including unique device identification information or information read from the ROM 33 to the upstream side of the power supply system 6.

The ROM 33 is provided near the outlet 5. The ROM 33 stores unique outlet identification information.

The collection apparatus 34 is disposed to the power supply system 6 on the most upstream side. The collection apparatus 34 acquires reporting information output from the reporting apparatus 32. The collection apparatus 34 transmits the acquired reporting information to the recording/warning apparatus 4 via a dedicated communication line 7.

FIG. 38 is a block diagram showing a specific configuration of the reporting apparatus 32.

The reporting apparatus 32 includes contacts 1a, 1b, and 1c, contacts 1d, 1e, and 1f, connection lines 1h, 1i, and 1j, a filter circuit 1k, a high-frequency MODEM 1m, a power supply circuit 1q, a digital power meter 25a, a storage device 32a, an information plug 32b, and an MPU 32c. That is, the reporting apparatus 32 has a configuration similar to that of the reporting apparatus 1, but is different from the reporting apparatus 1 in that the storage device 32a and the MPU 32c are provided in place of the storage device 1n and the MPU 1p and the digital power meter 25a and the information plug 32b are additionally provided.

The storage device 32a includes, e.g., an EEPROM. The storage device 32a can store software that drives the MPU 32c and device identification information.

The information plug 32b is coupled with an information connector 35 arranged near the outlet 5 to connect the ROM 33 with the MPU 32c.

The MPU 32c can read information transmitted through the connection lines 1h and 1i by using the high-frequency MODEM 1m. Additionally, the MPU 32b can read information stored in the storage device 32a as required. The MPU 32c can read information stored in the ROM 33 connected through the information plug 32b and the information connector 35 as required. The MPU 32c operates in accordance with software stored in the storage device 32a, and generates reporting information including the device identification information stored in the storage device 32a and the information stored in the ROM 33. The MPU 32c outputs a signal including the generated reporting information to the high-frequency MODEM 1m. Further, the MPU 32c has a function of acquiring an instruction from an external rewriting device via the high-frequency MODEM 1m and writing software, device identification information, or maximum power consumption information in the storage device 32a in response to this instruction. It is to be noted that the MPU 32c includes a random access memory or a clock signal generation circuit required to execute a program.

FIG. 39 is a block diagram showing a configuration of a rewriting device 36.

The rewriting device 36 includes contacts 36a, 36b, and 36c, contacts 36d, 36e, and 36f, connection lines 36g, 36h, and 36i, an information connector 36j, a storage device 36k, an MPU 36m, and a power supply circuit 36n.

The contacts 36a, 36b, and 36c are respectively provided in three insertion openings. When the three contacts 1d, 1e, and 1f of the reporting apparatus 29 are inserted into these insertion openings, the contacts 1d, 1e, and 1f come into contact with the contacts 36a, 36b, and 36c, respectively.

The contacts 36d, 36e, and 36f are provided to the power supply plug. When this power supply plug is inserted into an outlet, these contacts respectively come into contact with the three contacts provided in the outlet.

The connection lines 36g, 36h, and 36i connect the contacts 36a, 36g, and 36c with the contacts 36d, 36e, and 36f, respectively. It is to be noted that the contacts 36c and 36f are used for grounding and the connection line 36i is a grounding line.

The information connector 36j is coupled with the information plug 32b to connect the MPU 36m with the MPU 32c.

The storage device 36k includes, e.g., a ROM. The storage device 36k stores software that drives the MPU 36m.

The MPU 36m generates instruction information to instruct the MPU 32c to rewrite software or device identification information under control of a personal computer 20. The MPU 36m transmits the generated instruction information to the MPU 32c via the information connector 36j and the information plug 32b. It is to be noted that the MPU 36m includes a random access memory or a clock signal generation circuit required to execute a program.

The power supply circuit 36n is connected with the connection lines 36g, 36h, and 36i. The power supply circuit 36n acquires a power from an outlet via the connection lines 36g, 36h, and 36i, transforms it, and supplies it to the storage device 36k and the MPU 36m.

The ROM 33 is provided in accordance with each outlet 5, and stores unique outlet identification information.

FIG. 40 is a block diagram showing a configuration of the collection apparatus 34.

The collection apparatus 34 includes contacts 34a, 34b, 34c, 34d, 34e, and 34f, connection lines 34g, 34h, and 34i, a filter circuit 34j, a high-frequency MODEM 34k, a storage device 34m, an MPU 34n, a power supply circuit 34p, and a breaker 34q.

Three power supply lines belonging to the power supply systems 6 on the power line output side (a downstream side) are respectively connected with the contacts 34a, 34b, and 34c. Three power supply lines belonging to the power supply systems 6 on the power line input side (an upstream side) are respectively connected with the contacts 34d, 34d, and 34f. The connection lines 34g, 34h, and 34i connect the contacts 34a, 34b, and 34c with the contacts 34d, 34e, and 34f, i.e., connect the three power supply lines on the power line output side with the three power supply lines on the power line input side, respectively.

The filter circuit 34j separates a high-frequency signal superimposed on a low-frequency alternating voltage flowing through the connection lines 34g and 34h from this alternating voltage. The filter circuit 34j supplies a high-frequency signal component to the high-frequency MODEM 34. Furthermore, the filter circuit 34j superimposes the high-frequency signal output from the high-frequency MODEM 34k on an alternating voltage to be transmitted to the power line output side alone.

The high-frequency MODEM 34k demodulates a high-frequency signal transmitted from the filter circuit 34j to extract reporting information. Moreover, the high-frequency MODEM 34k modulates a signal supplied from the MPU 34n to obtain a high-frequency signal.

The storage device 34m includes, e.g., a ROM. The storage device 34m stores software that drives the MPU 34n.

The MPU 34n can read information transmitted through the connection lines 34g and 34h by using the high-frequency MODEM 34k. Additionally, the MPU 34n can read information stored in the storage device 34m as required. The MPU 34n transmits the received reporting information to the recording/warning apparatus 4. Further, the MPU 34n can transmit a signal requesting the sub-collection apparatus 2 to send information or a signal instructing remedying software through the high-frequency MODEM 34k and the filter circuit 34j. It is to be noted that the MPU 34n includes a random access memory or a clock signal generation circuit required to execute a program.

The power supply circuit 34p is connected with the connection lines 34g, 34h, and 34i. The power supply circuit 34p acquires a power from the power supply line via the connection lines 34g, 34h, and 34i, transforms it, and supplies the transformed power to the high-frequency MODEM 34k, the storage device 34m, and the MPU 34n.

The breaker 34q disconnects the power line output side when a current flowing through the connection lines 34g, 34h, and 34i becomes excessive due to leakage of current or a short circuit An operation of the management system according to the ninth embodiment will now be explained.

The reporting apparatus 32 is attached to a power supply plug of an electrical device 13 as a management target.

When the electrical device as a management target is inserted into an outlet 5, the reporting apparatus 32 attached to this electrical device is connected with the power supply system 6. At this time, the information plug 32b of the reporting apparatus 32 is inserted into an information connector 35 corresponding to the outlet 5. Then, in the reporting apparatus 32, a power generated by the power supply circuit 1q is supplied to the MPU 31c, thereby activating the MPU 31c. At this time, the MPU 31c reads device identification information from the storage device 1n, reads outlet identification information from the ROM 33, acquires a power measured value output from the digital power meter 25a, and generates a signal including reporting information that includes the device identification information, the outlet identification information, and the power measured value. A high-frequency signal obtained by modulating this signal by the high-frequency MODEM 1m is supplied to the outlet side via the filter circuit 1k. The high-frequency signal supplied from the reporting apparatus 32 in this manner is transmitted to the power supply system 6 from the outlet 5.

Thereafter, the reporting apparatus 32 repeatedly transmits the high-frequency signal indicative of the reporting information at each preset timing as long as it stays connected with the power supply system 6. It is to be noted that the MPU 32c acquires a power measured value output from the digital power meter 25a at each timing mentioned above so that the power measured value indicative of a measured value of a power consumption at this moment is included in the reporting information. Although the reporting apparatus 32 may transmit the high-frequency signal at an arbitrary timing, transmitting this signal in accordance with each fixed cycle can be considered. In this example, setting one cycle to approximately one second can practically suffice.

Furthermore, the reporting apparatus 32 also detects collision and retries transmission as required like the reporting apparatus 1.

The high-frequency signal supplied to the power supply system 6 as explained above is transmitted through the power supply system 6, and relayed by the collection apparatus 34 to be fed to the recording/warning apparatus 4.

First to fourth databases created based on the actual system configuration are respectively prepared in the recording/warning apparatus. The second to the fourth databases are the same as those in the third embodiment.

The first database includes a data record in which outlet identification information, information of a location, and information of an outlet position are associated with each other as shown in FIG. 41, for example. Information concerning each outlet 5 is written in the data record included in the first database. As the outlet identification information, outlet identification information stored in the ROM 33 corresponding to each outlet 5 is written. As the location, a name of a room to which the power supply system 6 is wired is written. As the outlet position, a position at which each outlet 5 is disposed in the above-explained location is written.

Meanwhile, when the recording/warning apparatus 4 receives reporting information from the collection apparatus 34, it starts plug event monitoring processing. A flow of this plug event monitoring processing is the same as that depicted in the flowchart of FIG. 24. However, in the ninth embodiment, the recording/warning apparatus 4 performs identification of a current location and a connected outlet position at the steps Sa4 based on outlet identification information included in the reporting information while making reference to such a first table as depicted in FIG. 41.

The recording/warning apparatus 4 carries out unplug event monitoring processing separately from the plug event monitoring processing like the first embodiment.

As explained above, according to the ninth embodiment, the same effects as those of the third embodiment can be obtained.

Further, according to the ninth embodiment, since providing the collection apparatus 34 alone to the power supply system 6 can suffice, this system can be readily applied to an existing power supply facility. That is, when attaching the plurality of collection apparatus like each of the foregoing embodiments, many collection apparatus must be disposed to be distributed in the power wiring lines, and hence this operation is troublesome. Furthermore, the collection apparatus cannot be disposed at appropriate positions and the power wiring lines must be changed in some cases. In regard this point, according to the ninth embodiment, disposing the single collection apparatus 34 at, e.g., a position near a distribution switchboard can suffice, and hence this operation is greatly facilitated.

It is to be noted that the ROM 33 and the information connector 35 must be provided in accordance with each outlet 5 in the ninth embodiment, but attachment can be relatively easily performed when an outlet unit having the outlet 5, the ROM 33, and the information connector 35 therein is disposed in placed of an existing outlet unit.

It is to be noted that a characteristic configuration of the ninth embodiment can be carried out in combination of characteristics of the first, the second, and the fourth to the eighth embodiments.

Moreover, the ROM 33 may store system identification information of the power supply system 6 to which a corresponding outlet 5 is connected. In this case, the plurality of ROMs 33 may store the same system identification information.

It is to be noted that the following various merits can be obtained by utilizing the management system in each of the foregoing embodiments.

(1) A management task (which is a work of an ME engineer) to allocate an appropriate power supply system to a device can be facilitated.

(2) Constantly tracking a use status of each electrical device can provide a function of showing that an electrical device that is urgently required in a given work section (an operating room) is "currently unavailable (including information of a location where this electrical device is present)" in the form of a list. As a result, for example, a decision can be quickly made on a possible operating room to negotiate for borrowing (an electrical device that is currently connected with an outlet but in a standby mode as seen from a power consumption is recognized) if all electrical devices are unavailable, or on making a search in a likely place (a machine room or a hallway) if there are available electrical devices, thereby simplifying a problem of arrangement of an electrical device in the operating room (a work section).

(3) Constantly tracking a use status of each electrical device enables monitoring whether each electrical device is properly used, thereby rapidly coping with an unexpected problem (e.g., a failure).

(4) Work contents in each work section can be estimated by constantly tracking a use status of each electrical device, thus enabling monitoring whether a work is advancing as usual (whether signs of occurrence of a problem are present). However, this is a work of an operating department manager (a supervisor as a leader of anesthesiologists).

(5) Making a record of a use status of each electrical device as time-series information enables providing references for clearing circumstances of an accident if a serious problem or an accident occurs in a work section. Additionally, even if a problem or an accident does not occur, taking statistics of a use status of each device (e.g., a clock time of use, a frequency, or a duration) can be utilized to calculate statistics that characterizes regular use. Such statistics can be used for making a judgment on a defect in (4).

(6) Making a record of a use status of each electrical device enables judging excess and deficiency of the same type of devices, and this record can be information for making a decision on introducing a facility. Further, a need or immediacy for maintenance of devices can be judged, thus aiding the making of a maintenance plan.

This embodiment can be modified in many ways as follows.

In each of the foregoing embodiments, the recording/warning apparatus 4 may have a fifth database. Information useful for management of devices is written in this fifth database although this information is not included in the first to the fourth databases. For example, this information may include an inspection cycle of a device, a contact information when, e.g., a device has a failure, a purchase date of a device, information concerning an appointment for use of a device, and others. Furthermore, making reference to the information written in this fifth database enables management explained in conjunction with the first to the fifth embodiments as well as other various kinds of management. It is to be noted that, in this case, the recording/warning apparatus 4 is used as a computer 20 that controls the rewriting device 24 or 36 in the fourth, the sixth, the eighth, and the ninth embodiments so that information can be registered in the fifth database as a part of an operation of writing necessary information in the reporting apparatus 23, 26, 29, or 32, thereby facilitating this operation and avoiding occurrence of an error in information registration.

In each of the foregoing embodiments, the device as a management target is not restricted to an electrical device. That is, a device that includes a dummy power supply plug and is connected with the outlet 5 for management only may be included.

The functions of the various kinds of reporting apparatus in the foregoing embodiments may be incorporated in electrical devices.

The management system according to each of the foregoing embodiments can be utilized for management of a device that is utilized in facilities other than a hospital, e.g., a plant.

Although a current location or a power consumption of the electrical device 13 is monitored in each of the foregoing embodiments, such processing does not necessarily have to be performed. A manager can use collected information or the time-series information as information that is used to manage a current location or a power consumption of the electrical device 13.

The host collection apparatus 3 may not have a function of adding system identification information to reporting information, and reporting information supplied from the sub-collection apparatus 2 may be transmitted to the recording/warning apparatus 4 as it is.

Declaration information and event information concerning various kinds of events may be recorded as different pieces of time-series information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A management system that manages a use status of a plurality of devices that are connected a plurality of power supply systems provided in a facility to be used, comprising:
   a plurality of reporting apparatuses attached to the devices; and
   a management apparatus,
   wherein each of the reporting apparatuses includes a first output unit which outputs device identification information required to identify a corresponding one of the devices when the corresponding one attached to the reporting apparatus is connected with one of the power supply systems, and
   the management apparatus includes a collecting unit which collects the device identification information output from the first output unit in association with system identification information required to identify one of the power supply systems to which the corresponding one of the devices is connected.

2. The management system according to claim 1, further comprising:
   a plurality of sub-collection apparatuses provided in accordance with each of the plurality of power supply systems; and
   a host collection apparatus,
   wherein each of the sub-collection apparatuses includes a second output unit which receives the device identification information output from the reporting apparatus attached to the device connected with the corresponding one of the power supply systems, and outputs the device identification information and the system identification information required to identify the corresponding one of the power supply systems, and
   the host collection apparatus includes a third output unit which receives the device identification information and the system identification information output from each of the plurality of sub-collection apparatuses, and outputs the device identification information and the system identification information to the management apparatus.

3. The management system according to claim 1, further comprising an collection apparatus,
   wherein each of the reporting apparatuses further includes an acquiring unit which acquires system identification information concerning the power supply system to which the corresponding one of the devices is connected,
   the first output unit provided in each of the reporting apparatuses outputs the system identification information acquired by the acquiring unit together with the device identification information, and
   the collection apparatus includes a transmitting unit which receives the device identification information and the system identification information output from the first output units provided in each of the reporting apparatuses, and transmits the device identification information and the system identification information to the management apparatus.

4. The management system according to claim 1,
wherein the management apparatus collects the device identification information through the power supply systems.

5. The management system according to claim 1,
wherein each of the reporting apparatuses further includes a measuring unit which measures a power consumption in the corresponding one of the devices,
each of the first output units provided in each of the reporting apparatuses outputs a measured value of the power consumption together with the device identification information, and
the collecting unit provided in the management apparatus collects the device identification information and the measured value output from the first output unit provided in each of the reporting apparatuses in association with system identification information required to identify each of the power supply systems to which the device corresponding to the collected device identification information is connected.

6. The management system according to claim 5,
wherein the management apparatus further includes a recording unit which records the device identification information, the system identification information, and the measured value collected by the collecting unit in association with time information indicative of a clock time at which the device identification information, the system identification information, and the measured value are collected.

7. The management system according to claim 2,
wherein each of the sub-collection apparatuses further includes a measuring unit which measures a power consumption in a corresponding one of the power supply systems,
each of the second output units provided in each of the sub-collection apparatuses outputs a measured value of the power consumption together with the device identification information and the system identification information,
the third output unit provided in the host collection apparatus receives the device identification information, the system identification information, and the measured value, and outputs them to the management apparatus, and
the collecting unit provided in the management apparatus collects the device identification information and the measured value output from the third output unit in association with the system identification information output together with the device identification information and the measured value.

8. The management system according to claim 6,
wherein the management apparatus further includes a recording unit which records the device identification information, the system identification information, and the measured value collected by the collecting unit in association with time information indicative of a clock time at which the device identification information, the system identification information, and the measured value are collected.

9. The management system according to claim 1,
wherein the management apparatus further includes a recording unit which records the device identification information and the system identification information collected by the collecting unit in association with time information indicative of a clock time at which the device identification information and the system identification information are collected.

10. The management system according to claim 1,
wherein the management apparatus further includes a determining unit which determines a location in the facility of the device corresponding to the device identification information collected by the collecting unit based on the system identification information associated with the device identification information.

11. The management system according to claim 10,
wherein the determining unit determines a position in a storage device at which the system identification information collected in association with the device identification information is stored as a location in the facility of the device corresponding to the device identification information.

12. The management system according to claim 10,
wherein the management apparatus further includes a notifying unit which notifies a user of the management system of a determination result by the determining unit.

13. The management system according to claim 1,
wherein the management apparatus further includes:
a calculating unit which calculates a sum total of maximum power consumptions of the respective devices each of which is indicated by the device identification information collected in association with the same system identification information; and
a detecting unit which detects a fact that the sum total exceeds a reference power consumption determined based on an allowable power consumption of the power supply system when one of the devices is newly connected with the power supply system as occurrence of a maximum power exceeding event.

14. The management system according to claim 13,
wherein the calculating unit calculates a sum total of maximum power consumptions each of which is stored in a storage device in association with each device identification information collected in association with the same system identification information.

15. The management system according to claim 13,
wherein each of the first output units provided in each of the reporting apparatuses outputs maximum power information indicative of a maximum power consumption of corresponding one of the devices together with the device identification information,
the collecting unit collects the device identification information and the maximum power information output from the first output units in association with system identification information required to identify one of the power supply systems to which the device corresponding to the collected device identification information is connected, and
the calculating unit calculates a sum total of maximum power consumptions indicated by the maximum power information collected in association with the same system identification information.

16. The management system according to claim 13,
wherein the management apparatus further includes a warning unit which gives a warning in response to detection of occurrence of the maximum power consumption exceeding event.

17. The management system according to claim 1,
wherein the collecting unit provided in the management apparatus repeatedly collects the device identification information, and
the management apparatus further includes a detecting unit which detects occurrence of a plug event that the device is connected with the power supply system based on a change in the device identification information collected by the collecting unit.

18. The management system according to claim 17, wherein the detecting unit further detects occurrence of an unplug event that the device is removed from the power supply system based on a change in the device identification information collected by the collecting unit.

19. The management system according to claim 18, wherein the management apparatus comprises:

a measuring unit which measures a fluctuation state of an amount of power consumed by the device connected with one of the power supply systems in accordance with each power supply systems; and a detecting unit which detects a fact that the fluctuation state is out of an allowable range as occurrence of a power fluctuation event when occurrence of the plug event or the unplug event is not detected.

20. The management system according to claim 19, wherein the management apparatus further includes a warning unit which gives a warning in response to detection of occurrence of the power fluctuation event.

21. The management system according to claim 17, wherein the management apparatus further includes a detecting unit which detects a fact that a use status of the newly connected device does not meet use conditions predetermined with respect to the newly connected device as occurrence of an improper connection event in response to detection of occurrence of the plug event.

22. The management system according to claim 21, wherein the management apparatus further includes a warning unit which gives a warning in response to detection of occurrence of the improper connection event.

23. The management system according to claim 1, wherein the management apparatus further includes:

a detecting unit which detects an event concerning a use status of each of the devices based on information collected by the collecting unit; and a recording unit which records detection of the event by the detecting unit in time series.

* * * * *